(12) United States Patent  
Konyo et al.

(10) Patent No.: US 12,554,330 B2  
(45) Date of Patent: Feb. 17, 2026

(54) VIBRATION DISTRIBUTION CONTROL DEVICE, VIBRATION DISTRIBUTION CONTROL PROGRAM, AND VIBRATION DISTRIBUTION CONTROL METHOD

(71) Applicant: TOHOKU UNIVERSITY, Sendai (JP)

(72) Inventors: Masashi Konyo, Sendai (JP); Takuma Inagaki, Sendai (JP); Daiki Kikuchi, Sendai (JP); Kosuke Yamaguchi, Sendai (JP); Satoshi Tadokoro, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 98 days.

(21) Appl. No.: 18/566,286

(22) PCT Filed: Jun. 4, 2021

(86) PCT No.: PCT/JP2021/021464  
§ 371 (c)(1),  
(2) Date: Dec. 1, 2023

(87) PCT Pub. No.: WO2022/254732  
PCT Pub. Date: Dec. 8, 2022

(65) Prior Publication Data  
US 2024/0361840 A1 Oct. 31, 2024

(51) Int. Cl.  
*H04B 3/36* (2006.01)  
*G06F 3/01* (2006.01)

(52) U.S. Cl.  
CPC .................... *G06F 3/016* (2013.01)

(58) Field of Classification Search  
CPC ....................................... G06F 3/016  
(Continued)

(56) References Cited

U.S. PATENT DOCUMENTS 9,880,621 B2 1/2018 Israr et al.  
11,205,329 B2 * 12/2021 Culbertson ............. G06F 3/014  
(Continued)

FOREIGN PATENT DOCUMENTS

JP 2008-134990 A 6/2008  
JP 2018-124859 A 8/2018  
JP 2021-65872 A 4/2021

OTHER PUBLICATIONS

Israr et al. "Tactile Brush: Drawing on Skin with a Tactile Grid Display", Conference on Human Factors in Computing Systems—Proceedings, CHI 2011—Session: Touch 1: Tactile & Haptics, pp. 2019-2028, May 2011, Vancouver, BC, Canada.  
Kim et al., "Extending 'out of the body' tactile phantom sensations to 2D and applying it to mobile interaction", Pers Ubiquit Comput 19, pp. 1295-1311, Dec. 2015, Springer-Verlag, London, UK.  
Tawa et al., "Extended phantom sensation: vibrotactile-based movement sensation in the area outside the inter-stimulus", Advanced Robotics, 35:5, pp. 268-280, Dec. 2020, Taylor&Francis Group and the Robotics Society of Japan, online, DOI:10.1080/01691864.2020.1854114.  
(Continued)

*Primary Examiner* — Tai T Nguyen  
(74) *Attorney, Agent, or Firm* — Myers Wolin, LLC

(57) ABSTRACT

A vibration distribution control device configured to generate a vibration source being present at a predetermined position by using a plurality of vibrators includes: a calculator configured to calculate a perceived intensity from a vibration waveform of the vibration source; a distributor configured to distribute the perceived intensity of each of the plurality of vibrators in accordance with an azimuth of the vibration source and arrangement positions of the plurality of vibrators; and signal output processor circuitry configured to control and output vibrations of the plurality of vibrators based on information distributed by the distribution distributor.

9 Claims, 44 Drawing Sheets

(58) Field of Classification Search
USPC .................................................. 340/407.2
See application file for complete search history.

(56) References Cited

U.S. PATENT DOCUMENTS

| | | | |
|---|---|---|---|
| 11,209,906 B2* | 12/2021 | Marozau | H04B 1/385 |
| 2008/0094351 A1 | 4/2008 | Nogami et al. | |
| 2011/0148607 A1* | 6/2011 | Zeleny | A41D 31/02 |
| | | | 340/407.1 |
| 2019/0120997 A1* | 4/2019 | Benke | G08B 21/12 |
| 2021/0004086 A1* | 1/2021 | Yokoyama | G06F 3/016 |

OTHER PUBLICATIONS

Cao et al., "Dependence of the Perceptual Discrimination of High-Frequency Vibrations on the Envelope and Intensity of Waveforms", IEEE Access, Feb. 2019, vol. 7, pp. 20840-20849, DOI: 10.1109/ACCESS.2019.2898029.

International Search Report issued by the Japan Patent Office for corresponding International Patent Application No. PCT/JP2021/021464, mailed on Aug. 24, 2021, with an English translation.

International Preliminary Report on Patentability issued by WIPO for corresponding International Patent Application No. PCT/JP2021/021464, mailed on Dec. 14, 2023, with an English translation.

* cited by examiner

ARRANGEMENT OF VIBRATION SOURCE AND VIBRATORS

VIBRATION DISTRIBUTION CONTROL DEVICE, VIBRATION DISTRIBUTION CONTROL PROGRAM, AND VIBRATION DISTRIBUTION CONTROL METHOD

CROSS-REFERENCE TO RELATED APPLICATION

This application is a National Stage application under 35 U.S.C. 371 of International Application No. PCT/JP2021/021464, filed on Jun. 4, 2021 and designated the U.S. The contents of which are herein incorporated by reference.

TECHNICAL FIELD

The technology described in the present description relates to a vibration distribution control device, a vibration distribution control program, and a vibration distribution control method.

BACKGROUND ART

It is known that vibrations at a wide range of frequencies including a high frequency of up to several hundred Hz can be reproduced by using vibrators to give a user a realistic tactile sensation when the user collides with or brushes against an object.

On the other hand, there is demand for a technique for having a user to experience vibrations at a virtual position as an artificial realistic sense by using fewer vibrators. As an existing technique, phantom sensation (PS) is known as a phenomenon in which a difference in strength between a plurality of vibrations is used to enable a user to perceive the presence of a vibration source on his or her body or through an object held by his or her hands.

In addition to PS, an apparent motion that gives an illusion that a vibration source moves due to a time difference in stimuli between vibrators is known.

A bodily sensation such as the apparent motion can also be experienced by moving the position of the PS.

CITATION LIST

Patent Literature

Patent Document 1: U.S. Pat. No. 9,880,621
Patent Document 2: JP 2021-65872 A

Non-Patent Literature

Non-Patent Document 1: Israr, Ali & Poupyrev, Ivan. "Tactile Brush: Drawing on skin with a tactile grid display", Conference on Human Factors in Computing Systems-Proceedings. 2019-2028 May 2011

Non-Patent Document 2: Kim, Y., Lee, J. & Kim, G. J. "Extending "out of the body" tactile phantom sensations to 2D and applying it to mobile interaction.", Pers Ubiquit Comput 19, 1295-1311 December 2015

Non-Patent Document 3: Syunsuke Tawa, Hikaru Nagano, Yuichi Tazaki & Yasuyoshi Yokokohji "Extended phantom sensation: vibrotactile-based movement sensation in the area outside the inter-stimulus", Advanced Robotics, 35:5, 268-280, March 2021

SUMMARY

Technical Problem

Unfortunately, in a PS generation method of the related art, a strength difference between vibrations determines a function of an amplitude ratio to a presentation position experimentally and empirically with respect to a simple vibration waveform (which can be represented by a frequency and an amplitude) such as a sine wave or a rectangular wave and cannot represent a vibration source having a vibration waveform including a plurality of frequencies.

In addition, in PS of the related art, a plurality of vibrators are brought into contact with the body and the vibrations of the vibrators are localized in most cases. Although some studies report that vibrations are localized outside vibrators on a straight line connecting the vibrators, there is no realized technique for localizing vibrations on a two dimensional or three dimensional plane outside the vibrators.

In one aspect, the technology described in the present description aims to present a human with a predetermined vibration waveform including a plurality of frequencies as if it is present at a specific position and to improve the reality of bodily sensations.

Solution to Problem

A vibration distribution control device according to one aspect is a vibration distribution control device that generates a vibration source being present at a predetermined position by using a plurality of vibrators and includes a calculation unit that calculates a perceived intensity from a vibration waveform of the vibration source; a distribution unit configured to distribute the perceived intensity to each of the plurality of vibrators in accordance with an orientation of the vibration source and arrangement positions of the plurality of vibrators; and a signal output unit that controls and outputs vibrations of the plurality of vibrators based on information distributed by the distribution unit.

Advantageous Effects

As one aspect, a predetermined vibration waveform including a plurality of frequencies can be presented at a specific position for a human, and the reality of bodily sensations can be improved.

DESCRIPTION OF EMBODIMENTS

Figure 1:
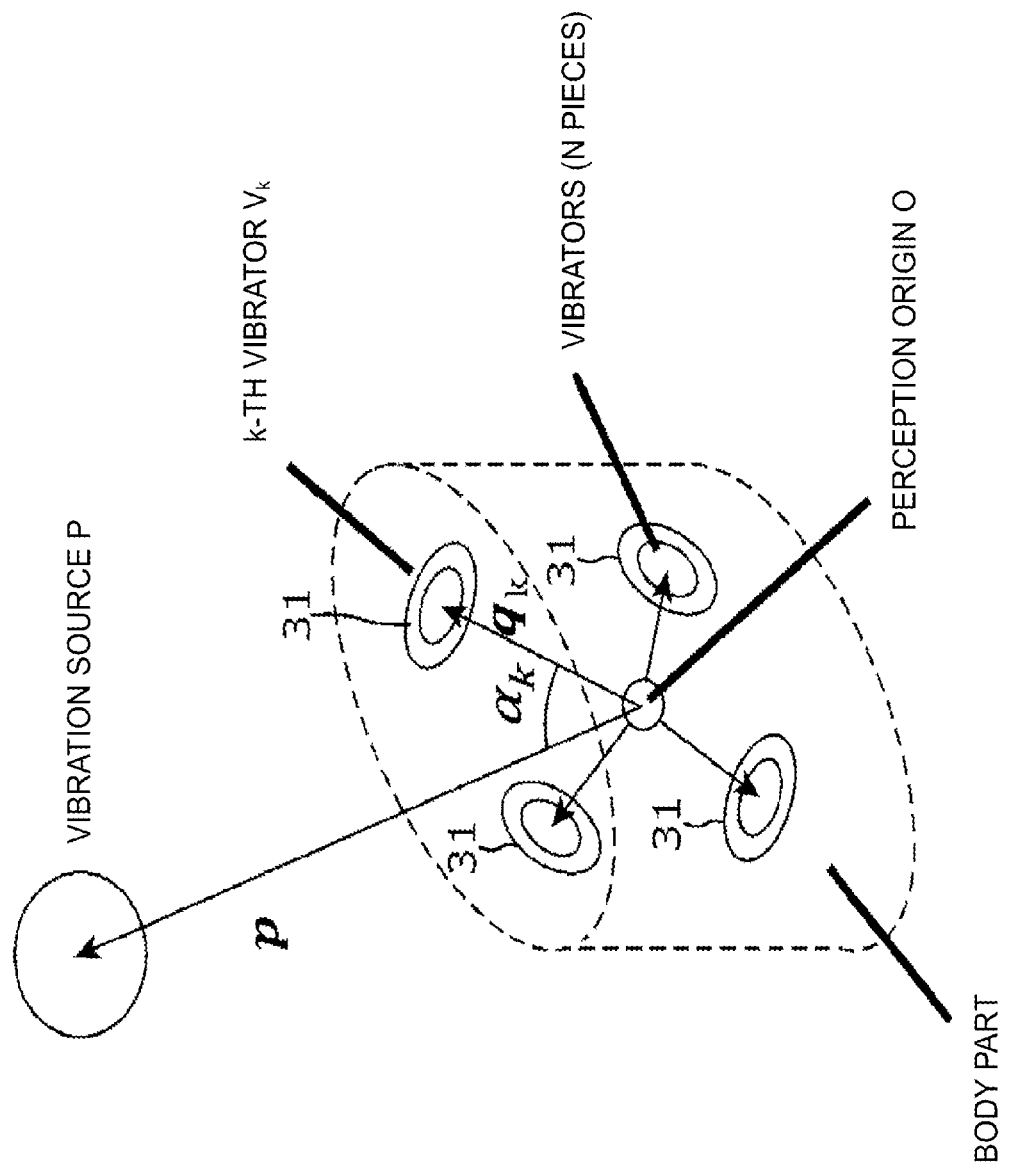
FIG. 1 is a diagram for describing a perceived intensity distribution process.

Hereinafter, embodiments will be described with reference to the drawings. However, the embodiments described below are merely examples, and there is no intention to exclude various modifications and applications of techniques that are not explicitly described in the embodiments. That is, the present embodiment can be modified and implemented in various ways without departing from the scope of the present embodiment.

In addition, each drawing is not intended to include only components illustrated therein, and may include other components. Hereinafter, in the drawings, parts denoted by the same reference numerals indicate the same or similar parts unless otherwise specified.

[A] Embodiment

[A-1] Perceived Intensity Distribution Process

FIG. 1 is a diagram for describing a perceived intensity distribution process.

In the present embodiment, a perceived intensity is calculated from a predetermined vibration waveform based on a human intensity perception model. By replacing a predetermined waveform with a perceived intensity, the amount of bodily sensation that is inherently perceived by a human can be calculated or adjusted.

Perceived intensities are distributed to a plurality of vibrators, vibrators 31 are driven so that the total sum of the perceived intensity is maintained, and thereby the bodily sensation of the vibration source desired to be expressed is generated.

At this time, the directionality and distance of the vibration source can be expressed by distributing the proportion of the perceived intensity presented by each vibrator 31 in accordance with a position at which the vibration source is desired to be localized.

A location at which the vibration source is desired to be localized may be any location outside the body, and may be on the body such as around the arm, or near the body such as just above the arm.

By using two or more (four in the example illustrated in FIG. 1) vibrators 31 in contact with the body, vibration is generated so that a bodily sensation obtained from vibration emitted by a vibration source having a predetermined waveform is experienced as artificial reality of the orientation and distance of the vibration source.

The bodily sensation of the vibration source having a predetermined waveform is calculated based on the perceived intensity perceived by a human. The sense of distance from the vibration source may be expressed by attenuating the perceived intensity using an attenuation formula according to the distance. The sense of orientation of the vibration source may be expressed by multiplying the perceived intensity by an appropriate distribution coefficient and distributing the result to each vibrator 31.

The distance attenuation formula and the distribution coefficient may be determined in accordance with the distance and the azimuth between the perception origin determined by the geometric arrangement of the plurality of vibrators 31 and the vibration source. The vibration source may be experienced as if it were outside the body. In addition, the vibration source may be experienced as if it were present on a body surface or inside the body.

The perceived intensity perceived by a human is calculated from the vibration waveform of the vibration source at any position. As a result, the human can experience a predetermined waveform that includes multiple frequencies.

A plurality of vibrators are arranged on a body, and the center position of a vibration image obtained by the plurality of vibrators 31 is determined to be a perception origin. The position of the vibration image perceived when all of the vibrators 31 are driven at the same perceived intensity may be determined to be a perception origin. In addition, if the perception origin is affected by an intensity or varies among individuals, a representative position may be determined.

A perceived intensity at the perception origin is calculated by using a distance attenuation formula which attenuates according to the distance from the vibration source to the perception origin. At this time, by appropriately setting the distance attenuation formula, the physical properties of the vibration propagation path and the sense of distance can be experienced. Further, the physical properties (in other words, physical characteristics) of the vibration propagation path include, for example, the hardness and material of the ground, and propagation characteristics in the air or water.

The perceived intensity calculated at the perception origin is distributed to each of the vibrators 31 using a distribution coefficient of each vibrator 31 appropriately determined based on the orientation of the vibration source and the arrangement position of each vibrator 31. As a result, the user can be made to experience the perceived intensity at the perception origin as if it is present in the orientation of the vibration source. At this time, by keeping the total sum of the distribution coefficients constant, it is possible to give a bodily sensation in the same magnitude as the perceived intensity at the perception origin regardless of the orientation.

In FIG. 1, k (k=1, 2, . . . , N) indicates the number of a vibrator 31, and the k-th vibrator 31 is indicated by $V_k$. P is a vector from the perception origin O to the vibration source P, and $q_k$ is a vector from the perception origin O to the k-th vibrator $V_k$. $\alpha_k$ is an angle formed by the vector p to the vibration source and the vector $q_k$ to the k-th vibrator. The distance from the perception origin O to the vibration source P is represented by $r=\|p\|$. When a perceived intensity of the vibration source is $I_o$, a perceived intensity transmitted to the perception origin is I, and the distance attenuation formula is d(r), $I=d(r)I_o$ is established. Furthermore, when a perceived intensity generated by each vibrator 31 is $I_k$ and the distribution coefficient is $g_k$, $I_k=g_k I$ is established. However, $\Sigma g_k=1$ is satisfied. By setting the sum of distribution coefficients $g_k$ to 1, the magnitude of the bodily sensation equal to the perceived intensity I can be maintained even when a plurality of vibrators 31 are used. Further, the value of distribution coefficient $g_k$ may be corrected for each vibrator 31.

The perceived intensity $I_o$ perceived by a human is obtained from the vibration waveform of the vibration source P. ISM, which will be described later with reference to FIG. 2 and the like, may be used to calculate the perceived intensity.

The Pacinian corpuscle of a human, which perceives vibration waveforms having a high frequency equal to or higher than 100 Hz, cannot distinguish waveforms, and generally perceives a vibration energy. An amount of energy of high-frequency vibration perceived by a human is defined as perceived intensity. The perceived intensity can be simply obtained to be an amount proportional to the square of the vibration amplitude of a signal. In addition, a subjective intensity with respect to the amplitude of the vibration waveform to be used may be obtained in advance from an experiment and used instead of a perceived intensity.

A more accurate perceived intensity has frequency dependence and is calculated by using the following formula. In the formula, A represents an amplitude, $T_f$ represents an amplitude threshold at frequency f, and $b_f$ represents an exponent value that depends on the frequency f. Calculation of a perceived intensity may not be limited to expression 1 below.

$$I_{pc} = \left[\left(\frac{A}{T_f}\right)^2\right]^{b_f} \quad [\text{Math 1}]$$

A perceived intensity may be obtained while time-dividing a predetermined vibration waveform in a constant period. When the perceived intensity is used, the frequency of the waveform of the divided signals needs to be estimated by using Fourier transform, wavelet analysis, empirical mode decomposition, or the like. When there are a plurality of frequencies, perceived intensities are obtained for each of frequency components, and the perceived intensity can be obtained from the sum of the frequency components. The perceived intensity may be emphasized according to the content of the vibration source to be presented.

Furthermore, even when perceived intensities are the same, if the perceived intensities vary in the range of frequency equal to or lower than 80 Hz, a person can distinguish the perceived intensities by using variation information as a clue. In consideration of this point, when a perceived intensity is calculated in a time division manner, variation of the perceived intensity at least up to 80 Hz needs to be maintained. In order to realize this, it is desirable to obtain a perceived intensity by using time division at least at a frequency higher than 80 Hz.

FIGS. 2(a) to 2(c) are graphs for briefly explaining an ISM process used for the perceived intensity distribution process illustrated in FIG. 1.

ISM is a method of modulating high-frequency vibration to low-frequency vibration while maintaining the tactile sensation. The original signal shown in FIG. 2(a) is converted to calculate the vibration intensity for each segment shown in FIG. 2(b). Then, the converted waveform shown in FIG. 2(c) is generated at the maintained vibration intensity.

Figure 2:
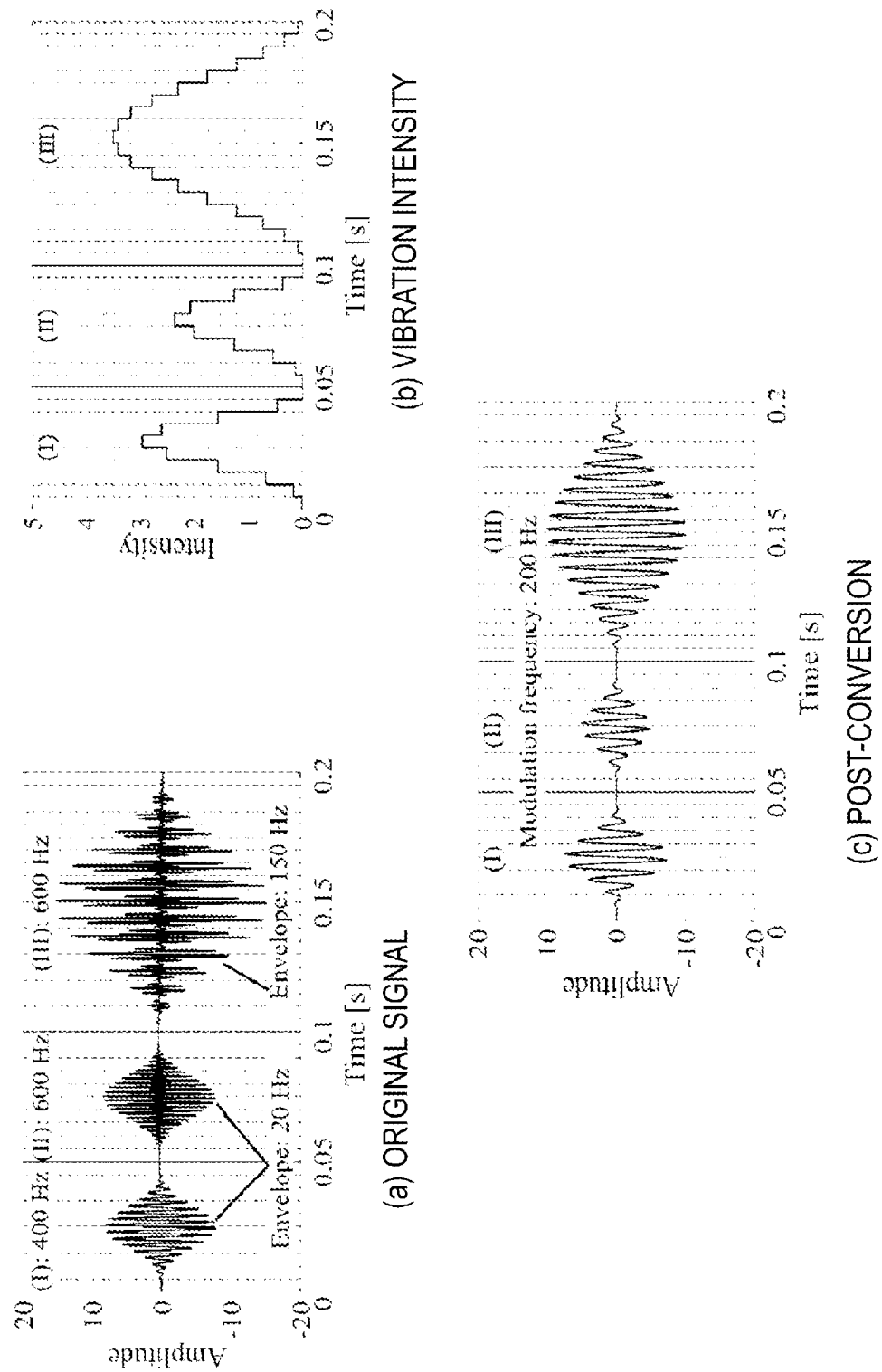
FIGS. 2(a) to 2(c) are graphs for briefly explaining an intensity segment modulation (ISM) process used for the perceived intensity distribution process illustrated in FIG. 1.

Although the vibration is a waveform of 200 Hz after conversion while it is a waveform of 400 to 600 Hz before conversion in FIG. 2, any frequency can be selected as the waveform after conversion.

When a high-frequency component signal is generated, a vibration waveform equivalent to the distributed perceived intensity is generated. In a simple manner, since the waveforms of the respective vibrators 31 have the same frequency, the original waveform may be multiplied by a gain value obtained from the distribution coefficient to drive the vibrators (the same method as that for a low-frequency component described later). However, in general, the tactile vibrators 31 have a narrow response frequency band, and it is difficult for the vibrators to generate a predetermined vibration waveform as it is. Furthermore, when an acoustic signal is used as a waveform of a vibration source, since the acoustic signal includes a frequency in an audible range, there is a problem that noise is generated when the vibration source is driven by the vibrator 31.

Thus, a waveform is converted into an amplitude modulated wave having an appropriate carrier frequency so as to generate the distributed perceived intensity $I_k$. Thus, the carrier frequency of the generated signal becomes one. A carrier frequency can be selected in accordance with the frequency response characteristics of the vibrators. A carrier frequency in the range of 150 to 400 Hz is appropriate in consideration of human perception characteristics for high-frequency vibration.

In consideration of human perception characteristics with respect to high-frequency vibration, by focusing on a vibration energy that is correlated with the human perception characteristics rather than on a waveform itself in a high-frequency band, the frequency band is changed by replacing the waveform with another waveform having an equivalent vibration energy.

A predetermined continuous vibration signal can be converted into a predetermined signal waveform by time-dividing the vibration signal at an appropriate interval in consideration of the human perception characteristics and converting the vibration signal into a vibration energy for each divided segment while equally maintaining a human tactile sense or to make the human feel a high-frequency band that is hardly felt.

By appropriately selecting the frequency of the vibrations after the conversion, it is possible to efficiently drive the vibrators in accordance with the response range of the vibrators, to reduce auditory noise, or to convert the vibration into a predetermined sound source.

A human is said to perceive vibration up to about 1 kHz. For this reason, vibration of 1 kHz or higher is often ignored. On the other hand, even if the vibration of 1 kHz or higher, it is known that the envelope curve components of the vibration can be perceived, in the case of an amplitude modulated wave whose amplitude fluctuates in a band that can be sensed by humans.

On the other hand, a vibration energy model is known as a human perception characteristic with respect to high-frequency vibration equal to or higher than 100 Hz of vibration. From this fact, it is known that, even if the carrier frequency of the amplitude modulated wave is replaced while the high-frequency vibration energy is maintained, the vibration cannot be discriminated. However, even if the vibration energy is maintained, the envelope component of the vibration may be perceived as a difference in tactile information as described above, and the perception range thereof has not been investigated. In addition, although a method of converting a signal based on a vibration energy in a time division manner has been devised, a method of maintaining low-frequency components has not been studied.

Figure 3:
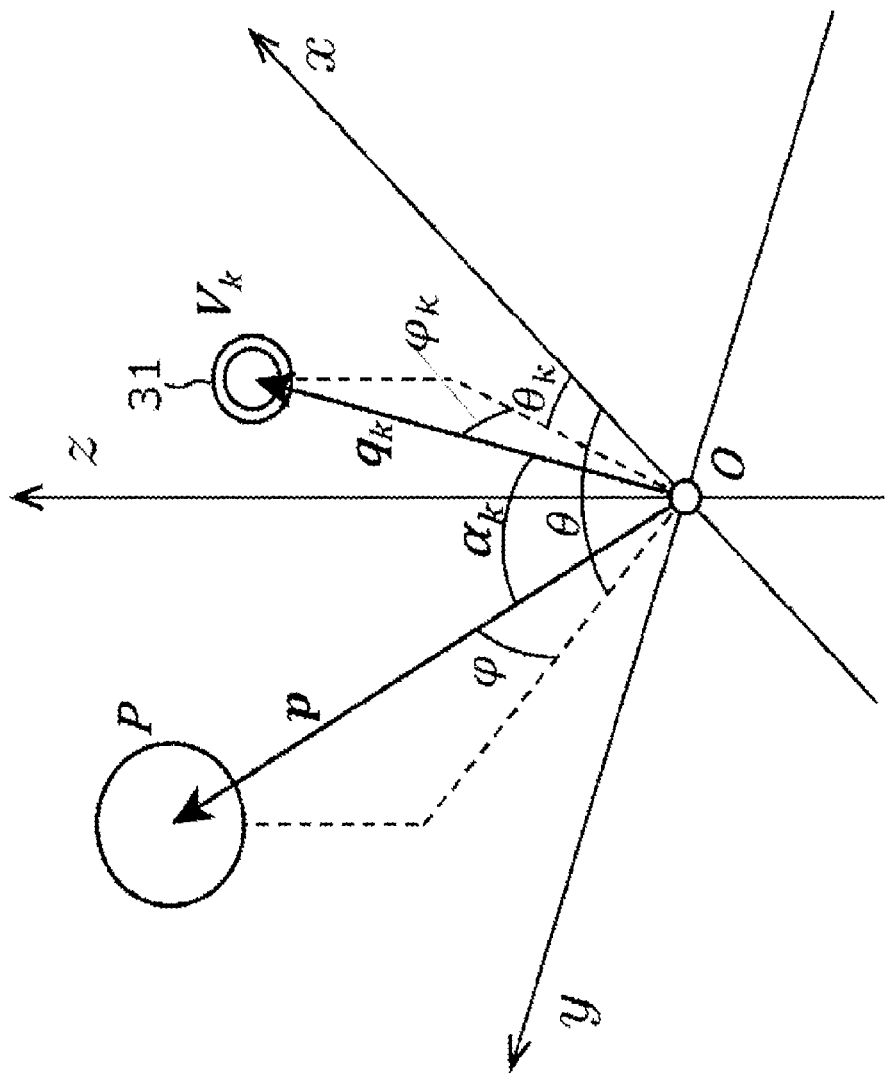
FIG. 3 is a diagram for describing a calculation example of a distribution coefficient in the perceived intensity distribution process illustrated in FIG. 1.

FIG. 3 is a diagram for describing a calculation example of a distribution coefficient in the perceived intensity distribution process illustrated in FIG. 1.

The distribution coefficient $g_k$ of a perceived intensity may be determined based on an azimuth $(\theta, \varphi)$ of the vibration source from the perception origin. It is assumed that a vector from the perception origin O to the vibration source P is p, a vector to the k-th vibrator $V_k$ is $q_k$, and an angle formed by the two vectors is $\alpha_k$. At this time, since the distribution coefficient $g_k$ of the vibrator $V_k$ becomes maximum when $\alpha_k=0$ and becomes minimum when $\alpha_k=\pi$, an output ratio of each vibrator 31 can be set as follows using a trigonometric function $\cos \alpha_k$.

$$R_k = \frac{\{(1+g_0) + (1-g_0)\cos\alpha_k\}}{2} \quad (g_0 \leq R_k \leq 1) \quad \text{[Math 2]}$$

Here, $g_0$ is a constant for adjusting the minimum value of the perceived intensity. At this time, the distribution coefficient is obtained by using the following formula by normalization with the sum of the output rates of all vibrators.

$$g_k = \frac{R_k}{\Sigma R_k} \quad \text{[Math 3]}$$

$\cos \alpha_k$ is obtained by the following formula using an inner product of the two vectors p and $q_k$.

$$\cos\alpha_k = \frac{p \cdot q_k}{||p|| \, ||q_k||} \quad \text{[Math 4]}$$

As illustrated in FIG. 3, when the azimuth of the vibrator $V_k$ is $\theta_k$, the elevation angle thereof is $\varphi_k$, the azimuth of the vibration source is $\theta$, and the elevation angle thereof is $\varphi$, $\cos \alpha_k$ is obtained, as follows.

$$\cos\alpha_k = \cos\varphi\cos\varphi_k\cos(\theta - \theta_k) + \sin\varphi\sin\varphi_k \quad \text{[Math 5]}$$

Inparticular, when $$\varphi = 0, \cos\alpha_k = \cos(\theta - \theta_k).$$

When the minimum perceived intensity transmitted from the vibration source to the perception origin is $I_{min}$, if the perceived intensity distributed to each vibrator 31 falls below a human perception threshold, it is not possible to cause the human to experience an appropriate intensity distribution ratio. Therefore, when the output ratio $R_k$ of each vibrator 31 is obtained, the constant $g_0$ for adjusting the minimum intensity is determined. The condition that a minimum intensity $I_{min\ k}$ of each vibrator 31 is equal to or higher than the perception threshold is satisfied by the following condition because I=1 is satisfied when a vibration amplitude A is equal to the perception threshold $T_f$ according to the definition of the perceived intensity.

$$I_{min\ k} = g_k I_{min} = \frac{g_0}{\Sigma R_k} I_{min} \geq 1 \quad \text{[Math 6]}$$

Therefore, the minimum condition satisfied by $g_0$ is expressed by the following formula.

$$g_0 \geq \frac{\Sigma R_k}{I_{min}} \quad \text{[Math 7]}$$

Figure 4:
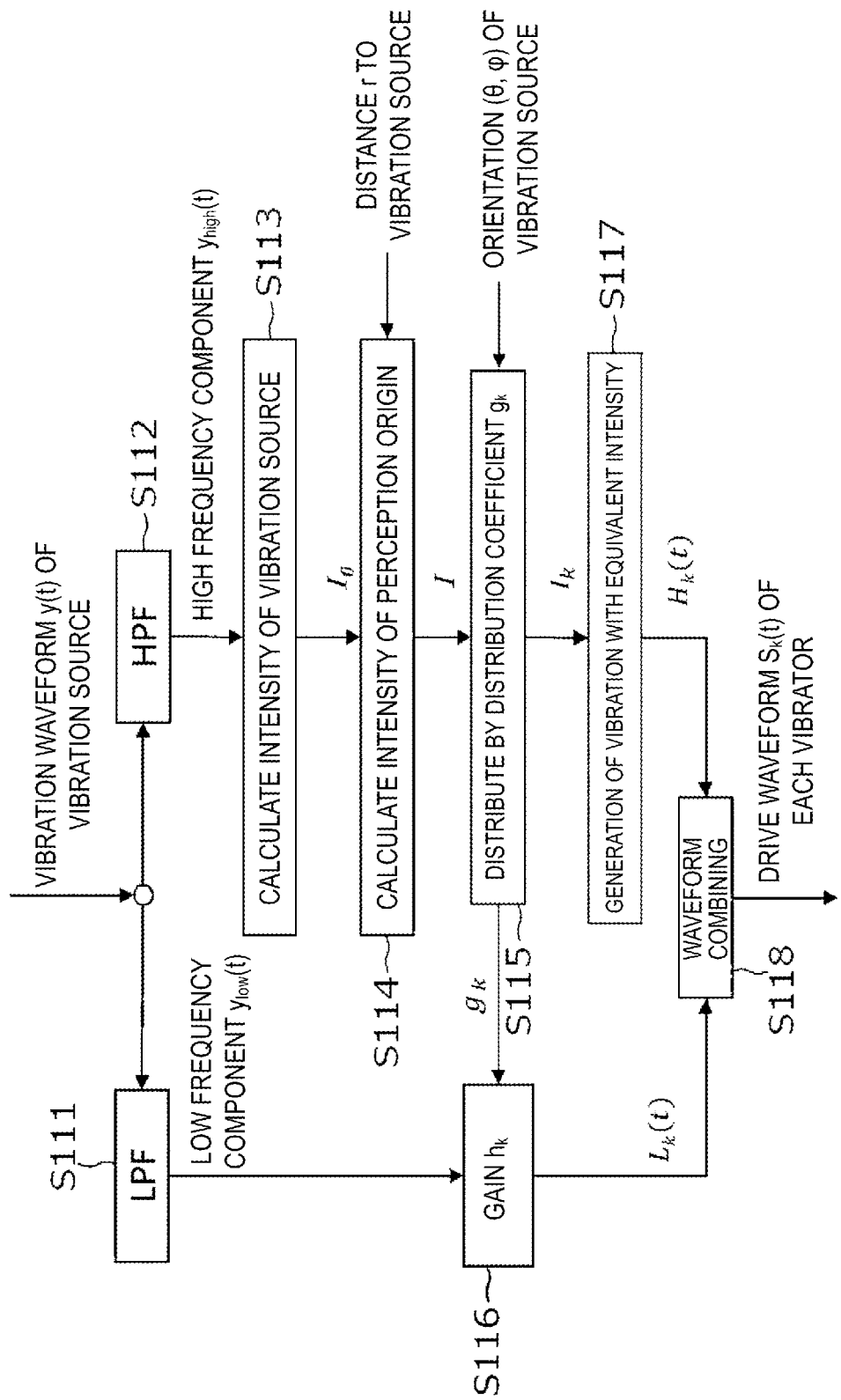
FIG. 4 is a flowchart for explaining the perceived intensity distribution process illustrated in FIG. 1.

FIG. 4 is a flowchart for explaining the perceived intensity distribution process illustrated in FIG. 1.

A vibration waveform y(t) of a vibration source is input to a low pass filter (LPF), and a low-frequency component $y_{low}(t)$ is output (step S111). The cutoff frequency of the LPF may be about 80 to 400 Hz.

In addition, the vibration waveform y(t) of the vibration source is also input to a high pass filter (HPF), and a high-frequency component $y_{high}(t)$ is output (step S112).

An intensity $I_0$ of the vibration source is calculated from the high-frequency component $y_{high}(t)$ (step S113).

The intensity I at the perception origin is calculated based on the intensity $I_o$ of the vibration source and the distance r to the vibration source (step S114).

An intensity is distributed with a distribution coefficient $g_k$ based on the intensity I at the perception origin and the orientation ($\theta$, $\varphi$) of the vibration source (step S115).

A gain $h_k$ is calculated based on the distribution coefficient $g_k$ and the low-frequency component $y_{low}(t)$ (step S116).

A vibration $H_k(t)$ having an equivalent intensity is generated based on an intensity $I_k$ corresponding to the distribution coefficient g k (step S117).

Waveforms are combined to generate a drive waveform $S_k(t)$ of each vibrator 31 based on the high-frequency vibration $H_k(t)$ and the low-frequency vibration $L_k(t)$ corresponding to the gain $h_k$ (step S118).

The low-frequency component is output by multiplying the amplitude of the original waveform by the gain $h_k$. $h_k$ may be determined based on the distribution coefficient $g_k$ used in the intensity distribution.

$h_k$ may be set by using the distribution coefficient $g_k$ as a gain value as it is such that the sum of amplitudes becomes equal to the original amplitude.

$$h_k = g_k, \sum h_k = 1 \quad \text{[Math 8]}$$

$h_k$ may be set using the distribution coefficient $g_k$ such that the sum of squares of the amplitudes is equal to the square of the original amplitude.

$$h_k = \frac{q(\theta, \varphi)}{\sqrt{\sum q_k^2(\theta, \varphi)}} \sum h_k^2 = 1 \quad \text{[Math 9]}$$

It is known that an amplitude decreases due to spread of an energy. The geometrical attenuation can be expressed in terms of amplitude as follows. Here, A represents the amplitude at the perception origin, $A_0$ represents the amplitude at the vibration source, and n represents a geometric damping constant determined by the type of wave. For example, the value of n is known as satisfying n=0.5 in the case of a surface wave (a Rayleigh wave).

$$A = A_0 \left(\frac{1}{r}\right)^n \quad \text{[Math 10]}$$

In addition, the following formula is established to convert an amplitude into an intensity.

$$1 = d(r)I_0 \quad \text{[Math 11]}$$

$$d(r) = \left\{\left(\frac{1}{r}\right)^n\right\}^{2b(f)}$$

In addition to the above-described geometrical damping, internal attenuation in which an energy is absorbed as particles occur friction when vibration propagates is known. Geometrical attenuation and internal attenuation are expressed by the following formula in terms of amplitude. Here, $\alpha$ represents an internal attenuation constant which depends on the material and frequency of propagation. For example, at the frequency of 50 Hz, a has a value from 0.1 to 0.3 for a soft ground, and a has a value from 0.003 to 0.03 for a hard ground.

$$A = A_0 \left(\frac{1}{r}\right)^n e^{-ar} \qquad \text{[Math 12]}$$

In addition, the following formula is established to convert an amplitude into an intensity.

$$I = d(r)I_0 \qquad \text{[Math 13]}$$
$$d(r) = \left\{\left(\frac{1}{r}\right)^n e^{-ar}\right\}^{2b(f)}$$

Figure 5:
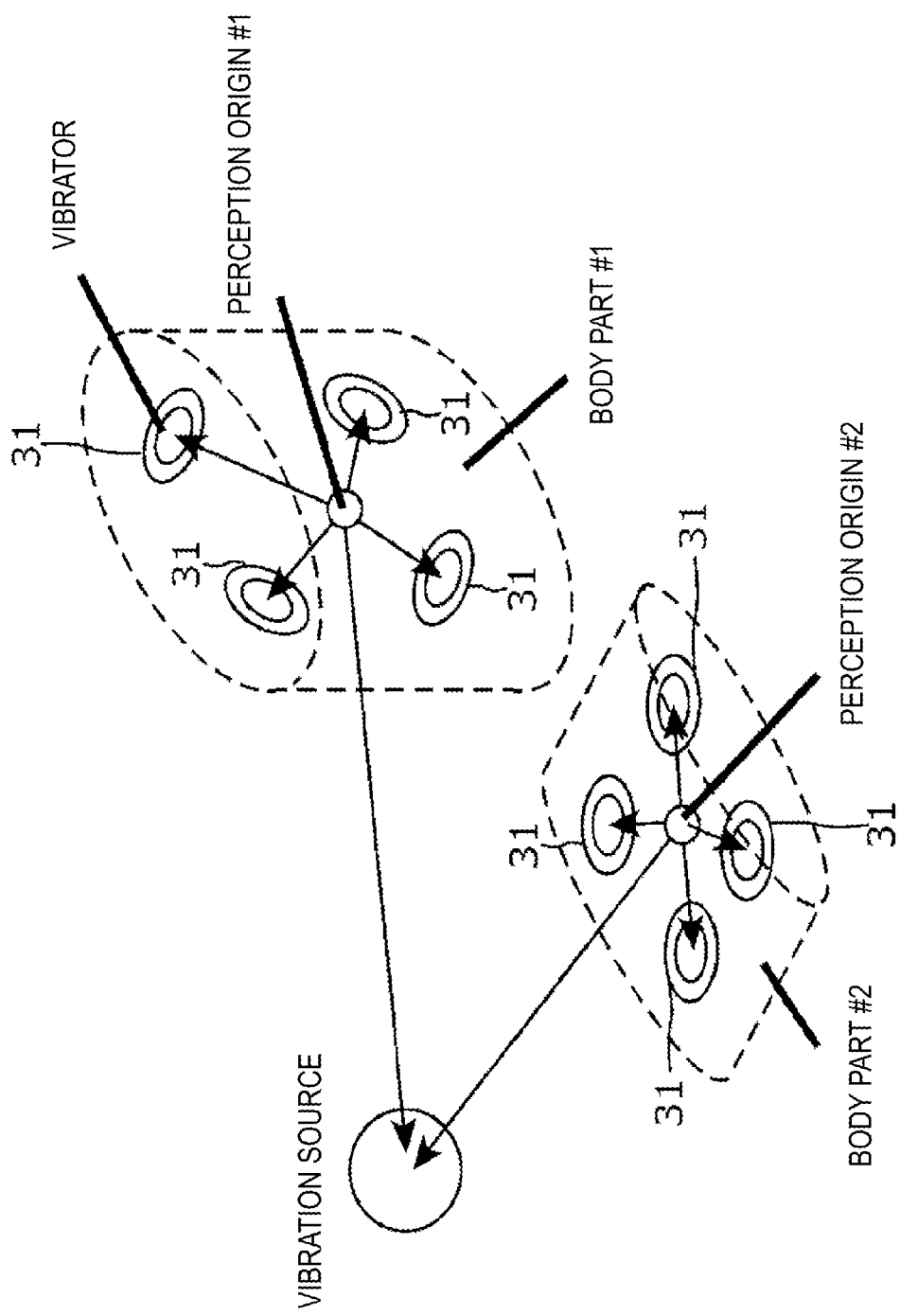
FIG. 5 is a diagram for describing an example in which independent perception origins are determined at a plurality of body parts in the perceived intensity distribution process illustrated in FIG. 1.

FIG. 5 is a diagram for describing an example in which independent perception origins are determined at a plurality of body parts in the perceived intensity distribution process illustrated in FIG. 1.

When vibrators 31 are arranged at separate body parts, two or more vibrators 31 may be arranged at each body part, and an independent perception origin may be determined for each region.

A large number of vibrators 31 may be arranged in advance, and a combination of vibrators 31 to be vibrated and the perception origin may be determined in accordance with the contact state with the body and the position of the vibration source. For example, tiles with vibrators 31 built therein may be spread all over the floor, a contact portion thereof with the body may be detected, and a combination of vibrators 31 to be vibrated may be dynamically rearranged every time the contact portion is detected.

When there are a plurality of divided body parts, different distance attenuation formulas may be used depending on the properties of a vibration medium with which each body part is in contact. For example, in a case that there are body parts divided into a foot portion (body part #2 in FIG. 5) in contact with the floor and a chest portion (body part #1 in FIG. 5) in contact with the air, the vibration source on the floor is easily transmitted to the foot portion and is not easily transmitted to the chest portion, and thus the distance attenuation formula of the foot portion can be set to be smaller. Typically used body parts include, but are not limited to, left and right sole buttocks, lower back, chest, upper back, palms, wrists, left and right forearms, head, and the like.

Figure 6:
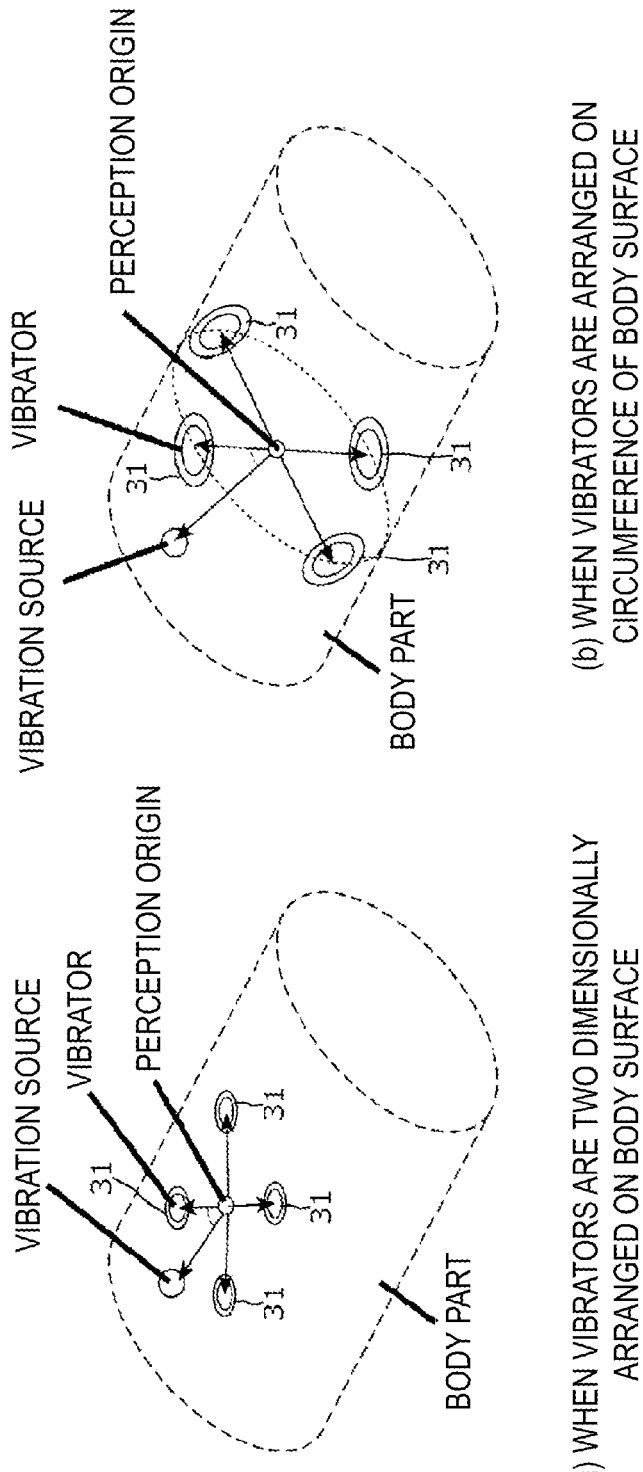
FIG. 6(a) is a diagram for describing a case in which vibrators are two dimensionally arranged on a body surface in the perceived intensity distribution process illustrated in FIG. 1.
FIG. 6(b) is a diagram for describing a case in which vibrators are arranged on a circumference of the body surface in the perceived intensity distribution process illustrated in FIG. 1.

FIG. 6(a) is a diagram for describing a case in which vibrators are two dimensionally arranged on a body surface in the perceived intensity distribution process illustrated in FIG. 1, and FIG. 6(b) is a diagram for describing a case in which vibrators are arranged on a circumference on the body surface in the perceived intensity distribution process illustrated in FIG. 1.

In FIG. 6(a), a bodily sensation can be generated such that the vibration source moves on the body surface of the body part. The vibration source may be present on the inner side of the vibrators 31.

In FIG. 6(b), a bodily sensation can be generated such that the vibration source can move inside the body in addition to on the body surface of the body part.

Figure 7:
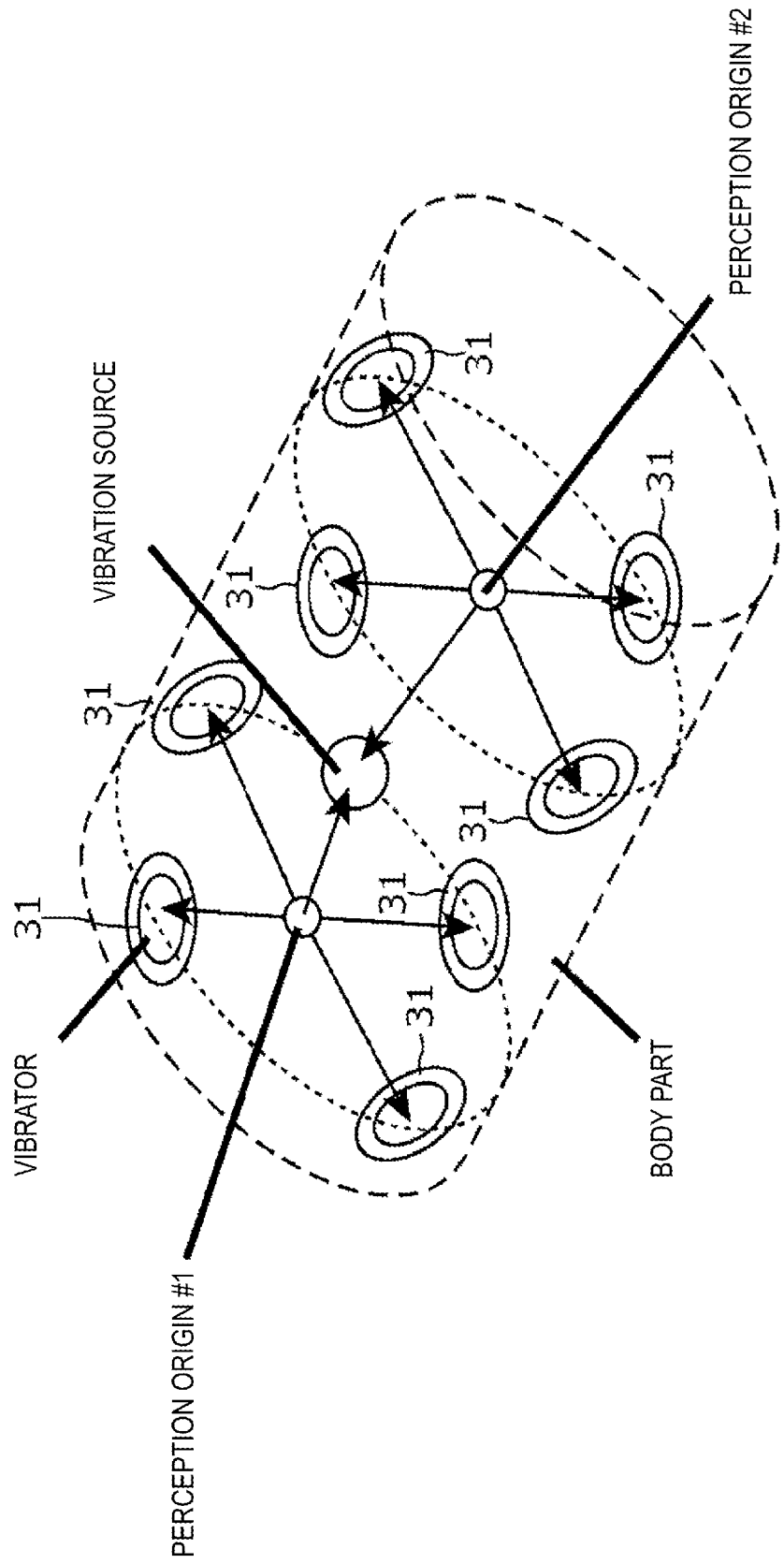
FIG. 7 is a diagram for describing a case in which two perception origins are provided on the body in the perceived intensity distribution process illustrated in FIG. 1.

FIG. 7 is a diagram for describing a case in which two perception origins are provided on the body in the perceived intensity distribution process illustrated in FIG. 1.

In FIG. 7, the first perception origin #1 is formed by four vibrators 31 on the circumference on the left side of the drawing, the second perception origin #2 is formed by four vibrators 31 on the circumference on the right side of the drawing, and a method for obtaining vectors from the respective perception origins to the vibration source is illustrated. Further, if the distance between the eight vibrators 31 is short, one perception origin may be provided near the center.

Figure 8:
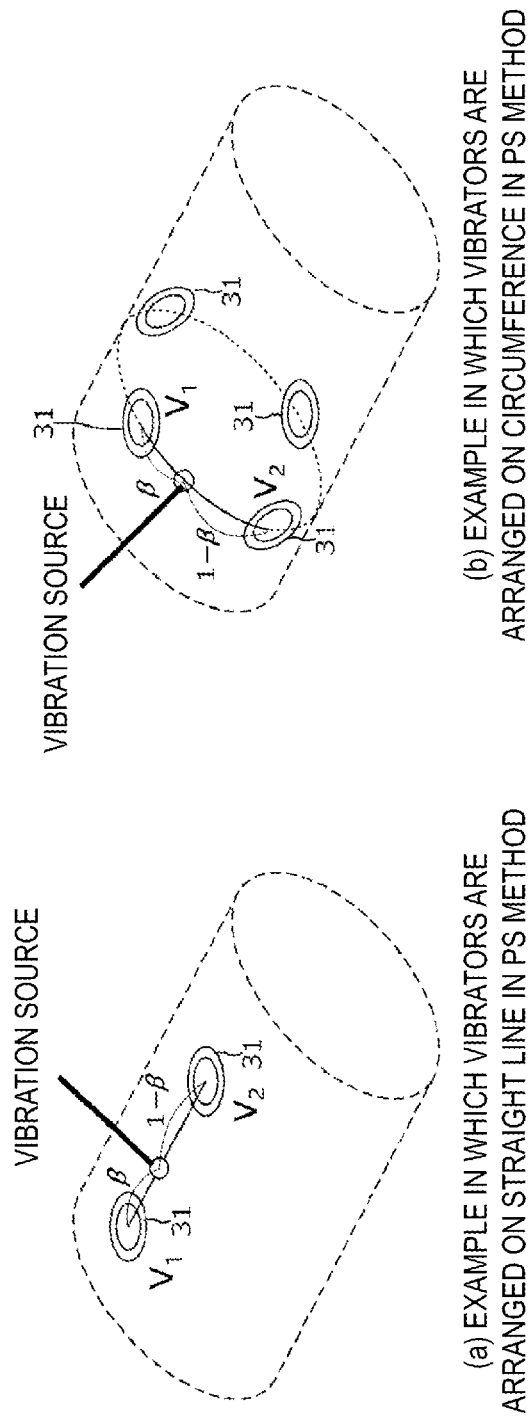
FIG. 8(a) is a diagram for describing an example in which vibrators are arranged on a straight line in the PS system of the related art.
FIG. 8(b) is a diagram for describing an example in which vibrators are arranged on a circumference in the PS method of the related art.

FIG. 8(a) is a diagram for describing an example in which vibrators 31 are arranged on a straight line in the PS system, and FIG. 8(b) is a diagram for describing an example in which vibrators 31 are arranged on a circumference in the PS method. In FIGS. 8(a) and 8(b), the vibration source is located on a straight line connecting the two vibrators 31 or on the circumference.

In FIGS. 8(a) and 8(b), the distribution coefficient is determined by the internal division ratio $\beta:1-\beta$ of the distance between the two vibrators 31 (V1 and V2). The distribution coefficient may be represented by an exponential function of the internal division ratio.

When the vibration source is on the straight line connecting the two vibrators 31 or on the circumference, the angle formed by the vectors from the perception origin to the vibration source and the vibrators 31 becomes 0 and the distribution coefficient cannot be obtained. In this case, the distribution coefficient may be determined based on the vibrators 31 and the ratio of the distance between the vibration source and the vibrators 31.

Figure 9:
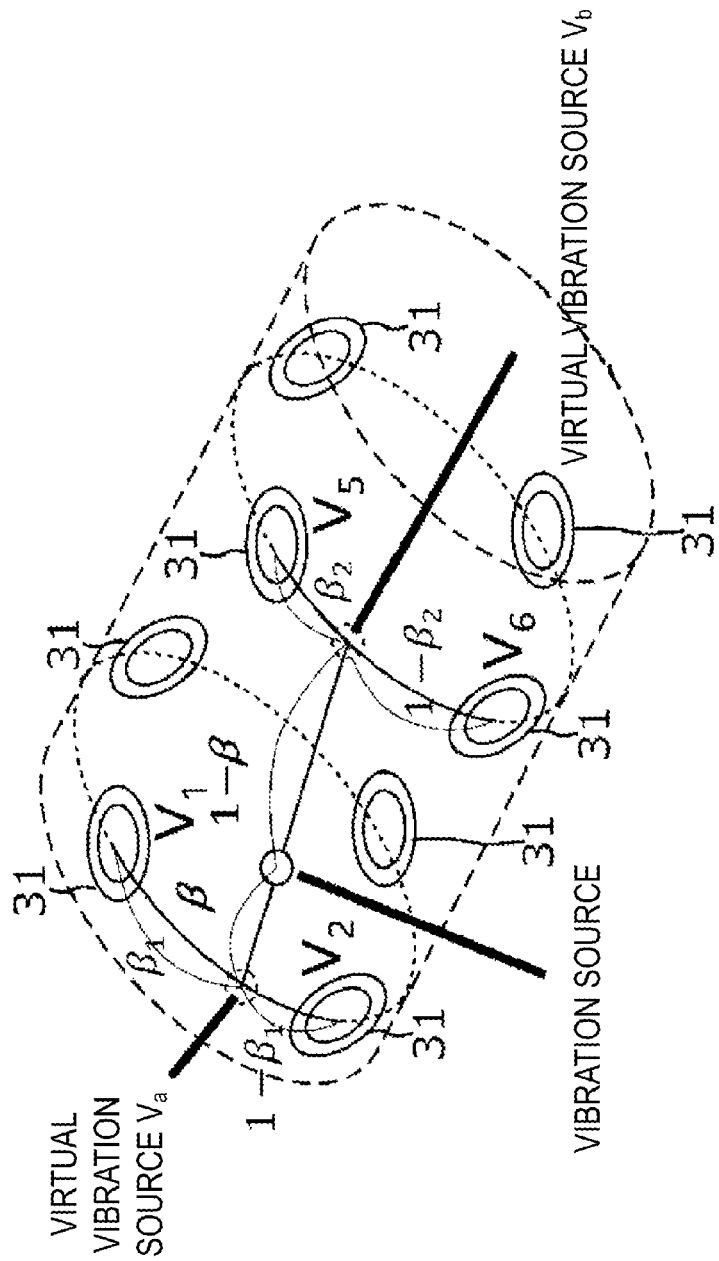
FIG. 9 is a diagram for describing an example in which another PS is generated by using a PS as an artificial vibration source in the perceived intensity distribution process illustrated in FIG. 1.

FIG. 9 is a diagram for describing an example in which another PS is generated by using a PS as a virtual vibration source in the perceived intensity distribution process illustrated in FIG. 1.

In FIG. 9, the distribution coefficients of vibrators $V_1$ and $V_2$ are determined such that a virtual vibration source $V_a$ is generated at the position of an internal division ratio $\beta_1:1-B_1$ of the distance between the vibrators 31 ($V_1$ and $V_2$). The distribution coefficients may be corrected by an exponential function. Similarly, a virtual vibration source $V_b$ is generated between vibrators $V_5$ and $V_6$. By using two virtual vibration sources $V_a$ and $V_b$, a vibration source to be presented is generated on a straight line connecting $V_a$ and $V_b$ based on an internal division ratio $\beta:1-\beta$ of the distance. The sum of the distribution coefficients of the four vibrators 31 is set to be constant.

Formulas for calculating the distribution coefficients and the perceived intensities of the vibrators $V_1$ and $V_2$ are expressed as follows, for example. $\gamma$ is an exponent value for obtaining a distribution coefficient from the internal division ratio $\beta$.

$$g_1 = (1 - \beta)^\gamma, \; g_2 = \beta^\gamma \qquad \text{[Math 14]}$$
$$I_1 = g_1 I, \; I_2 = g_2 I,$$

Figure 10:
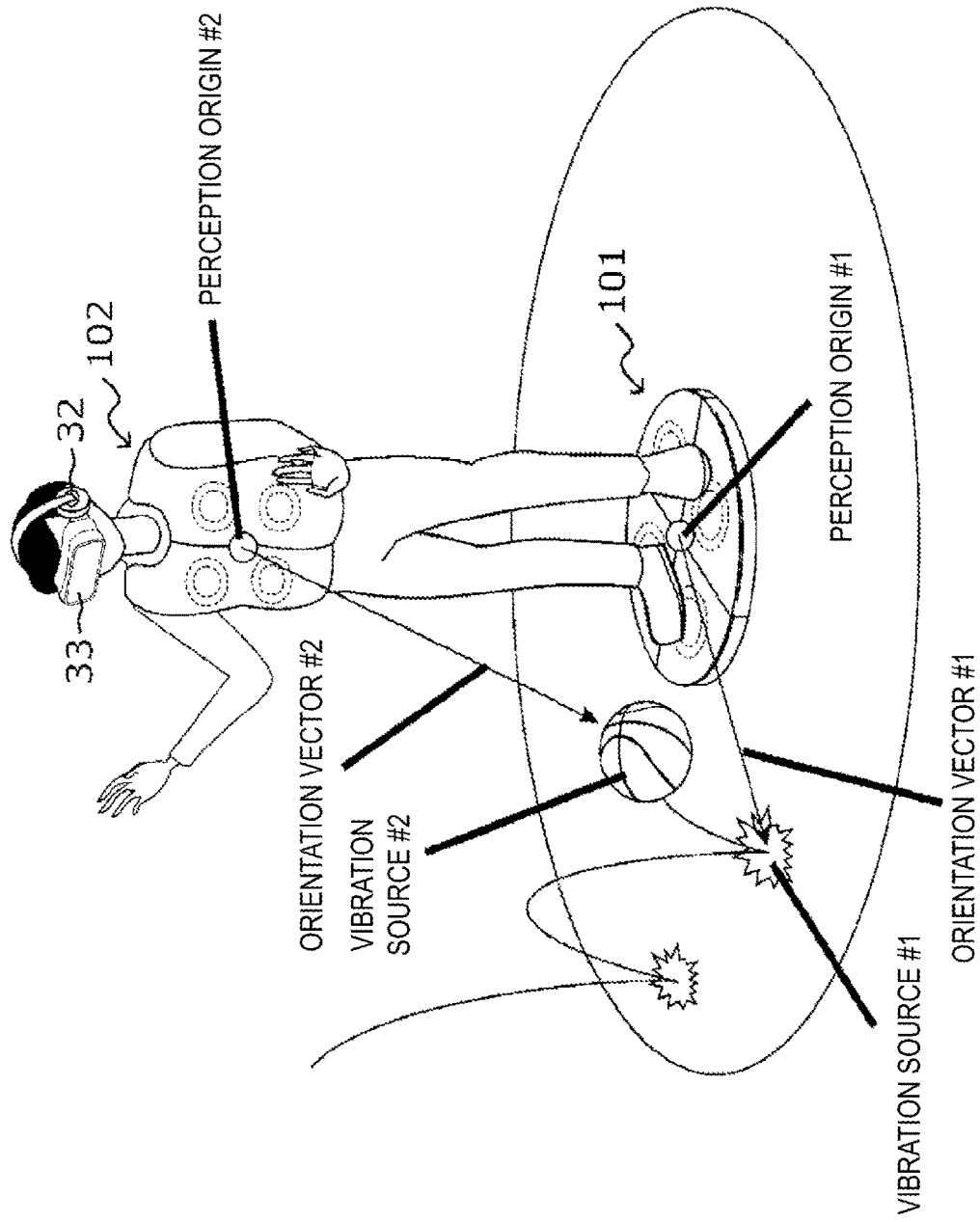
FIG. 10 is a diagram illustrating an example in which the perceived intensity distribution process is applied to a floor-mounted vibration device and a wearable vibration device.

FIG. 10 is a diagram illustrating an example in which the perceived intensity distribution process is applied to a floor-mounted vibration device 101 and a wearable vibration device 102.

In FIG. 10, an example in which visual presentation by a display device 33 such as VR goggles, stereophonic sound from headphones 32, and the floor-mounted vibration device 101 and the wearable vibration device 102 are combined.

A perception origin #1 has vibrators 31 (four vibrators in the drawing) of the floor-mounted vibration device 101. A perception origin #2 has vibrators 31 (four vibrators in the drawing) of the wearable vibration device 102. Further, in FIGS. 10 to 15, reference numeral 31 is not indicated.

A vibration source #1 represents a collision with the floor, and the perceived intensity of the vibration source #1 is mainly transmitted to the perception origin #1, and a relatively small intensity is transmitted to the perception origin #2. The transmission is realized by reducing the attenuation effect of the distance attenuation formula from the vibration source #1 to the perception origin #1 and relatively increasing the attenuation effect of the distance attenuation formula from the vibration source #1 to the perception origin #2.

The vibration source #2 represents a vibration source floating in the air, and the perceived intensity of the vibration source #2 is mainly transmitted to the perception origin #2. The transmission is realized by reducing the attenuation effect of the distance attenuation formula from the vibration source #2 to the perception origin #2 and relatively increasing the attenuation effect of the distance attenuation formula from the vibration source #2 to the perception origin #1.

Figure 11:
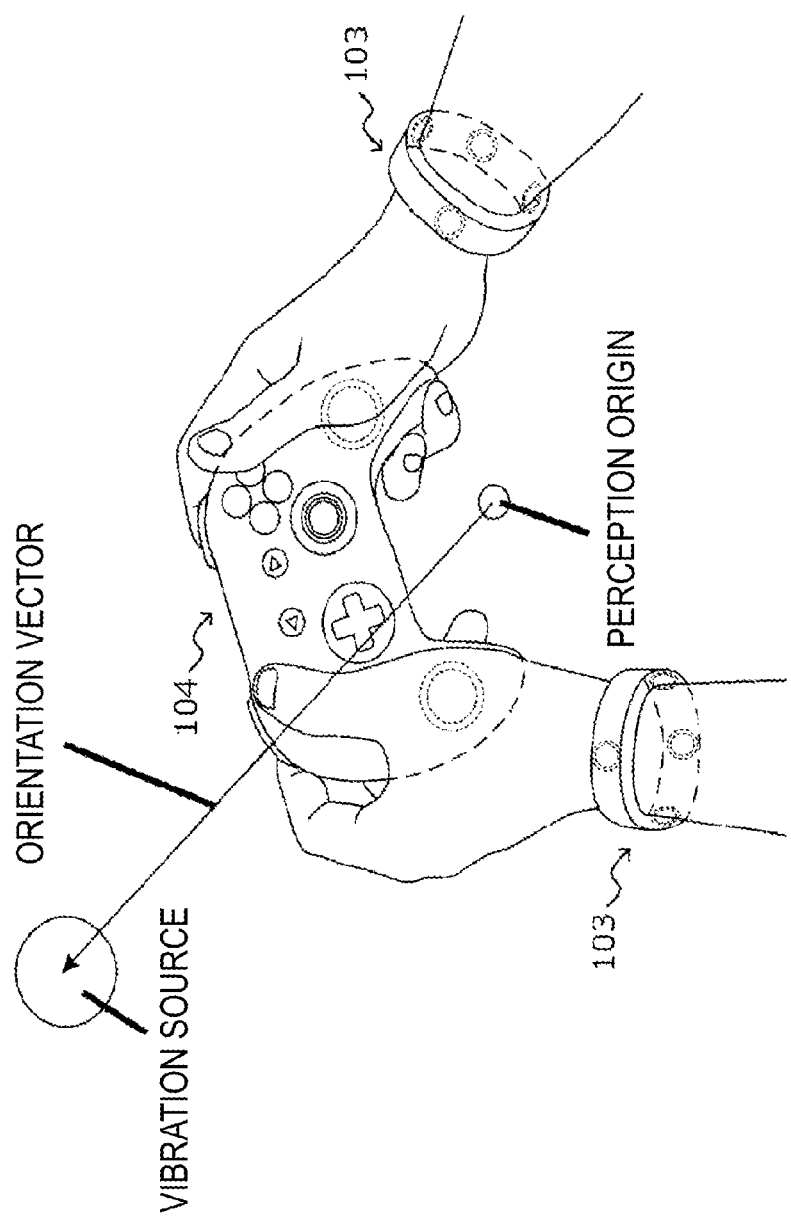
FIG. 11 is a diagram illustrating an example in which the perceived intensity distribution process in the case that one perception origin is provided is applied to a wristband-type vibration device and a game controller.

FIG. 11 is a diagram illustrating an example in which the perceived intensity distribution process in the case that one perception origin is provided is applied to wristband-type vibration devices 103 and a game controller 104.

In FIG. 11, an example in which vibrators 31 of the game controller 104 held by both hands and the wristband-type vibration devices 103 are combined to localize the vibration source outside is illustrated. The wristband-type vibration device #1 is worn on the left hand and the wristband-type vibration device #2 is worn on the right hand. In this example, four vibrators 31 are arranged in a ring shape and incorporated in each of the wristband-type vibration devices 103. The game controller 104 incorporates two vibrators 31 on the left and right sides. The game controller 104 and the two wristband-type vibration devices 103 wirelessly communicate with each other by Bluetooth (registered trademark) or the like, and all the vibrators 31 are driven in synchronization with each other.

All the vibrators 31 of the game controller 104 and the two wristband-type vibration devices 103 constitute a perception origin.

By obtaining the distribution coefficient of the perceived intensity according to the orientation of the orientation vector of the vibration source from the perception origin and the orientation of the vector to each vibrator 31, the vibration source outside can be localized.

Figure 12:
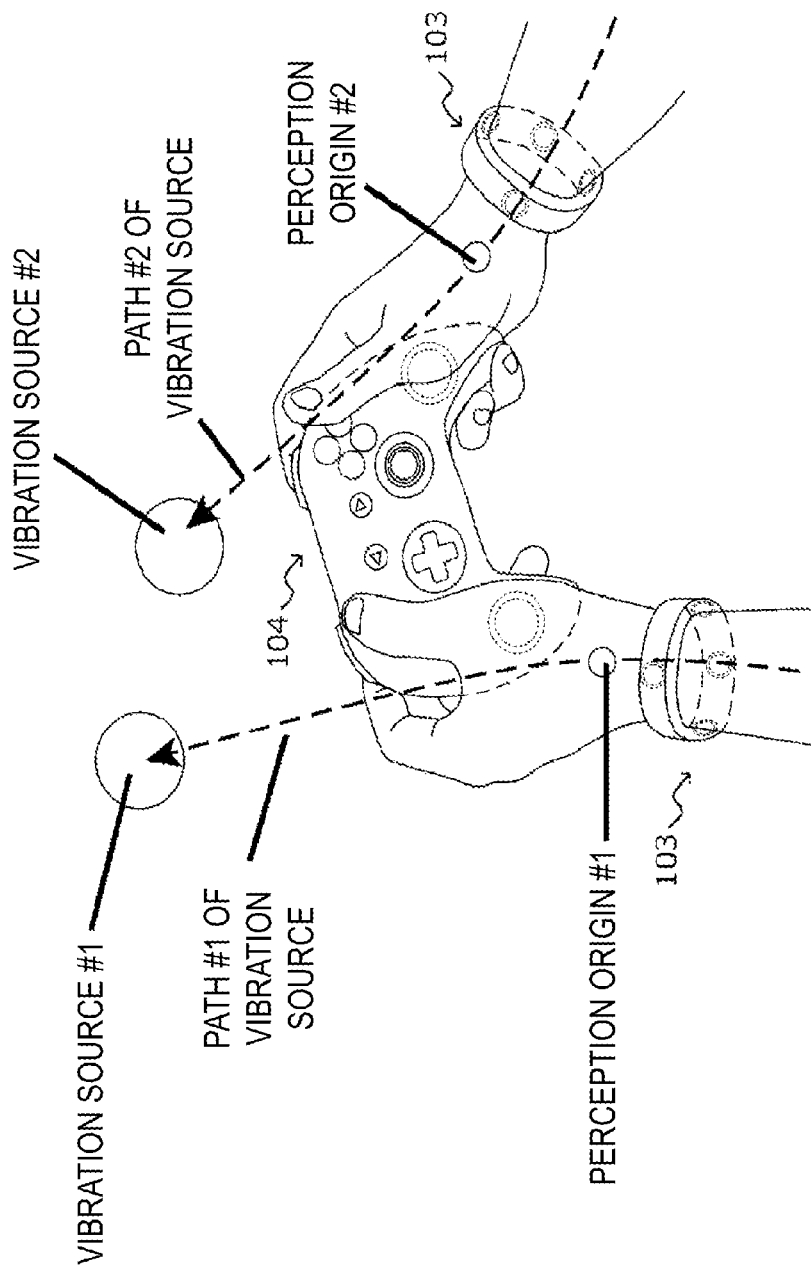
FIG. 12 is a diagram illustrating an example in which the perceived intensity distribution process in the case that two perception origins are provided is applied to a wristband-type vibration device and a game controller.

FIG. 12 is a diagram illustrating an example in which the perceived intensity distribution process in a case that two perception origins are provided is applied to wristband-type vibration devices 103 and a game controller 104.

In FIG. 12, the left vibrator 31 of the game controller 104 and the vibrator 31 of the wristband-type vibration device 103 (#1) on the left hand constitute the perception origin #1, and localize the vibration source #1. In addition, the right vibrator 31 of the game controller 104 and the vibrator 31 of the wristband-type vibration device 103 (#2) on the left hand constitute the perception origin #2, and localize the vibration source #2. In this way, the left and right hands can be made to experience the vibration sources independently.

In this example, it is possible to express a bodily sensation as if the vibration sources were ejected from the inside of the body by moving the left and right vibration sources so as to penetrate from the inside of the arms to the front of the hands as indicated by path #1 and path #2. The timing of the ejection may be synchronized by operating the left and right buttons of the game controller 104 to generate bodily sensations independently on the left and right sides.

Figure 13:
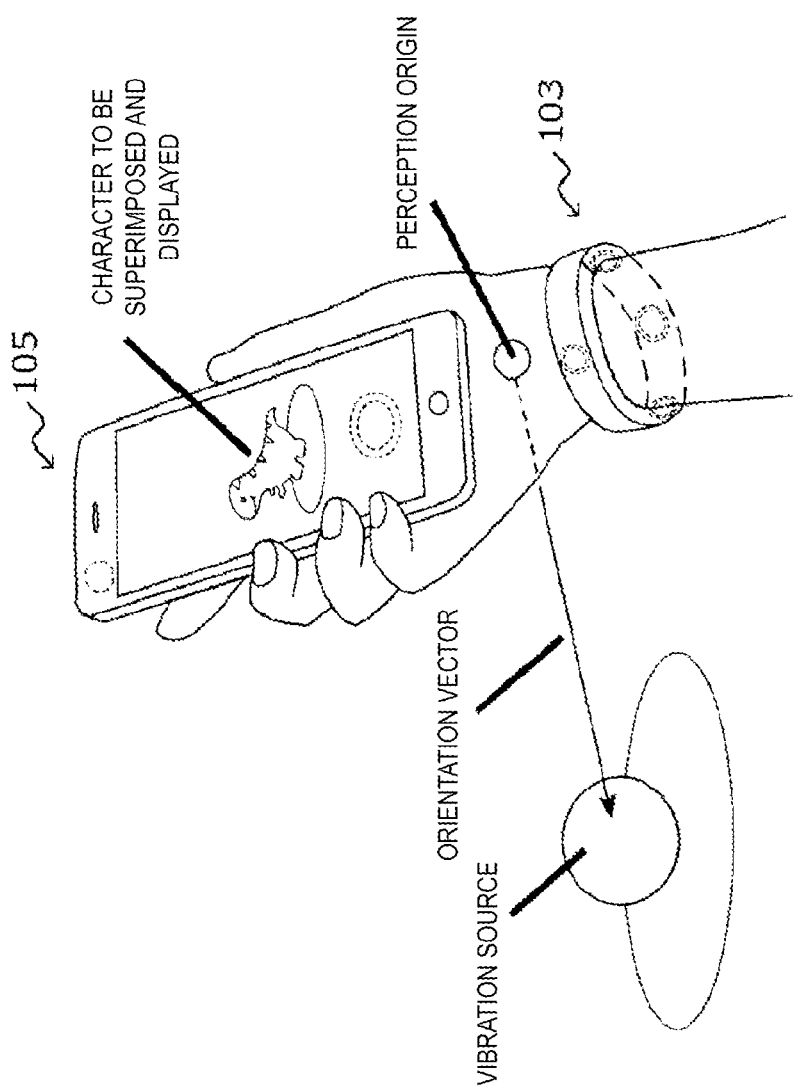
FIG. 13 is a diagram illustrating an example in which the perceived intensity distribution process of external augmented reality (AR) is applied to a wristband-type vibration device and a smartphone.

FIG. 13 is a diagram illustrating an example in which the perceived intensity distribution process for external AR is applied to a wristband-type vibration device 103 and a smartphone 105.

In FIG. 13, a configuration example of an AR system in which the smartphone 105 and the wristband-type vibration device 103 are combined to cause a user to experience an outside world is illustrated. A position and an orientation to be photographed by a camera are specified by using a GPS, a geomagnetic sensor, an inertial sensor or the like mounted on the smartphone 105 which can be held by a user, and a character or the like is superimposed on the screen of the smartphone 105 and displayed in the real environment photographed by the camera. The smartphone 105 and the wristband-type vibration device 103 wirelessly communicate with each other by Bluetooth or the like, and all the vibrators 31 are driven in synchronization with each other.

The (one) vibrator 31 of the smartphone 105 and the vibrators (four in the illustrated example) 31 of the wristband-type vibration device 103 constitute a perception origin.

By matching the position of the character to be mapped in the real world with the position of the vibration source, even when the character is not captured by the camera, bodily sensation information based on the orientation and distance of the character and the motion of the character is presented by using the bodily sensation, and the sense of reality of the character can be emphasized.

Figure 14:
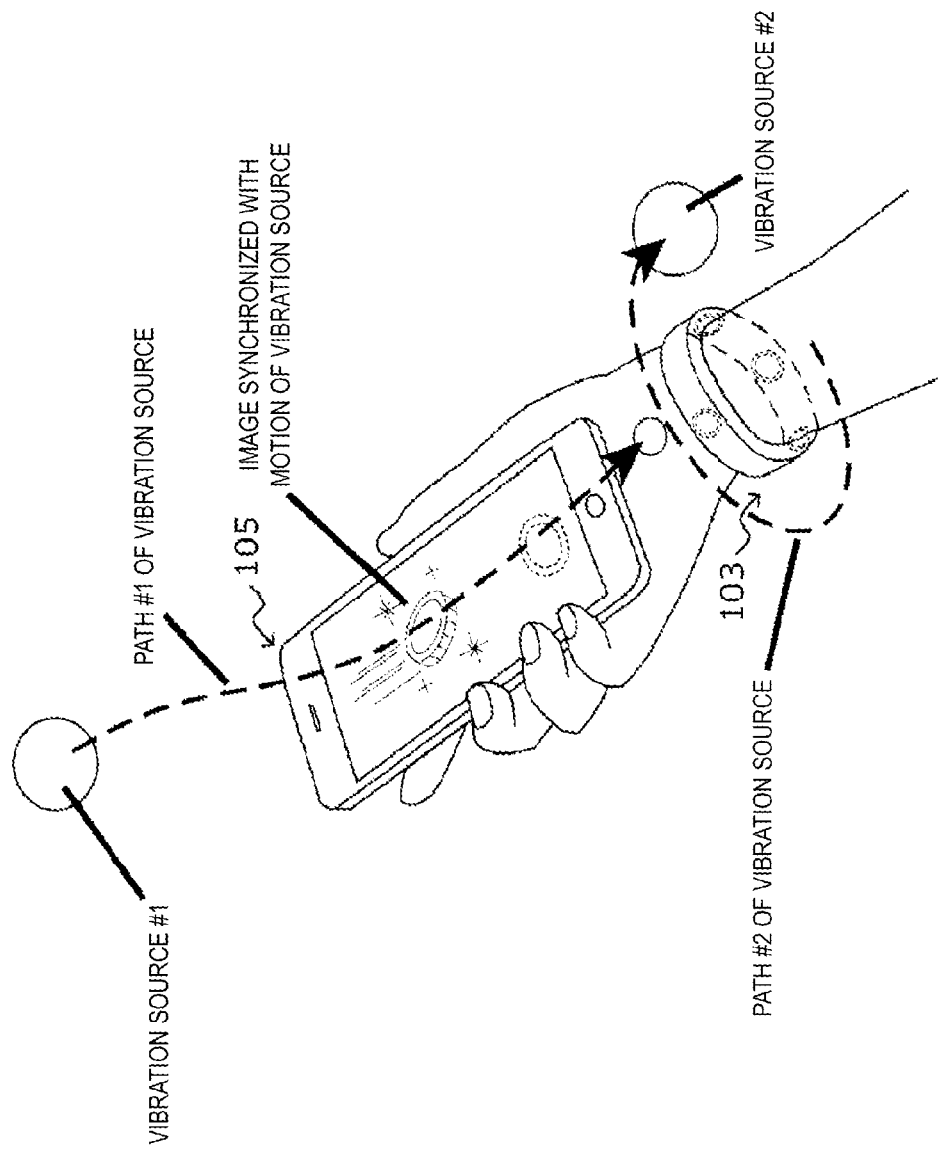
FIG. 14 is a diagram illustrating an example in which the perceived intensity distribution process for a body is applied to a wristband-type vibration device and a smartphone.

FIG. 14 is a diagram illustrating an example in which the perceived intensity distribution process on a body is applied to a wristband-type vibration device 103 and a smartphone 105.

In FIG. 14, an example in which the smartphone 105 and the wristband-type vibration device 103 are combined to give a bodily sensation as if a vibration source passed through the body is illustrated.

A vibration source #1 is moved through a path #1. In this example, a bodily sensation is presented as if a vibration source were taken into the user's body from the outside world via the smartphone 105. A vibration source #2 is moved through a path #2. In this example, a bodily sensation that the vibration source goes around and near the arm of the user can be given. As a result, a bodily sensation synchronized with operations and images of the smartphone 105 can be experienced in conjunction with the wristband-type vibration device 103.

In FIGS. 10 to 14, the vibration source may be determined by a vibration of an artificial object or may be determined by a recorded vibration of a real object. When a vibration source is determined by a vibration of an artificial object, the vibration source may be determined based on the video or the like viewed by the user, and the perceived intensity may be distributed to each vibrator 31 in accordance with the vibration source. On the other hand, when a vibration source is determined by a recorded vibration of a real object, for example, the vibration source may be determined by the collision of a ball with the floor surface, and the perceived intensity may be emphasized and distributed to each vibrator 31 according to the vibration source.

Figure 15:
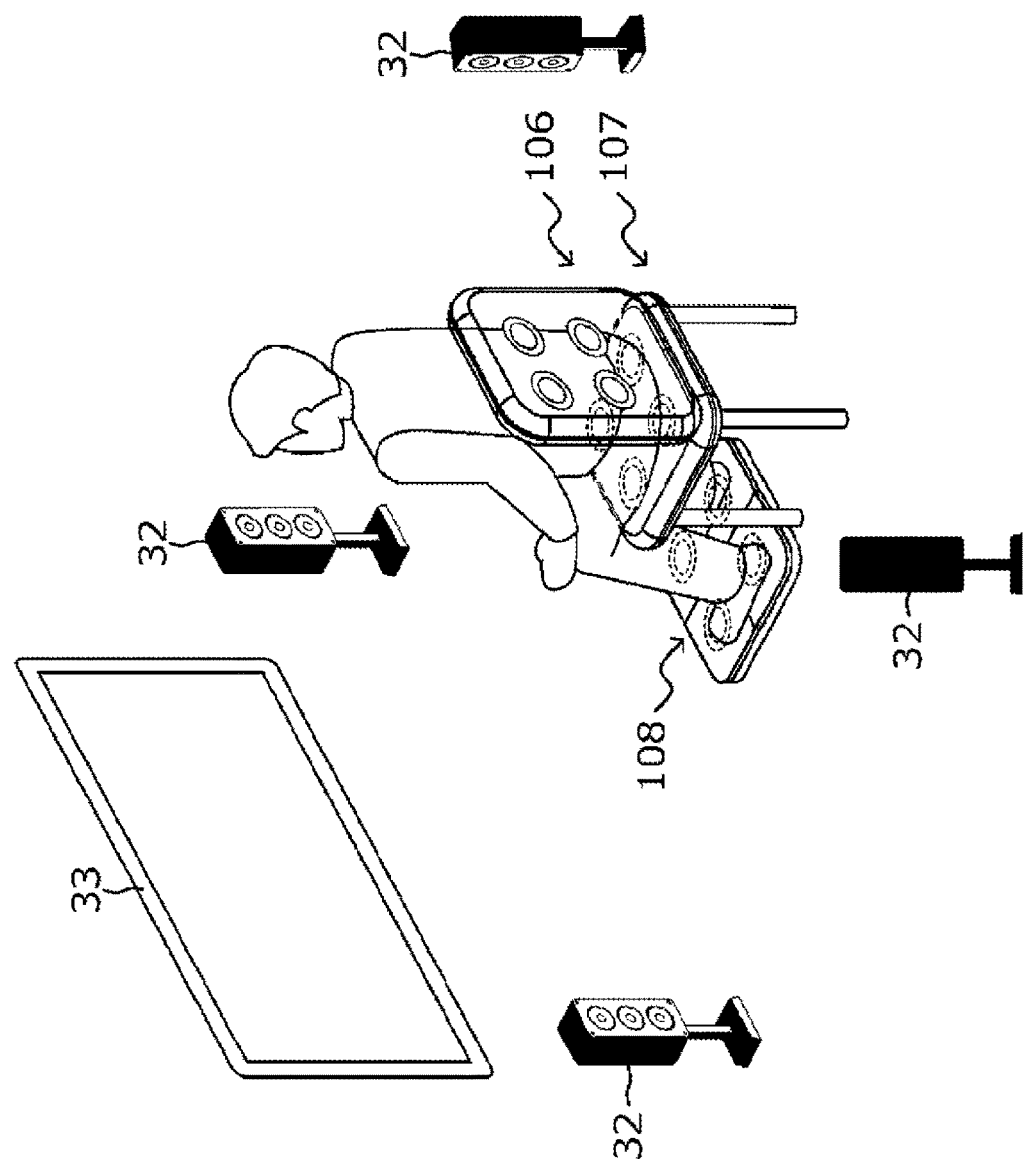
FIG. 15 is a diagram illustrating an example in which the perceived intensity distribution process is integrated into speakers and a display device.

FIG. 15 is a diagram illustrating an example in which the perceived intensity distribution process is integrated into speakers 32 and a display device 33.

In FIG. 15, a system including a display device 33 such as a video screen, speakers 32 such as a stereophonic speaker system, and vibration devices 106 to 108 each on a back surface, a seat surface, and a floor surface is illustrated. By matching the sound source position localized by the stereophonic sound with the vibration source position, the sense of localization of the content can be improved and the sense of presence can be reinforced. In addition, by localizing the vibration source outside the screen, the presence of an object not appearing on the video screen can be perceived. Furthermore, by localizing acoustic information of a specific target as a vibration source, or localizing a plurality of targets as vibration sources individually, a sense of presence of the targets can be experienced individually. For example, in a video of a live concert or the like, a vibration source may be set in accordance with the position of each musical instrument, the perceived intensity may be individually calculated from the acoustic signal of each musical instrument, and the musical instrument may be localized at the position of each vibration source.

Figure 16:
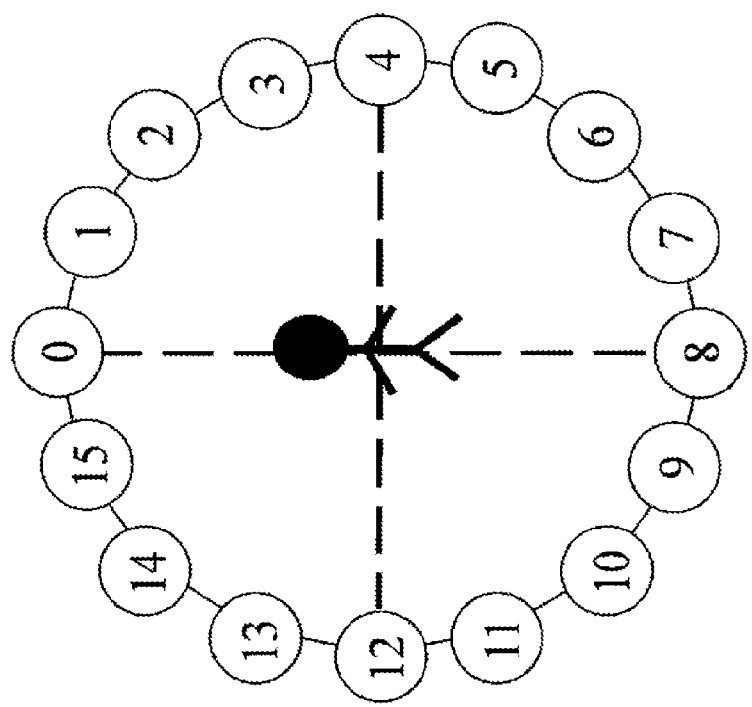
FIG. 16(a) is a diagram for describing a reference stimulus in a confirmation test for a sense of orientation and a vibration intensity.
FIG. 16(b) is a diagram for describing a method for responding with a perceived orientation in the confirmation test for a sense of orientation and vibration intensity.
Figure 16:
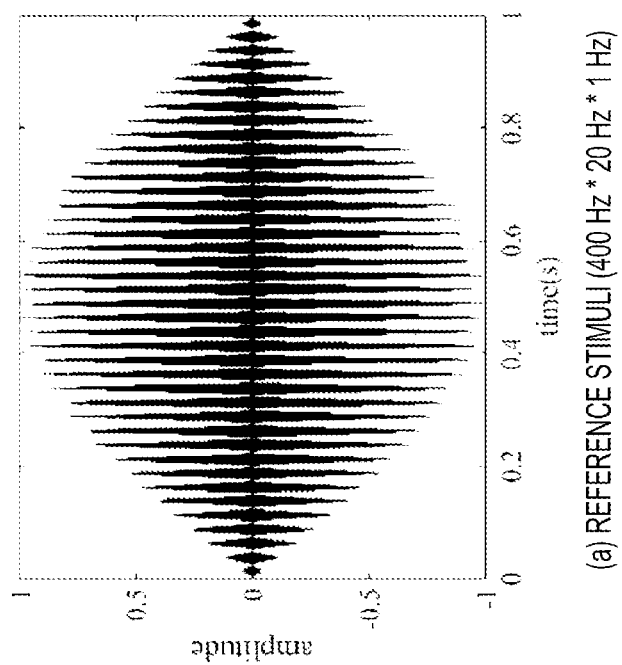

FIG. 16(a) is a diagram for describing a reference stimulus in the confirmation test for a sense of orientation and a vibration intensity, and FIG. 16(b) is a diagram for describing a method for responding with a perceived orientation in the confirmation test for a sense of orientation and a vibration intensity.

In the confirmation test for a sense of orientation and a vibration intensity, the sense of orientation and the vibration intensity when a vibration source generated outside the body is presented as a sense that the vibration is transmitted from the ground to the sole by the four vibrators 31 are investigated.

The experiment was conducted according to the following procedure.
 1. Presentation of a reference stimulus (see FIG. 16(a)) and a test stimulus
 2. Cause to respond with a perceived intensity
 3. Presentation of the same test stimulus as 1
 4. Cause to respond with a perceived direction With reference to the intensity 10 which is the reference stimulus, test subjects were free to respond with an integer such as 20 which is double the intensity and 5 which is half the intensity. For direction, the subject responded with a number from 0 to 15 with reference to FIG. 16(b).

As experimental conditions, the intensity of the test stimulus was constant, and eight conditions in eight directions (0 to 315°, 45° increments) were presented. The test subjects were five adult males, and the number of trials was 50 (8 conditions×6+dummy stimuli with double amplitude×2).

Figure 17:
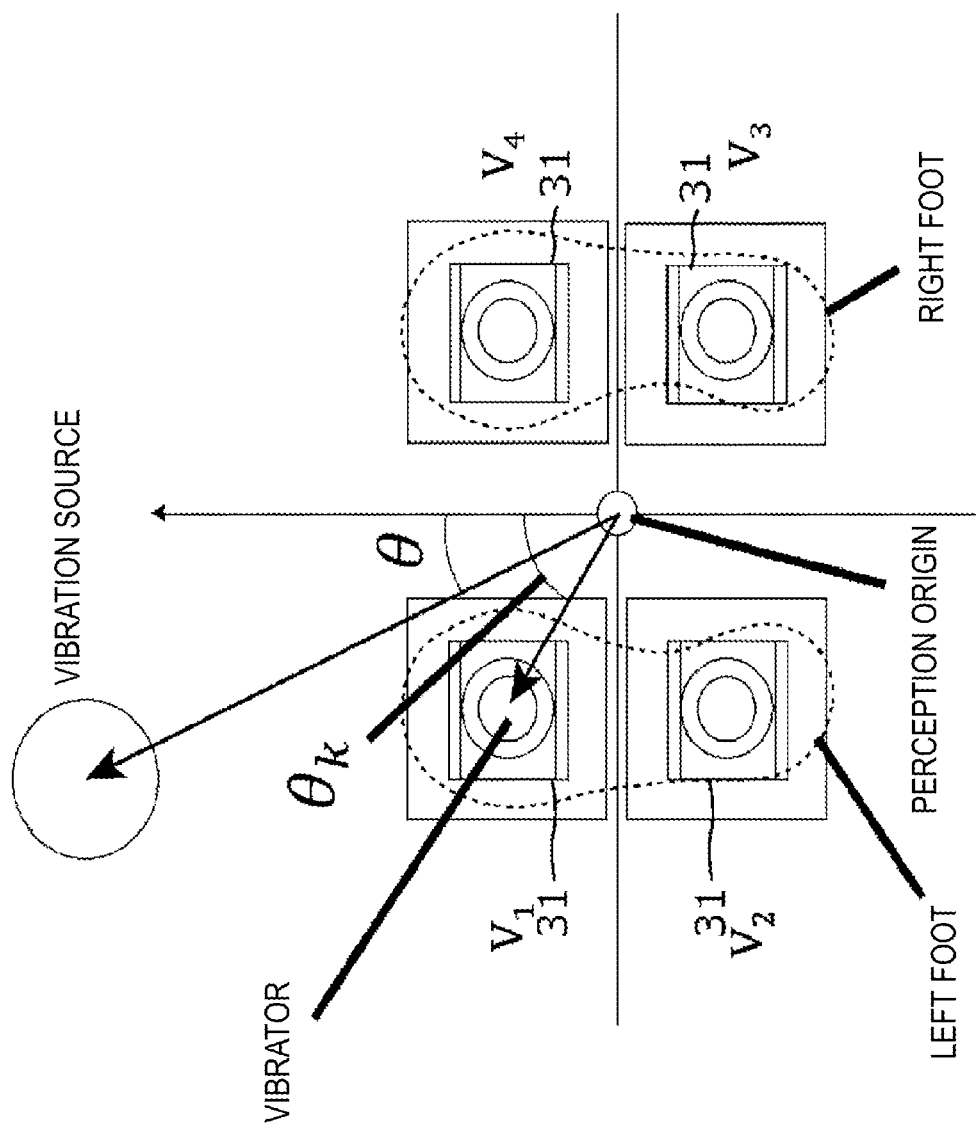
FIG. 17 is a diagram for describing an arrangement relationship between vibrators and a vibration source in the confirmation test for a sense of orientation and vibration intensity.

FIG. 17 is a diagram for describing an arrangement relationship between vibrators 31 and a vibration source in the confirmation test for a sense of orientation and vibration intensity.

As illustrated in FIG. 17, the vibrators 31 ($V_1$ to $V_4$) were arranged one by one in four quadrants on a two-dimensional coordinate axis plane centered on a perception origin. The left foot was placed on the vibrators $V_1$ and $V_2$, and the right foot was placed on the vibrators $V_3$ and $V_4$. The direction from the perception origin to the vibration source was set as θ, and the direction from the perception origin to a vibrator $V_k$ was defined as $θ_k$.

Figure 18:
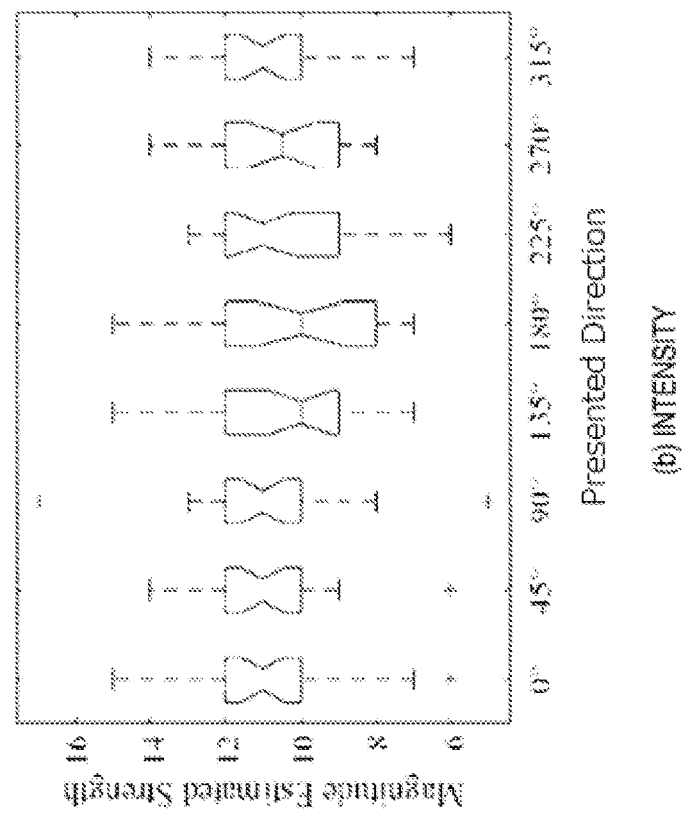
FIG. 18(a) is a graph showing response results for direction in the confirmation test for a sense of orientation and vibration intensity.
FIG. 18(b) is a graph showing response results for intensity in the confirmation test.
Figure 18:
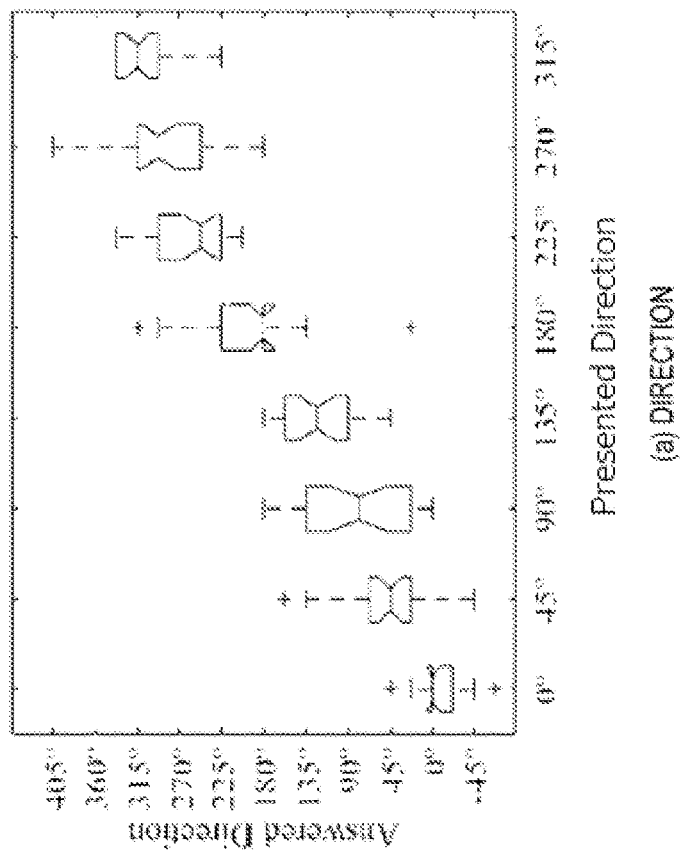

FIG. 18(a) is a graph showing response results for direction in the confirmation test for a sense of orientation and vibration intensity, and FIG. 18(b) is a graph showing response results for intensity in the confirmation test.

In the response results for direction shown in FIG. 18(a), it can be seen that the results were made in the intended presentation directions. Directional dependency is likely to be admitted. For example, it is shown that the dispersion of the vibration in the longitudinal direction (0°, 180°), which is the direction of the toe or heel, was small, and the vibration in the longitudinal direction was more easily identified.

In the response results for intensity shown in FIG. 18(b), it is seen that substantially constant intensities can be presented regardless of the orientation. In light of these experimental results, although the test subjects responded with intensities higher than that of the reference stimulus (10) as a whole, the reason is thought that the frequency characteristic of the vibrators when the frequency was converted by ISM was not considered.

Figure 19:
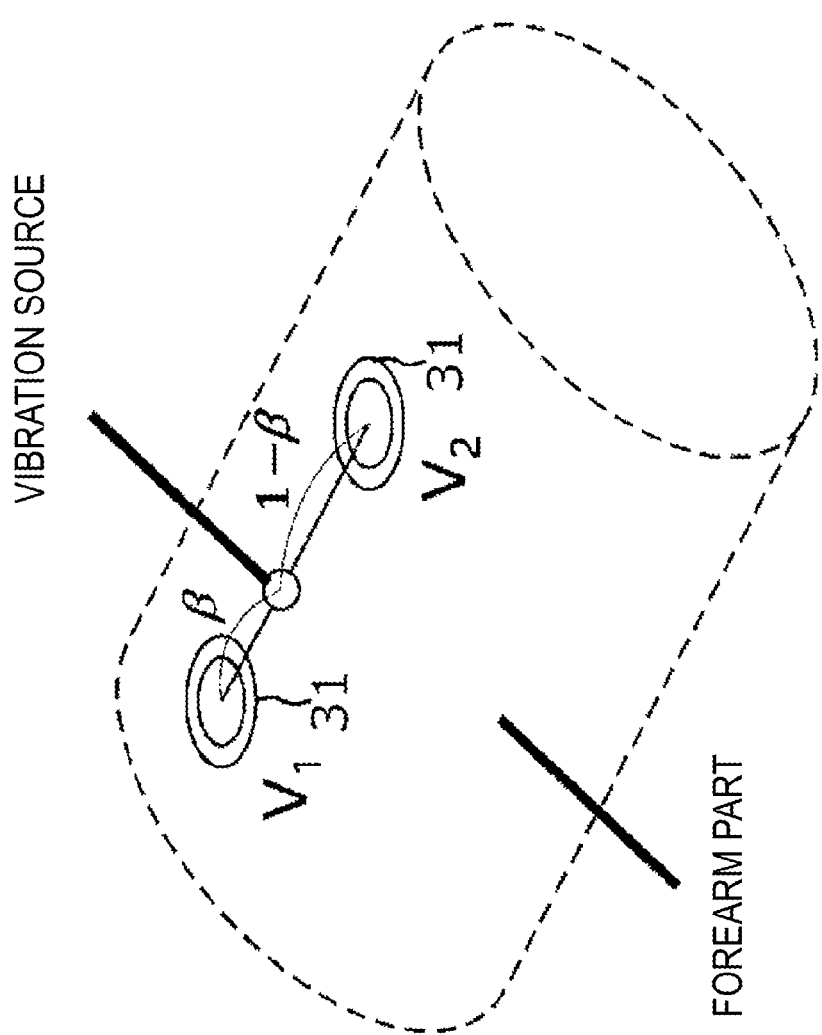
FIG. 19 is a diagram for describing an arrangement relationship between vibrators and a vibration source in an experiment in which a PS on a body is controlled at a perceived intensity.

FIG. 19 is a diagram for describing an arrangement relationship between vibrators 31 and a vibration source in an experiment in which PS on a body is controlled at a perceived intensity.

In the experiment illustrated in FIG. 19, a feeling that predetermined vibration made by the two vibrators 31 is transmitted while moving on the body surface of the forearm is presented.

An intensity ratio of each vibrator 31 is determined for PS generation. The formula for determining a distribution coefficient $g_k$ is as follows. β is an internal division ratio ($0 \leq β \leq 1$) of the position of the vibration source to be presented, and γ is an exponential coefficient for correcting the distribution coefficient.

$$g_1 = (1-\beta)\gamma, \ g_2 = \beta\gamma \qquad \text{[Math 15]}$$

When the perceived intensity presented by the vibration source is set to I, the perceived intensities distributed to the vibrators $V_1$ and $V_2$ are $I_1 = g_1 I$ and $I_2 = g_2 I$.

Figure 20:
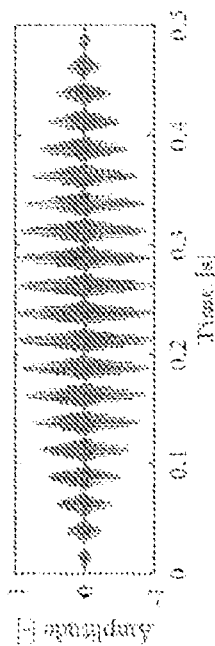
FIG. 20(a) is a graph showing a stimulus presented before ISM conversion in an experiment in which PS on a body is controlled at a perceived intensity.
FIG. 20(b) is a graph showing a stimulus to a vibrator V1 in the experiment.
FIG. 20(c) is a graph showing a stimulus to a vibrator V2 in the experiment.
Figure 20:

FIG. 20(a) is a graph showing a stimulus presented before an ISM conversion in an experiment in which PS on a body is controlled at a perceived intensity, FIG. 20(b) is a graph showing a stimulus to a vibrator $V_1$ in the experiment, and FIG. 20(c) is a graph showing a stimulus to a vibrator $V_2$ in the experiment.

In order to identify γ at which the perceived intensity is constant, the experiment was conducted according to the following procedure.
 1. Adjust the intensities of the two vibrators to be the same.
 2. Present stimuli in the order of β=0, 0.5, 1.
 3. Cause to respond with whether the three stimulus intensities are equal.
 4. This process is repeated by changing γ to identify it by using a staircase method.

When β=0.25 and γ=1, a stimulus to the vibrator $V_1$ shown in FIG. 20(b) and a stimulus to the vibrator $V_2$ shown in FIG. 20(c) are presented with respect to the presented stimulus before the ISM conversion shown in FIG. 20(a).

Figure 21:
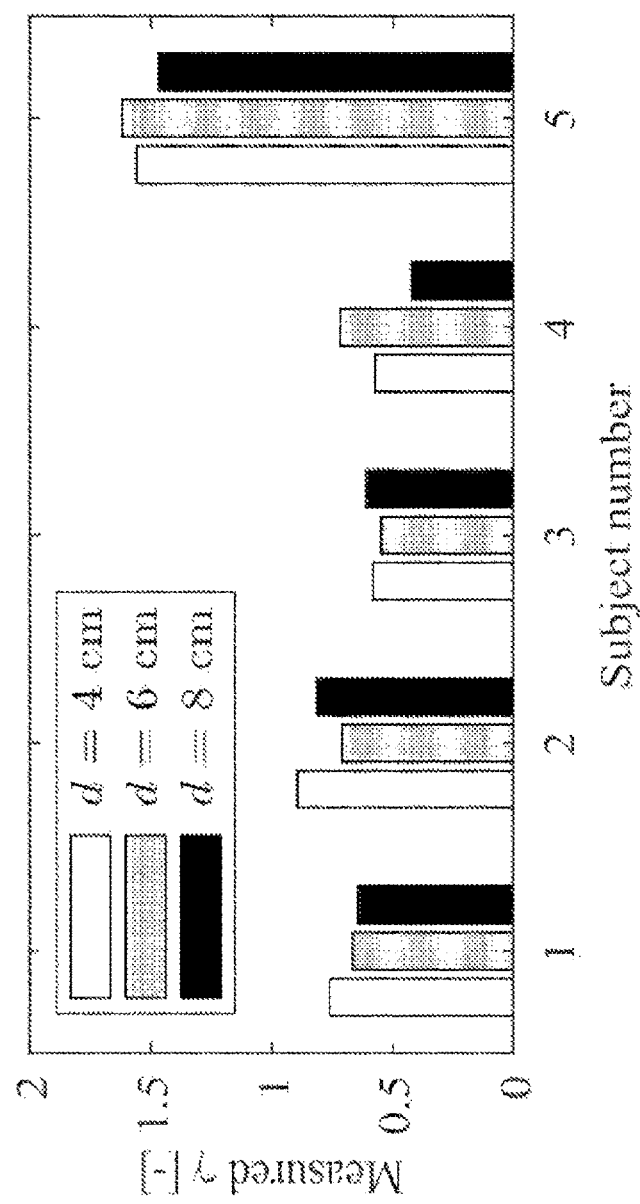
FIG. 21 is a graph showing the results of the experiment in which PS on the body is controlled by using perceived intensities.

FIG. 21 is a graph showing the results of the experiment in which PS of the body is controlled at the perceived intensity.

When γ was about 0.6 to 0.8, many of the four test subjects sensed that the perceived intensity of the stimuli was constant. It was suggested that the perceived intensity can be made uniform with a constant parameter regardless of the distance d between the vibrators 31. In addition, when stimuli were given at five points (β=0, 0.25, 0.5, 0.75, 1) again after the identification of γ, a response that there was no sense of discomfort even if it was thought that the presentation positions of the stimuli moved at equal intervals was obtained.

[A-2] Vibration Generation System

Figure 22:
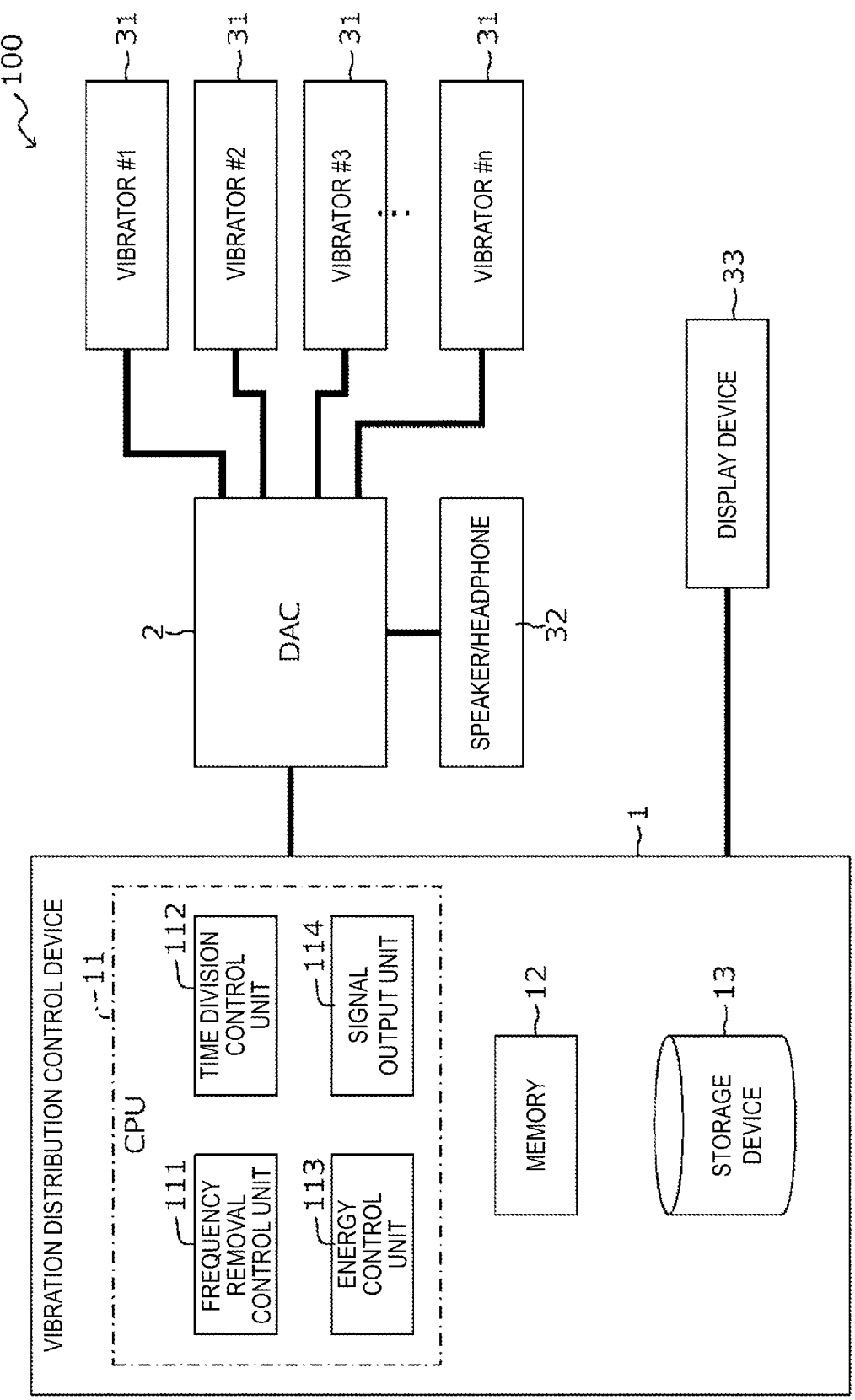
FIG. 22 is a block diagram schematically illustrating a configuration example of a vibration generation system as an embodiment.

FIG. 22 is a block diagram schematically illustrating a configuration example of a vibration generation system 100 as an embodiment.

The vibration generation system 100 includes a vibration distribution control device 1, a digital-analog converter (DAC) 2, n vibrators 31 (#1 to #n), a speaker/headphone 32, and a display device 33. Different types of vibrators 31 may be combined.

The DAC 2 may be called a Universal Serial Bus (USB) audio and converts a digital signal input from the vibration distribution control device 1 into an analog signal. Then, the DAC 2 outputs the converted analog signal to the vibrators 31 and the speaker/headphone 32. Further, an amplifier, which is not illustrated, for driving the vibrators 31 and the speaker/headphone 32 may be provided at a subsequent stage of the DAC 2.

The display device 33 is a liquid crystal display, an organic light-emitting diode (OLED) display, a cathode ray tube (CRT), an electronic paper display, or the like, and displays various kinds of content for a person output from the vibration distribution control device 1.

The vibration distribution control device 1 includes a central processing unit (CPU) 11, a memory 12, and a storage device 13.

The vibration distribution control device 1 according to an example of the present embodiment may perform a tactile signal conversion of acoustic information such as music, a movie, and voice. When a frequency exceeds about 300 to 400 Hz, a vibration can be heard as sound that becomes noise. For this reason, in a vibration sensing device for music, moving images, or the like in the related art, a low-pass filter is applied at about several hundred Hz to cut a high-frequency band in many cases. On the other hand, in the vibration distribution control device 1 according to an example of the present embodiment, a waveform in a high-frequency band is converted into another frequency in a low-frequency band and is output.

In addition, the vibration distribution control device 1 according to an example of the present embodiment may modulate a high-frequency vibration generated when an object comes into contact with an environment into a frequency band that can be perceived by a human. By transmitting the vibration generated when the object comes into contact with the environment, the strength of the collision and the state of friction between the object and the environment can be ascertained. In a case that the object is a metal tool or the like, a vibration in a band in which humans cannot perceive vibrations when the object comes into contact with another object may be generated. Therefore, in the vibration distribution control device 1 according to an example of the present embodiment, the frequency band of an output signal is modulated.

Furthermore, the vibration distribution control device 1 according to an example of the present embodiment may be applied to a chair, a suit, a headset, or the like that include a vibration device.

The memory 12 is a storage device including a read only memory (ROM) and a random access memory (RAM).

The storage device 13 is a device that stores data in a readable and writable manner, and for example, a hard disk drive (HDD), a solid state drive (SSD), or a storage class memory (SCM) may be used as the storage device 13. The storage device 13 stores generated training data, learning models, and the like.

The CPU 11 is a processing device that performs various control and calculation operations, and realizes various functions by executing an operating system (OS) and programs stored in the memory 12. That is, the CPU 11 may function as a frequency removal control unit 111, a time division control unit 112, an energy control unit 113, and a signal output unit 114 as illustrated in FIG. 22.

The CPU 11 is an example of a computer and illustratively controls overall operations of the vibration distribution control device 1. A device for controlling the overall operations of the vibration distribution control device 1 is not limited to the CPU 11, and may be, for example, any one of an MPU, a DSP, an ASIC, a PLD, an FPGA, and a dedicated processor. In addition, the device for controlling the overall operations of the vibration distribution control device 1 may be a combination of two or more of a CPU, an MPU, a DSP, an ASIC, a PLD, an FPGA, and a dedicated processor. Further, MPU is an abbreviation for micro processing unit, DSP is an abbreviation for digital signal processor, and ASIC is an abbreviation for application specific integrated circuit. In addition, PLD is an abbreviation for programmable logic device, and FPGA is an abbreviation for field programmable gate array.

The frequency removal control unit 111 removes a first signal component having a frequency equal to or lower than a predetermined frequency.

The time division control unit 112 divides a second signal component other than the first signal component removed by the frequency removal control unit 111 for each predetermined time interval. In other words, the time division control unit 112 divides a signal related to a vibration source having a predetermined waveform at a certain position for each predetermined time interval.

The energy control unit 113 converts the waveform of the second signal component while maintaining the energy of the second signal component for each predetermined time interval divided by the time division control unit 112. In other words, the energy control unit 113 functions as an example of a calculation unit that calculates a perceived intensity from the vibration waveform of the vibration source, and functions as an example of a distribution unit that distributes the perceived intensity to each of the plurality of vibrators 31 in accordance with the orientation and the arrangement position of the vibration source.

The energy control unit 113 may calculate a perceived intensity at the perception origin by using the perception origin obtained based on the vibration image obtained by the plurality of vibrators 31 and information that attenuates according to the distance to the vibration source. The energy control unit 113 distributes the perceived intensity calculated at the perception origin to each of the plurality of vibrators 31 using a distribution coefficient determined based on the orientation and the arrangement positions.

The energy control unit 113 may convert the signal into a waveform having another frequency by applying a predetermined attenuation formula to the energy of the signal in accordance with the distance from the vibration source to each of the plurality of vibrators and the orientation thereof and distributing the energy of the signal to the plurality of vibrators in each predetermined time interval divided by the time division control unit 112.

The signal output unit 114 outputs the first signal component removed by the frequency removal control unit 111 in addition to the second signal component whose waveform has been converted by the energy control unit 113. In other words, the signal output unit 114 outputs the signal converted by the energy control unit 113 to cause the human to experience the output vibration generated from the converted signal by using the plurality of vibrators.

The signal output unit 114 may output an output vibration related to a vibration source that occurs at a position on a surface or inside the body of a human. In addition, the signal output unit 114 may output an output vibration related to a vibration source that occurs at a position apart from the body of a human.

The signal output unit 114 may be combined with stereophonic sound to cause a human to experience an output vibration. In addition, the signal output unit 114 may cause a human to experience an output vibration of stereophonic sound having sound sources localized at a plurality of positions in accordance with the position of each sound source. Furthermore, the signal output unit 114 may be combined with a stereoscopic vision device to cause a human to experience an output vibration.

The signal output unit 114 may combine a vibration source at a three-dimensional position with three or more vibrators arranged two-dimensionally and stereophonic sound or an image to reinforce a sense of three-dimensional vibration localization or reinforce a sense of localization of the stereophonic sound or image to cause a human to experience the output vibration. In addition, the signal output unit 114 may combine a vibration source at a three-dimensional position with three or more three-dimensionally arranged vibrators and stereophonic sound or an image to reinforce a sense of three-dimensional vibration localization or reinforce a sense of localization of the stereophonic sound or image to cause a human to experience the output vibration.

[A-3] ISM

Figure 23:
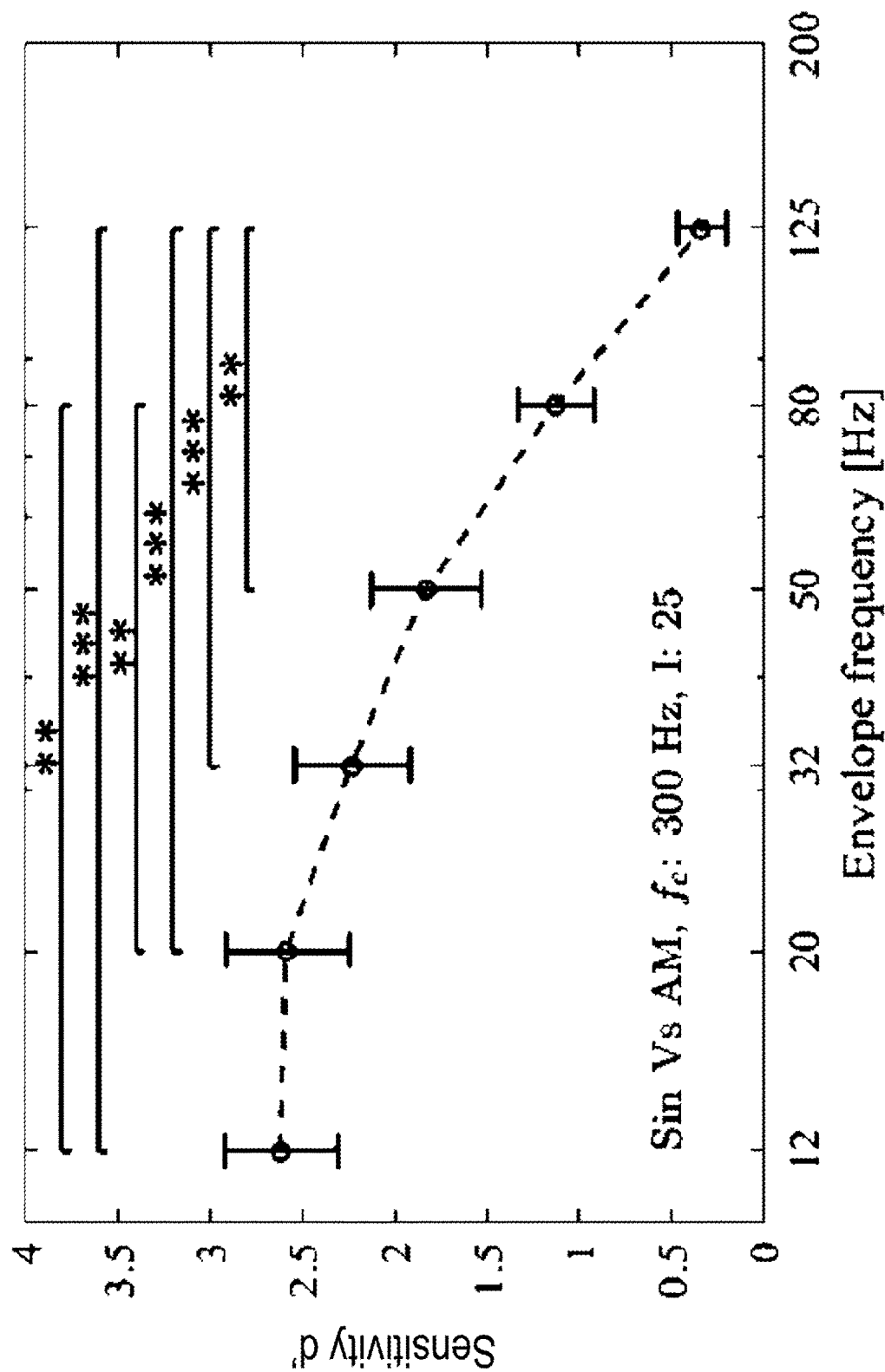
FIG. 23 is a graph showing discriminability of vibrations to a human.
Figure 24:
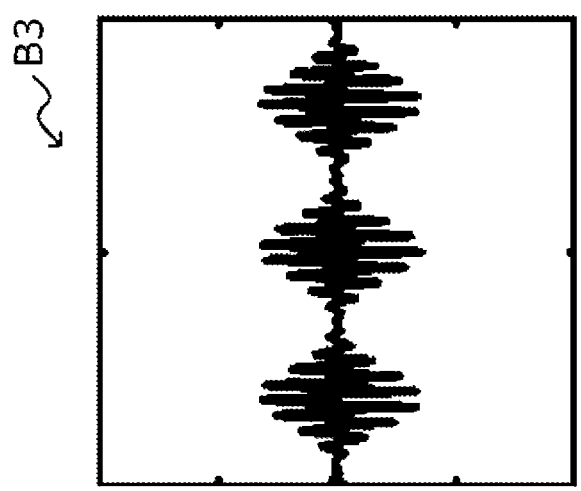
FIG. 24 illustrates sample waveforms of vibrations used in a forced tri-choice discrimination experiment performed to determine the discriminability shown in the graph of FIG. 23.

FIG. 23 is a graph showing discriminability of vibrations to a human (quoted from Nan Cao, Masashi Konyo, Hikaru Nagano, and Satoshi Tadokoro, "Dependence of the Perceptual Discrimination of High-Frequency Vibrations on the Envelope and Intensity of Waveforms", IEEE Access, vol. 7, pp. 20840-20849, February 2019). FIG. 24 shows sample waveforms of vibrations used in a forced tri-choice discrimination experiment performed to determine the discriminability shown in the graph of FIG. 23.

The graph shown in FIG. 23 is obtained by investigating perceptual discrimination characteristics of humans while maintaining the vibration energy on the premise of a vibration energy model known in the related art. Reference signs B1 and B2 in FIG. 24 indicate the same waveform, and reference sign B3 in FIG. 24 indicates a different waveform. A test subject is asked to compare the constant amplitude vibrations indicated by the reference signs B1 and B2 in FIG. 24 with the amplitude modulated stimulus indicated by the reference sign B3 and to answer to which one is amplitude modulated wave. In FIG. 23, the percentage of correct answers obtained in the forced tri-choice discrimination experiment is represented by Sensitivity (d': d-prime) which is a discrimination performance index based on the signal detection theory, and when d' is 1 or less, it means that the percentage of correct answers falls below about 60%.

According to the graph shown in FIG. 23, the upper limit of the frequencies at which the envelope curve components can be discriminated is about 80 to 125 Hz. In addition, it is not necessary to maintain the envelope component that is equal to or higher than the upper limit of the frequencies, and it indicates that the stimulus cannot be discriminated if the carrier frequency of the amplitude modulated wave is replaced while maintaining the vibration energy.

As described above, even if the vibration energy is maintained, when the energy fluctuates in a low-frequency range, the variation may be perceived as a difference in tactile information, and the perception range is not investigated. Therefore, based on the fact that the upper limit value of the variation of the perceivable low frequency is found to be about 80 to 125 Hz, a conversion of the vibration energy is performed while low-frequency components are maintained by two measures (refer to measures [1] and [2] described later).

Figure 25:
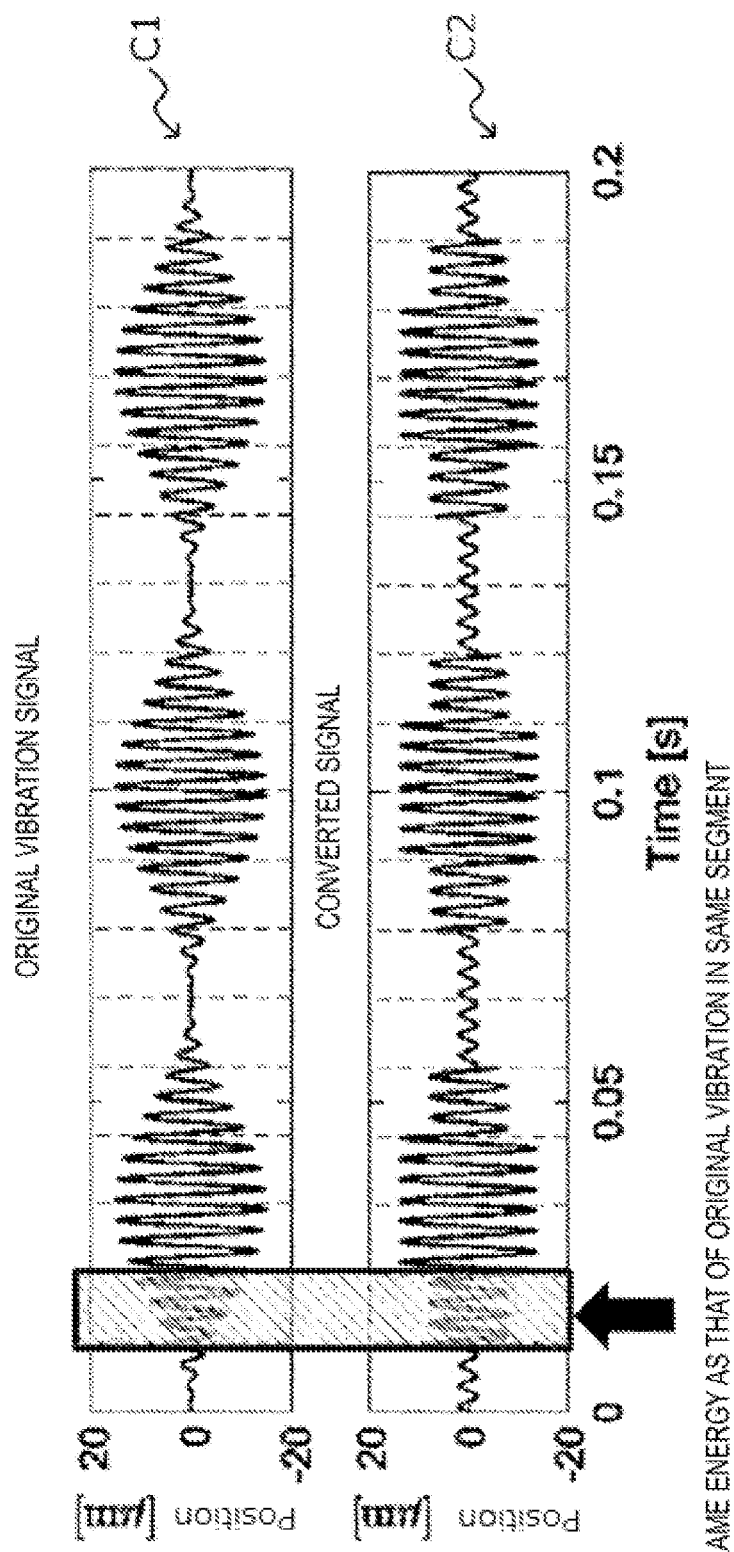
FIG. 25 shows a graph showing waveforms of signals before and after conversion for each segment by the vibration distribution control device illustrated in FIG. 22.

FIG. 25 shows a graph showing waveforms of signals before and after conversion for each segment by the vibration distribution control device 1 illustrated in FIG. 22.

Since humans perceive a high frequency based on a vibration energy rather than the waveform itself, the vibrations are sensed as the same feeling if the vibration energy is maintained. However, in a case that the variation of the vibration energy occurs at about 80 to 125 Hz or lower, it is necessary to reproduce the variation of the vibration energy.

Therefore, in an example of the present embodiment, as means for maintaining the variation of the vibration energy at a predetermined frequency (for example, about 80 to 125 Hz) or lower, for example, the vibration is time-divided in a section of about 80 to 200 Hz, the vibration energy is obtained for each segment, and the vibration is replaced with a vibration having a different carrier frequency.

In the example illustrated in FIG. 25, the original vibration signal indicated by reference numeral C1 and the converted signal indicated by reference numeral C2 are converted so that the energy of the converted signal is the same as the energy of the original vibration signal in the same time segment.

The range of the time division (in other words, the division width) may be set to such an extent that an energy variation of 80 to 125 Hz or lower can be expressed (in other words, an extent that the peaks of the variations match) (measure [1]). Although the frequency of the division width may be 80 to 125 Hz or higher, when the division width is too short, the estimation accuracy of the vibration energy having a cycle longer than the division width deteriorates. For this reason, with the following measure [2], the waveform of the vibration whose energy cannot be estimated is output as it is.

In addition, a component having a frequency equal to or lower than a predetermined frequency may be extracted and presented as a stimulation vibration as it is (measure [2]). Note that, although the predetermined frequency may be a frequency from 80 to 125 Hz or higher, components of the predetermined frequency or more may be represented by the energy control unit 113 of the second signal component. As a result, it is possible to have flexibility in the frequency selection. However, if the predetermined frequency is set to an excessively high frequency, a problem of noise may occur or a vibration device for a wide band may be required.

According to the above-described measures [1] and [2], the predetermined frequency may be about 80 to 400 Hz. 400 Hz is an upper limit from the point of view of the noise problem and the capability of a vibration device.

The setting of the predetermined frequency also involves selection of a carrier frequency at which the vibration is converted. Since the peak of the vibration frequency at which the human perception sensitivity is improved is around 200 to 250 Hz, the practical frequency is around 150 to 400 Hz as the carrier frequency at which the sensitivity is improved and noise is not generated. The carrier frequency may be a constant multiple of the division width. In addition, a plurality of different frequencies may be used for the carrier frequency, and a high-frequency band equal to or higher than 400 Hz may be included.

In addition, the predetermined frequency for dividing a low frequency and a high frequency and the frequency of the division width for calculating an energy may not necessarily coincide with each other.

The correction energy, which is a vibration energy corrected to improve human perceptibility, can be expressed by the following formula.

$$I_{pc} = \left(\frac{A^2}{T_f^2}\right)^{b_f} \quad \text{[Math 16]}$$

A represents the amplitude of a separated basis signal $g_k$. $T_f$ represents an amplitude threshold, which is the minimum amplitude that a human can perceive with a signal of a frequency f. $b_f$ represents an exponent value and is non-linear for the signal of the frequency f.

Figure 26:
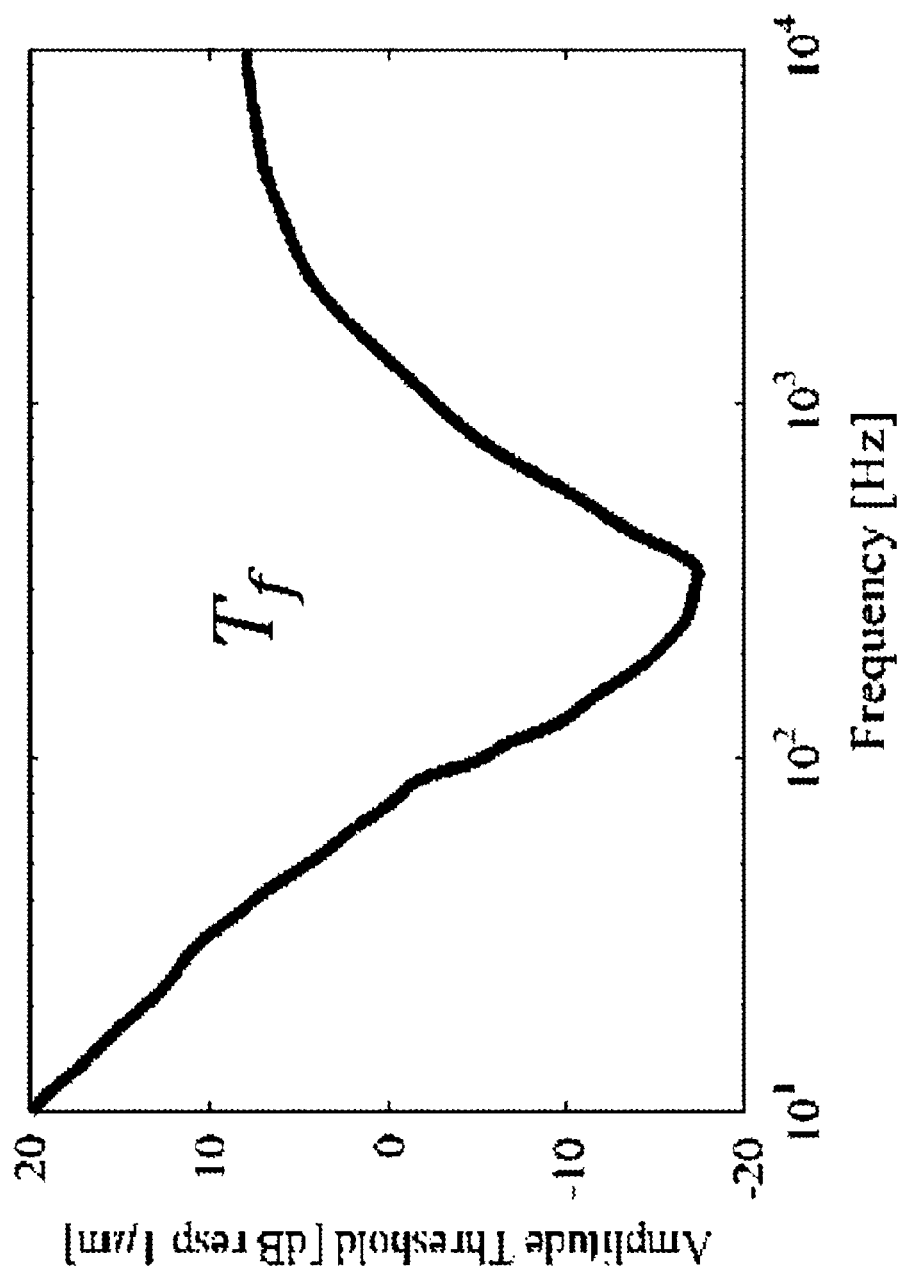
FIG. 26 is a graph showing an amplitude threshold $T_f$ used for calculation of a correction energy.

FIG. 26 is a graph showing an amplitude threshold $T_f$ used for calculation of a correction energy.

As shown in FIG. 26, the amplitude threshold varies depending on frequencies, and in the range of about $10^2$ to $10^3$ Hz, even a relatively small amplitude can be sensed by a human, but in the other ranges, only a relatively large amplitude can be sensed by a human.

Figure 27:
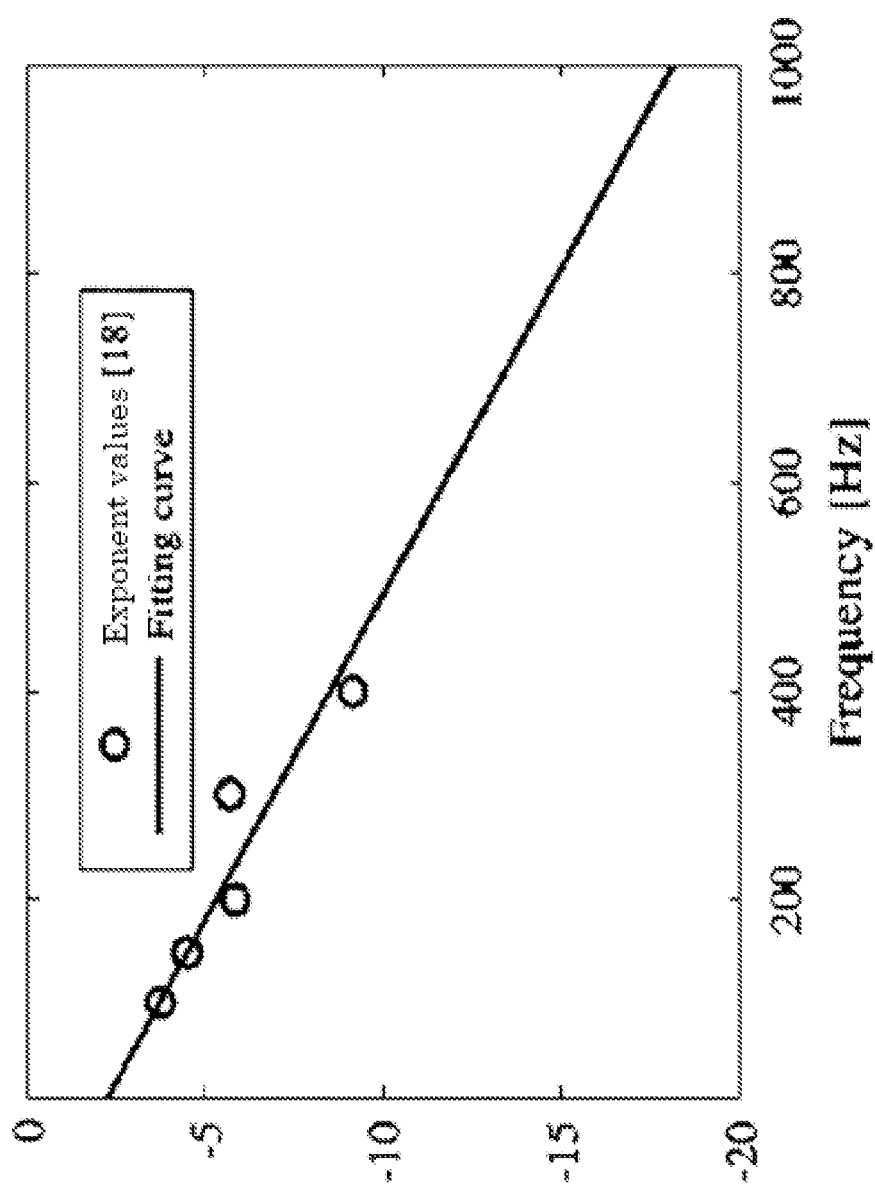
FIG. 27 is a graph showing an exponent threshold b used for calculation of a correction energy.

FIG. 27 is a graph showing an exponent value $b_f$ used for calculation of a correction energy.

The exponent value $b_f$ in FIG. 27 is an example of using a value obtained by linearly interpolating the exponent value $b_f$ reported in the related art which is equal to or less than 400 Hz.

Figure 28:
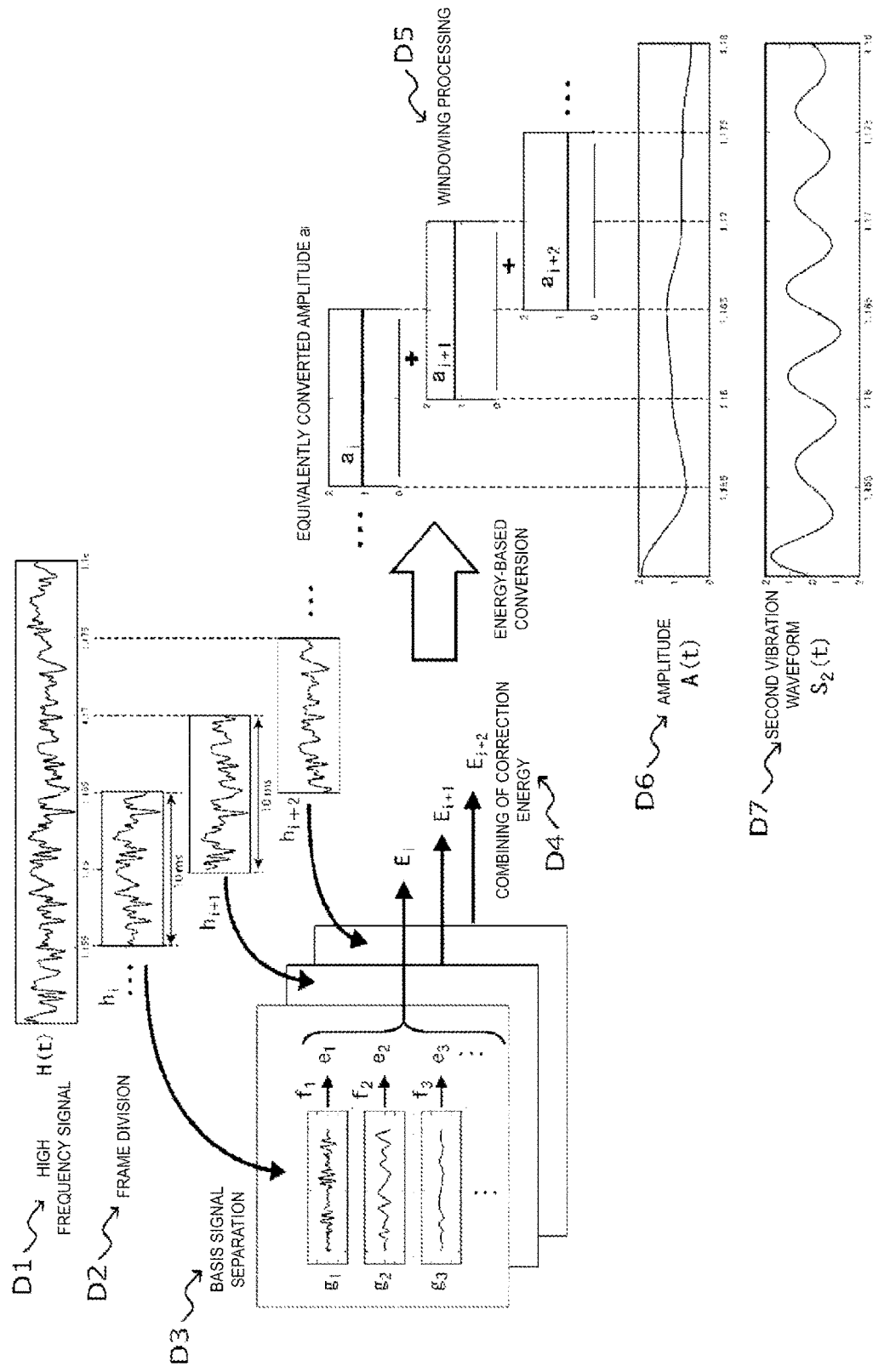
FIG. 28 is a diagram for describing use of a window function in the vibration distribution control device illustrated in FIG. 22.

FIG. 28 is a diagram for describing use of a window function in the vibration distribution control device 1 illustrated in FIG. 22.

As indicated by reference numeral D1, a high-frequency signal H (t) is input. As indicated by reference numeral D2, the high-frequency signal H (t) is divided into signals $h_i$, $h_{i+1}$, $h_{i+2}$, and the like for each of frames i, i+1, i+2, and the like, respectively. As indicated by reference numeral D3, the signal h of each divided frame is separated into a plurality of basis signals $g_1$, $g_2$, $g_3$, and the like. As indicated by reference numeral D4, based on frequencies $f_1$, $f_2$, $f_3$, and the like of the basis signals $g_1$, $g_2$, $g_3$, and the like, scalar values $E_i$, $E_{i+1}$, $E_{i+2}$, and the like obtained by combining the correction energy of all of the basis signals $g_1$, $g_2$, $g_3$, and the like are output. As indicated by reference numeral D5, the scalar values $E_i$, $E_{i+1}$, $E_{i+2}$, and the like of the vibration energy calculated for each frame i are converted into vibration waveforms having the same vibration energy but different carrier frequencies, and amplitudes $a_i(t)$, $a_{i+1}(t)$, $a_{i+2}(t)$, and the like of the waveforms are subjected to windowing processing using a window function. As indicated by reference numeral D6, the first to N-th frames are combined, and the amplitude A(t) of the vibration waveform is output. As indicated by reference numeral D7, a second vibration waveform $S_2(t)$ having the carrier frequency with the amplitude A(t) is output.

Figure 29:
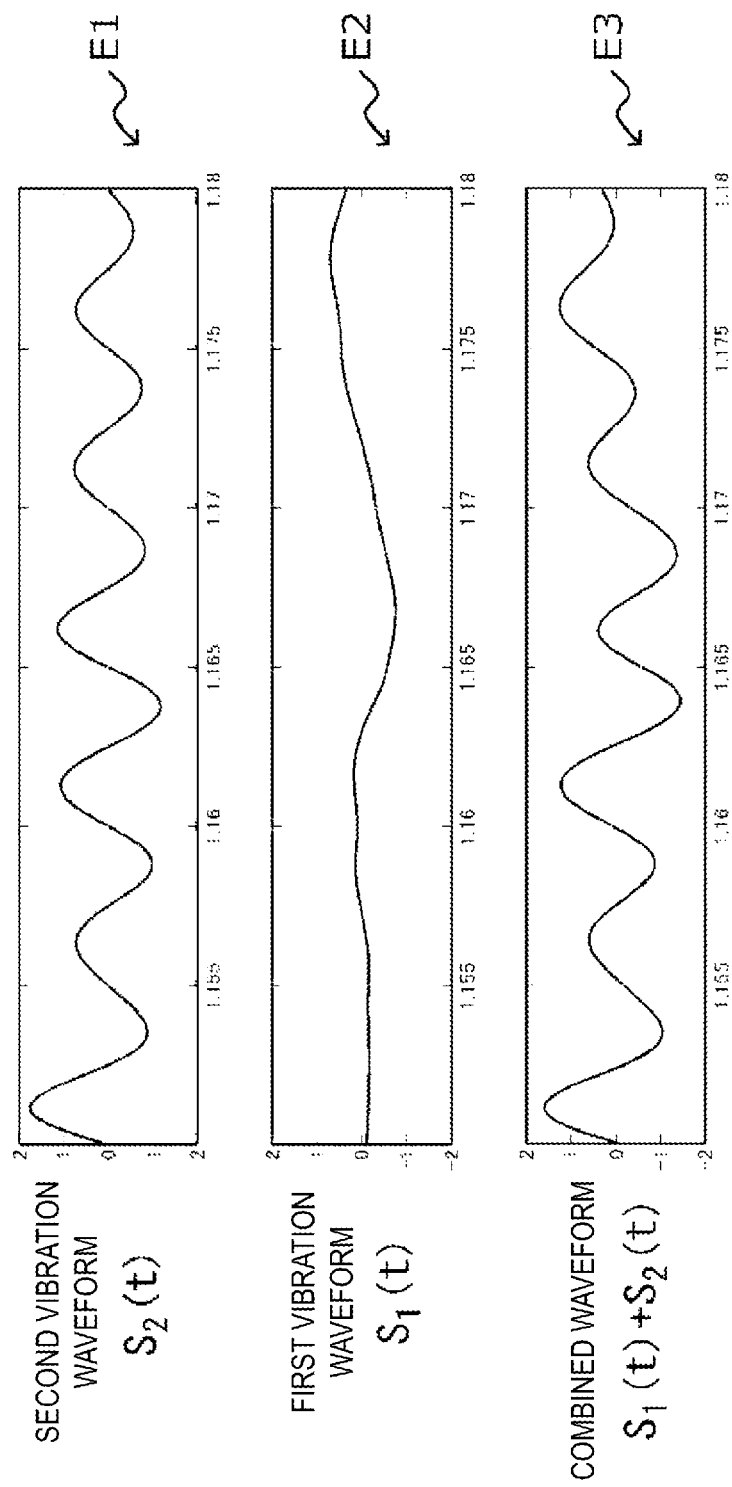
FIG. 29 shows graphs for explaining an example of combination of a low frequency and a high frequency in the vibration distribution control device illustrated in FIG. 22.

FIG. 29 shows graphs for explaining an example of combination of a low frequency and a high frequency in the vibration distribution control device 1 illustrated in FIG. 22.

A second vibration waveform $S_2(t)$ indicated by reference numeral E1 generated from a high-frequency signal H (t) using the window function of FIG. 28 is combined with a first vibration waveform $S_1(t)$ indicated by reference numeral E2 obtained by outputting a low-frequency signal L(t) as it is. As a result, a combined waveform $S_1(t)+S_2(t)$ indicated by reference numeral E3 is output.

Figure 30:
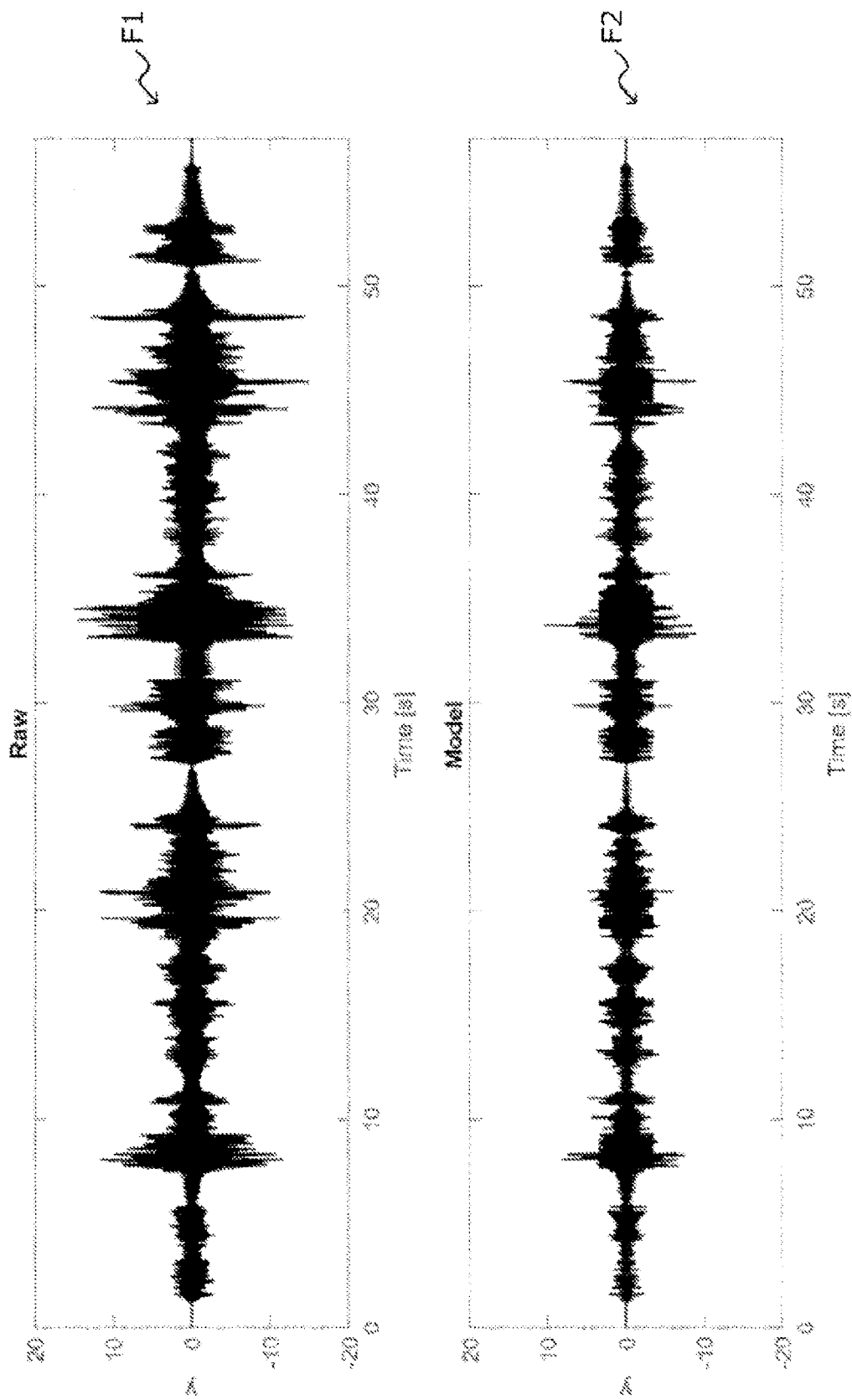
FIG. 30 shows graphs showing specific examples of waveforms of signals before and after a conversion by the vibration distribution control device illustrated in FIG. 22.

FIG. 30 shows graphs showing specific examples of waveforms of signals before and after a conversion by the vibration distribution control device 1 illustrated in FIG. 22.

In FIG. 30, a waveform before a conversion (see reference numeral F1) and a waveform after the conversion (see reference numeral F2) of a violin sound are represented by amplitudes at each time.

With respect to the sound of high-frequency vibration such as a violin sound, auditory noise is largely generated due to a tactile vibration in the related art, and when a low-pass filter is applied thereto, the vibration that can be recognized by a human disappears. Thus, the correction energy is calculated so that the waveform becomes a single wavelength having a low carrier frequency at each time.

Figure 31:
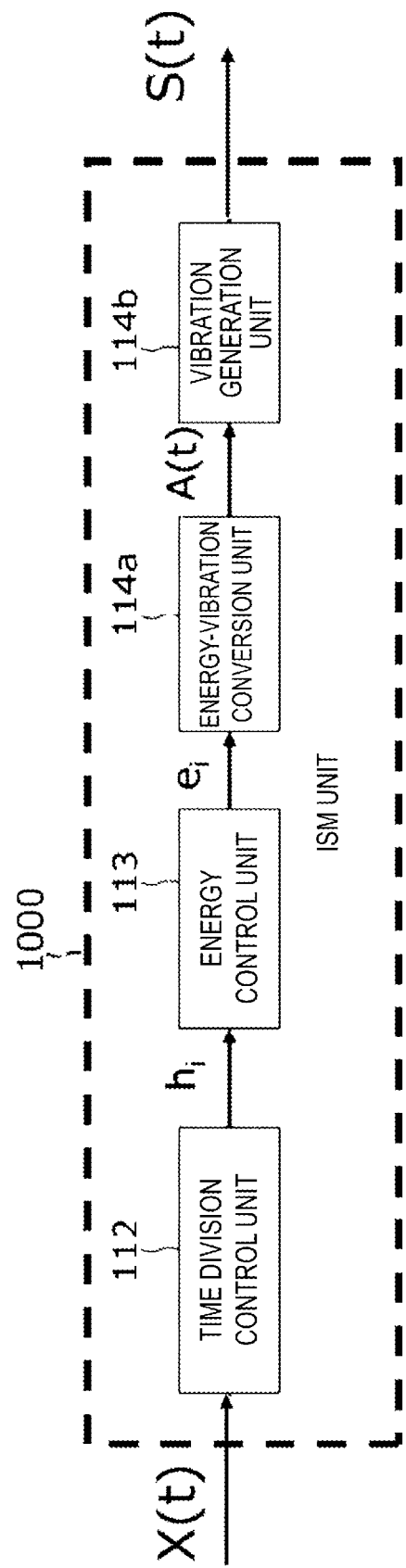
FIG. 31 is a block diagram for describing a functional configuration example of an ISM unit of the vibration distribution control device illustrated in FIG. 22.

FIG. 31 is a block diagram for describing a functional configuration example of an ISM unit 1000 of the vibration distribution control device 1 illustrated in FIG. 22.

The ISM unit 1000 functions as the time division control unit 112, the energy control unit 113, an energy-vibration conversion unit 114a, and a vibration generation unit 114b. In the present embodiment, the ISM unit 1000 controls a vibration including high-frequency components equal to or higher than about 100 Hz made by a vibrator 31 by using a signal. Techniques for controlling vibrations including high-frequency components equal to or higher than 100 Hz according to the present disclosure are collectively called ISM.

The time division control unit 112 time-divides a signal X(t) of a vibration including high-frequency components equal to or higher than about 100 Hz into N frames, and inputs the signal $h_i$ of the time-divided i-th frame to the energy control unit 113. Further, the number of frames N may be determined based on a predetermined cycle and an overlap rate of windowing processing.

The energy control unit 113 calculates a correction energy $e_i$ for the signal $h_i$ of the i-th frame and inputs the calculated correction energy to the energy-vibration conversion unit 114a.

The energy-vibration conversion unit 114a generates a signal A(t) obtained by combining correction energies $e_1$ to $e_N$ of the first to N-th frames and inputs the signal A(t) to a second vibration generation unit 114b.

The vibration generation unit 114b outputs a signal waveform S (t) based on the combined signal A(t).

A first example of a vibration waveform generation process of the vibration distribution control device 1 illustrated in FIG. 22 will be described with reference to a block diagram (steps S1 to S7) illustrated in FIG. 32.

Figure 32:
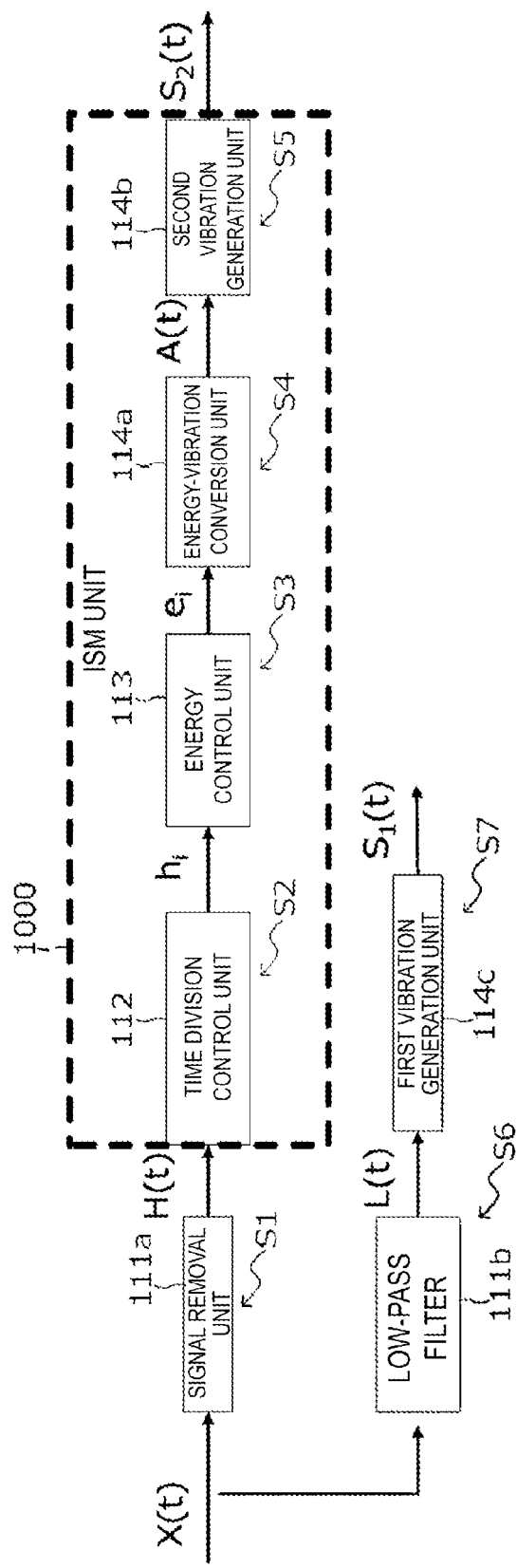
FIG. 32 is a block diagram for describing a first example of a vibration waveform generation process in the vibration distribution control device illustrated in FIG. 22.

A signal removal unit 111a and a low-pass filter 111b illustrated in FIG. 32 correspond to the frequency removal control unit 111 illustrated in FIG. 22. In addition, the energy-vibration conversion unit 114a, the second vibration generation unit 114b, and a first vibration generation unit 114c illustrated in FIG. 32 correspond to the signal output unit 114 illustrated in FIG. 22.

The signal removal unit 111a removes components equal to or lower than a predetermined frequency from the acquired signal X(t) before a conversion to generate a high-frequency signal H (t), and inputs the high-frequency signal H (t) to the time division control unit 112 (step S1).

The time division control unit 112 time-divides the high-frequency signal H (t) into N frames, and inputs the signal $h_i$ of the time-divided i-th frame to the energy control unit 113 (step S2). Further, the number of frames N may be determined based on a predetermined cycle and an overlap rate of windowing processing.

The energy control unit 113 calculates a correction energy $e_i$ for the signal $h_i$ of the i-th frame and inputs the calculated correction energy to the energy-vibration conversion unit 114a (step S3).

The energy-vibration conversion unit 114a generates a signal A(t) obtained by combining correction energies $e_1$ to $e_N$ of the first to N-th frames and inputs the signal A(t) to the second vibration generation unit 114b (step S4).

The second vibration generation unit 114b outputs a second vibration waveform $S_2(t)$ based on the combined signal A(t) (step S5).

On the other hand, the low-pass filter 111b inputs a low-frequency signal L(t) obtained by filtering components equal to or lower than the predetermined frequency from the acquired signal X(t) before a conversion to the first vibration generation unit 114c (step S6).

The first vibration generation unit 114c outputs the first vibration waveform $S_1(t)$ based on the low-frequency signal L(t) (step S7).

Next, the details of the energy control process indicated in step S3 of FIG. 32 will be described with reference to the block diagram (steps S11 to S14) illustrated in FIG. 33.

Figure 33:
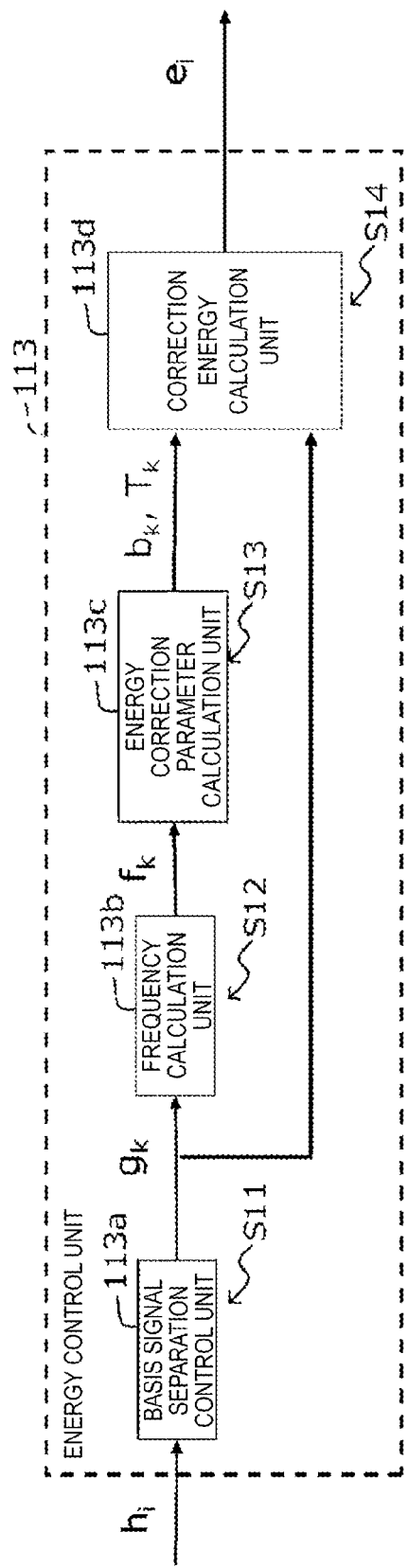
FIG. 33 is a block diagram for describing details of an energy control process illustrated in FIG. 31.

As illustrated in FIG. 33, the energy control unit 113 functions as a basis signal separation control unit 113a, a frequency calculation unit 113b, an energy correction parameter calculation unit 113c, and a correction energy calculation unit 113d.

The basis signal separation control unit 113a separates the signal $h_i$ of the time-divided i-th frame which is an input signal into a plurality of basis signals g, and inputs the separated k-th basis signal $g_k$ to the frequency calculation unit 113b (step S11). For example, the signal may be separated in short-time Fourier analysis, wavelet analysis, an empirical mode decomposition (EMD) method, or the like.

The frequency calculation unit 113b calculates a frequency $f_k$ of the k-th basis signal $g_k$ in, for example, discrete Fourier analysis, Hilbert spectrum analysis, or the like, and inputs the frequency $f_k$ to the energy correction parameter calculation unit 113c (step S12).

The energy correction parameter calculation unit 113c calculates an exponent value $b_k$ and an amplitude threshold $T_k$ described with reference to FIGS. 26 and 27 based on the frequency $f_k$, and inputs the values to the correction energy calculation unit 113d (step S13).

Based on the exponent value $b_k$ and the amplitude threshold $T_k$, the correction energy calculation unit 113d calculates a correction energy $I_{pc}$ for each basis signal $g_k$ according to the formula shown in Math 16, and outputs the scalar value $e_i$ obtained by summing the correction energies of all the basis signals $g_k$ (step S14).

Next, as a second example of the vibration waveform generation process of the vibration distribution control device 1 illustrated in FIG. 22, the low-frequency component separation process in the energy control process shown in FIG. 31 will be described with reference to the block diagram (steps S101 to S105) illustrated in FIG. 34.

Figure 34:
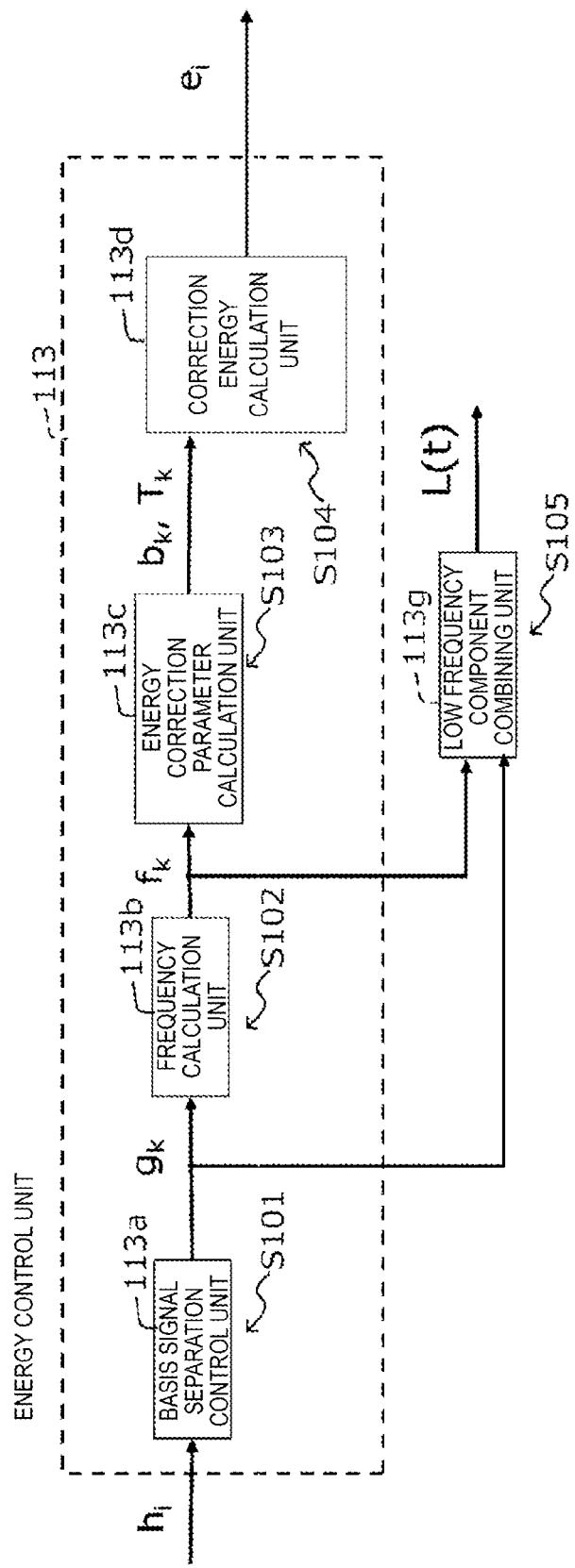
FIG. 34 is a block diagram for describing a low-frequency component separation process in the energy control process illustrated in FIG. 31 as a second example of the vibration waveform generation process in the vibration distribution control device illustrated in FIG. 22.

As illustrated in FIG. 34, the energy control unit 113 may function as the basis signal separation control unit 113a, the frequency calculation unit 113b, the energy correction parameter calculation unit 113c, and the correction energy calculation unit 113d, and may also have a function of separating low-frequency components to a low frequency component combining unit 113g.

The basis signal separation control unit 113a separates the signal $h_i$ of the time-divided i-th frame which is an input signal into a plurality of basis signals g, and inputs the separated k-th basis signal $g_k$ to the frequency calculation unit 113b (step S101). For example, the signal may be separated in short-time Fourier analysis, wavelet analysis, an EMD method, or the like.

The frequency calculation unit 113b calculates a frequency $f_k$ of the k-th basis signal $g_k$ in, for example, discrete Fourier analysis, Hilbert spectrum analysis, or the like, and inputs the frequency $f_k$ to the energy correction parameter calculation unit 113c (step S102).

The energy correction parameter calculation unit 113c calculates an exponent value $b_k$ and an amplitude threshold $T_k$ described with reference to FIGS. 26 and 27 based on the frequency $f_k$, and inputs the values to the correction energy calculation unit 113d (step S103).

Based on the exponent value $b_k$ and the amplitude threshold $T_k$, the correction energy calculation unit 113d calculates a correction energy $I_{pc}$ for each basis signal $g_k$ according to the formula shown in Math 16, and outputs the scalar value $e_i$ obtained by summing the correction energies of all the basis signals $g_k$ (step S104).

The low frequency component combining unit 113g generates a low-frequency component L(t) by combining basis signals in which frequency $f_k$ of the basis signal $g_k$ is lower than a predetermined frequency (step S105).

For a sound source including signals of a plurality of frequency bands, there is a case in which a vibration energy of a specific frequency band is desired to be emphasized and presented as vibration. In such a case, energy control units 1131 and 1132 as modifications applied when a waveform is converted by adjusting an energy of a basis signal present in a predetermined frequency band will be described with reference to FIGS. 35 to 40.

Figure 35:
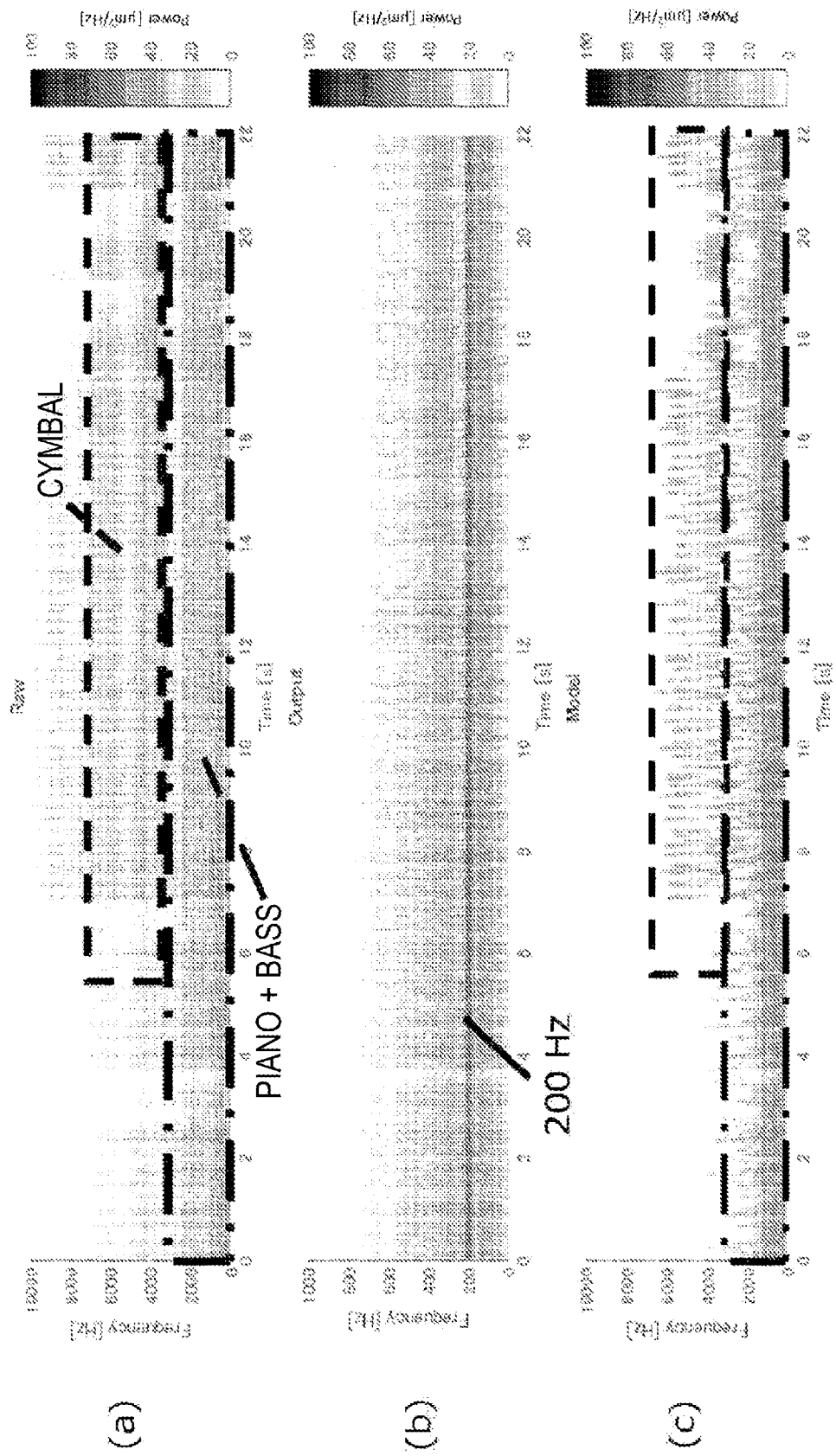
FIGS. 35(a) to 35(c) are graphs for explaining an example in which vibration is generated according to ISM without emphasizing a waveform.

FIGS. 35(a) to 35(c) are graphs for explaining an example in which a vibration is generated according to ISM without emphasizing a waveform. FIG. 35 shows a band corresponding to a waveform of a cymbal (drum) of a high-frequency component from a musical piece of a piano trio and a band corresponding to waveforms of a piano and a bass. In FIGS. 35(a) to 35(c), the horizontal axis represents time [s], the vertical axis represents frequency [Hz], the dark spectrum indicates that power is large, and the light spectrum indicates that power is small.

In FIG. 35(a), as a distribution of the sound source spectrum, a waveform of a cymbal of a high-frequency component indicated by a broken line and a waveform of a piano and a bass of a low-frequency component indicated by a one-dot dashed line are shown.

In FIG. 35(b), a spectral distribution (200 Hz at the center) at the time of conversion by ISM is shown. In FIG. 35(b), all of the cymbal, the piano, and the bass are extracted as intensities due to the effect of the ISM.

In FIG. 35(c), an example in which the signals are not converted into signals having the frequency of 200 Hz based on the intensities, but are converted into signals by using the representative frequency of the basis signals is illustrated. Thus, the emphasized frequency band is visualized.

Figure 36:
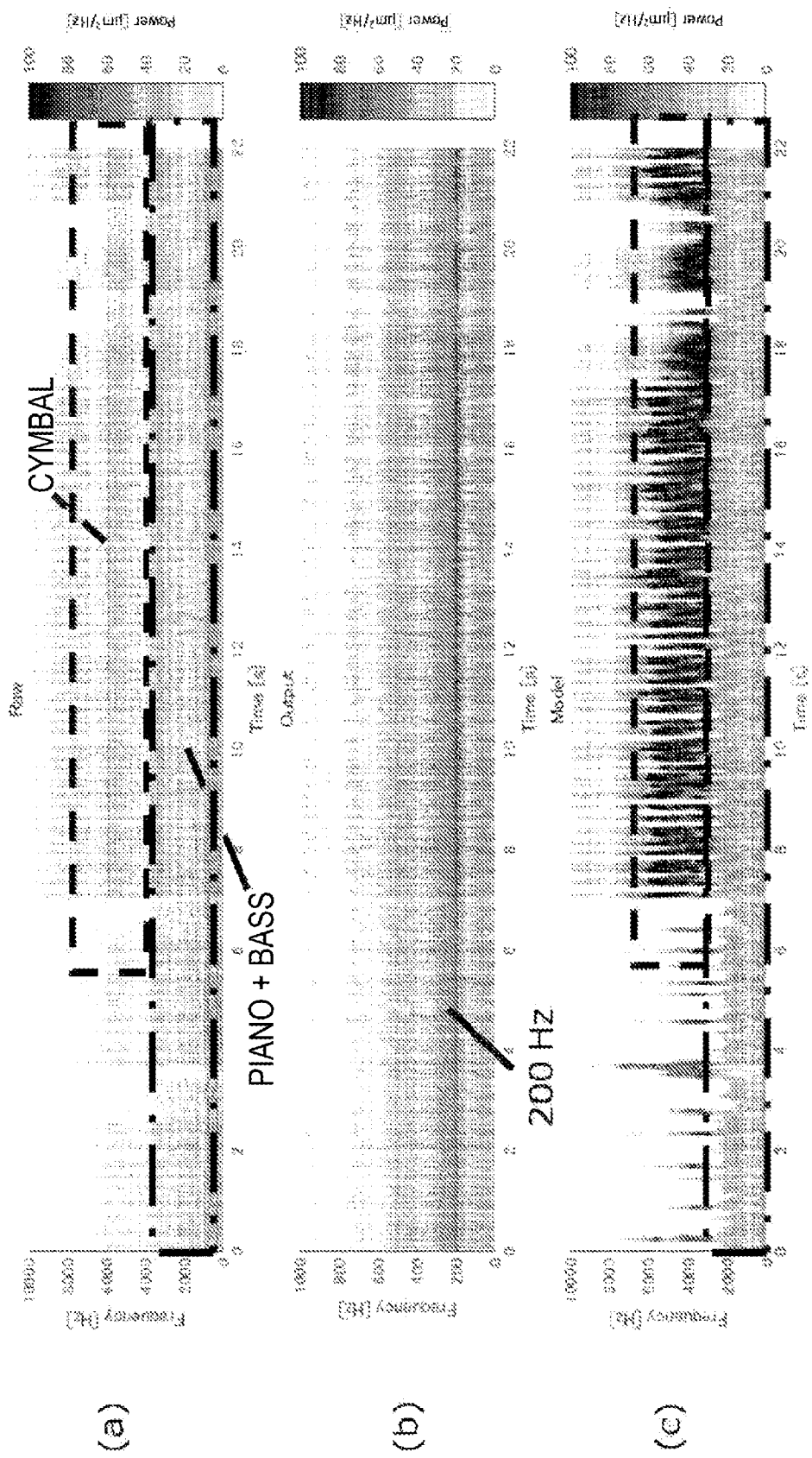
FIGS. 36(a) to 36(c) are graphs for explaining a first example in which high-frequency components equal to or higher than 3000 Hz are emphasized and separated from a sound source.

FIGS. 36(a) to 36(c) are graphs for explaining a first example in which high-frequency components are emphasized and separated from a sound source. In FIG. 36, an example in which a cymbal (drum) of high-frequency components is emphasized and separated from a musical piece of a piano trio is illustrated. In FIGS. 36(a) to 36(c), the horizontal axis represents time [s], the vertical axis represents frequency [Hz], the dark spectrum indicates that power is large, and the light spectrum indicates that power is small.

In FIG. 36(a), as a distribution of the sound source spectrum, a waveform of the cymbal of a high-frequency component indicated by a broken line and a waveform of a piano and a bass of a low-frequency component indicated by a one-dot dashed line are shown.

In FIG. 36(b), a spectral distribution (200 Hz at the center) at the time of conversion by ISM is shown. In FIG. 36(b), +20 dB (100 times) is applied only to intensities equal to or higher than 3000 Hz.

In FIG. 36(c), an example in which the signals are not converted into signals having the frequency of 200 Hz based on the intensities, but are converted into signals by using the representative frequency of the basis signal is shown. Thus, the emphasized frequency band is visualized. In FIG. 36(c), the power of the spectrum of the cymbal increases.

Figure 37:
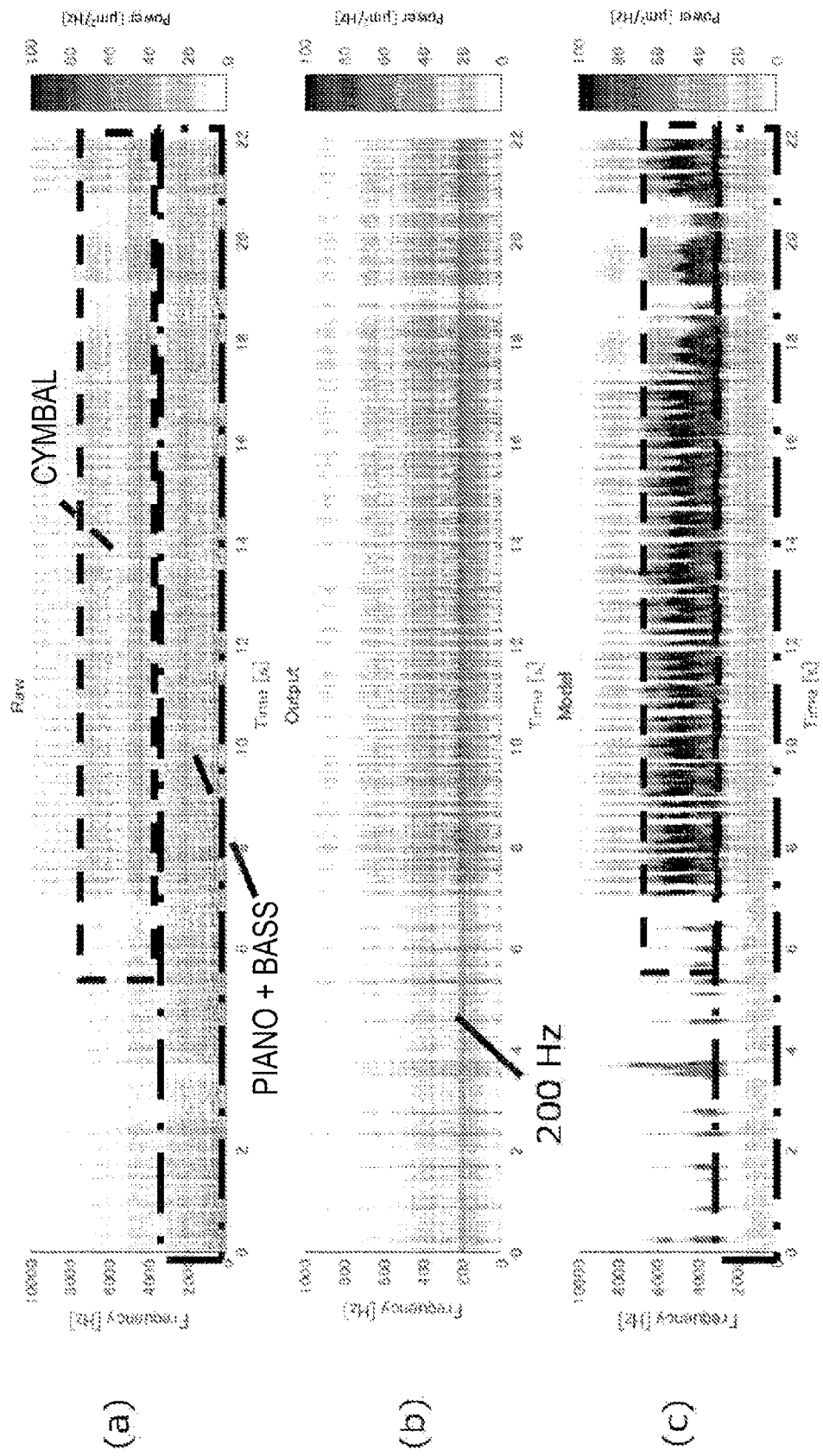
FIGS. 37(a) to 37(c) are graphs for explaining a second example in which high-frequency components equal to or higher than 3000 Hz are emphasized and separated from a sound source.

FIGS. 37(a) to 37(c) are graphs for explaining a second example in which high-frequency components are emphasized and separated from a sound source. In FIG. 37, an example in which a cymbal (drum) of high-frequency components is emphasized and separated from a musical piece of a piano trio is illustrated. In FIGS. 37(a) to 37(c), the horizontal axis represents time [s], the vertical axis represents frequency [Hz], the dark spectrum indicates that power is large, and the light spectrum indicates that power is small.

In FIG. 37(a), as a distribution of the sound source spectrum, a waveform of the cymbal of high-frequency components indicated by a broken line and a waveform of a piano and a bass of a low-frequency component indicated by a one-dot dashed line are shown.

In FIG. 37(b), a spectral distribution (200 Hz at the center) at the time of conversion by ISM is shown. In FIG. 37(b), the intensities equal to or higher than 3000 Hz are +20 dB (100 times), while the intensities equal to or lower than 1000 Hz are −10 dB (1/10 times).

In FIG. 37(c), an example in which the signals are not converted into signals having the frequency of 200 Hz based on the intensities, but are converted into signals by using the representative frequency of the basis signal is shown. Thus, the emphasized frequency band is visualized. In FIG. 37(c), the power of the spectrum of the cymbal increases.

Figure 38:
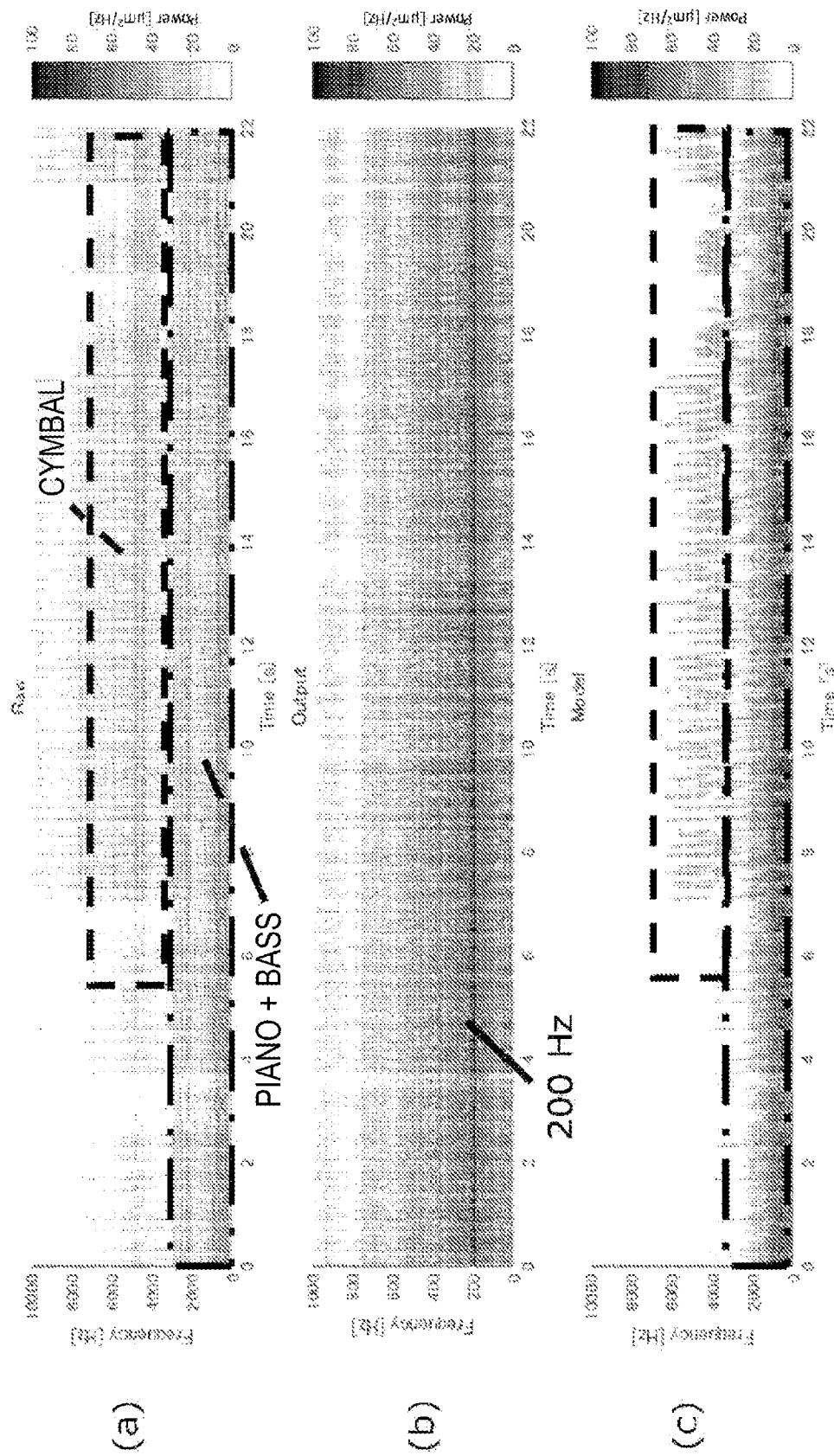
FIGS. 38(a) to 38(c) are graphs for explaining an example in which low-frequency components lower than or equal to 1000 Hz are emphasized and separated from a sound source.

FIGS. 38(a) to 38(c) are graphs for explaining an example in which low-frequency components are emphasized and separated from a sound source. FIG. 38 shows an example in which the piano and bass of low-frequency components are emphasized and separated from a musical piece of a piano trio. In FIGS. 38(a) to 38(c), the horizontal axis represents time [s], the vertical axis represents frequency [Hz], the dark spectrum indicates that power is large, and the light spectrum indicates that power is small.

In FIG. 38(a), as a distribution of the sound source spectrum, a waveform of the cymbal of high-frequency components indicated by a broken line and a waveform of a piano and a bass of low-frequency components indicated by a one-dot dashed line are shown.

In FIG. 38(b), a spectral distribution (200 Hz at the center) at the time of conversion by ISM is shown. In FIG. 38(b), +10 dB (10 times) is applied only to intensities equal to or lower than 1000 Hz.

In FIG. 38(c), an example in which the signals are not converted into signals having the frequency of 200 Hz based on the intensities, but are converted into signals by using the representative frequency of the basis signal is shown. Thus, the emphasized frequency band is visualized. In FIG. 38(c), the power of the spectrum of the piano and the bass is increased.

A first modification of the energy control process shown in FIG. 31 will be described with reference to the block diagram (steps S41 to S45) illustrated in FIG. 39.

Figure 39:
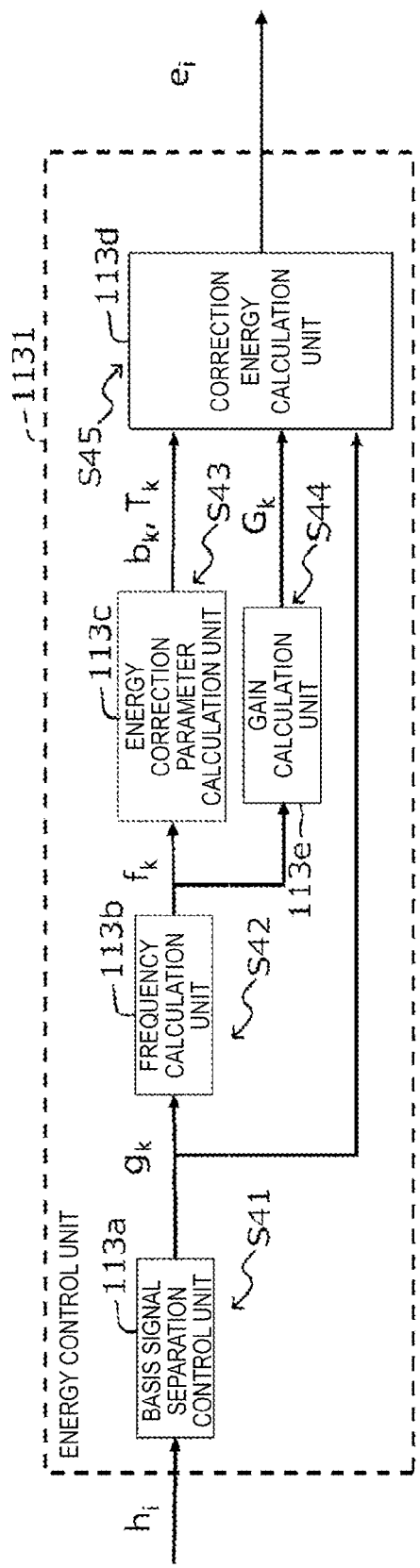
FIG. 39 is a block diagram for describing a first modification of the energy control process illustrated in FIG. 31.

As illustrated in FIG. 39, the energy control unit 1131 functions as a gain calculation unit 113e in addition to the basis signal separation control unit 113a, the frequency calculation unit 113b, the energy correction parameter calculation unit 113c, and the correction energy calculation unit 113d illustrated in FIG. 33.

The basis signal separation control unit 113a separates the signal $h_i$ of the time-divided i-th frame which is an input signal into a plurality of basis signals g, and inputs the separated k-th basis signal $g_k$ to the frequency calculation unit 113b (step S41). For example, the signal may be separated in short-time Fourier analysis, wavelet analysis, an EMD method, or the like.

The frequency calculation unit 113b calculates a frequency $f_k$ of the k-th basis signal $g_k$ in, for example, discrete Fourier analysis, Hilbert spectrum analysis, or the like, and inputs the frequency $f_k$ to the energy correction parameter calculation unit 113c (step S42).

The energy correction parameter calculation unit 113c calculates an exponent value $b_k$ and an amplitude threshold $T_k$ described with reference to FIGS. 26 and 27 based on the frequency $f_k$, and inputs the values to the correction energy calculation unit 113d (step S43).

The gain calculation unit 113e outputs a gain value $G_k$ at a predetermined frequency band in accordance with the calculated frequency $f_k$ of the basis signal $g_k$ (step S44). When the energy is to be emphasized, $G_k > 1$ is set, and when the energy is to be suppressed, $0 \leq G_k < 1$ is set. The energy may be adjusted through emphasis or suppression in one frequency band or in a plurality of frequency bands. In addition, the energy may be adjusted in the entire frequency band input to the energy control unit 1131.

The correction energy calculation unit 113d calculates a gain-adjusted correction energy $I_{pc}$ for each basis signal $g_k$ in accordance with the following formula represented by Math 17 below with respect to the amplitude A of the separated basis signal $g_k$, and outputs a scalar value $e_i$ obtained by summing the correction energies of all the basis signals $g_k$ (step S45).

$$1_{pc} = G\left(\frac{A^2}{T_f^2}\right)^{b_f} \qquad \text{[Math 17]}$$

A second modification of the energy control process shown in FIG. 31 will be described with reference to the block diagram (steps S51 to S56) illustrated in FIG. 40.

Figure 40:
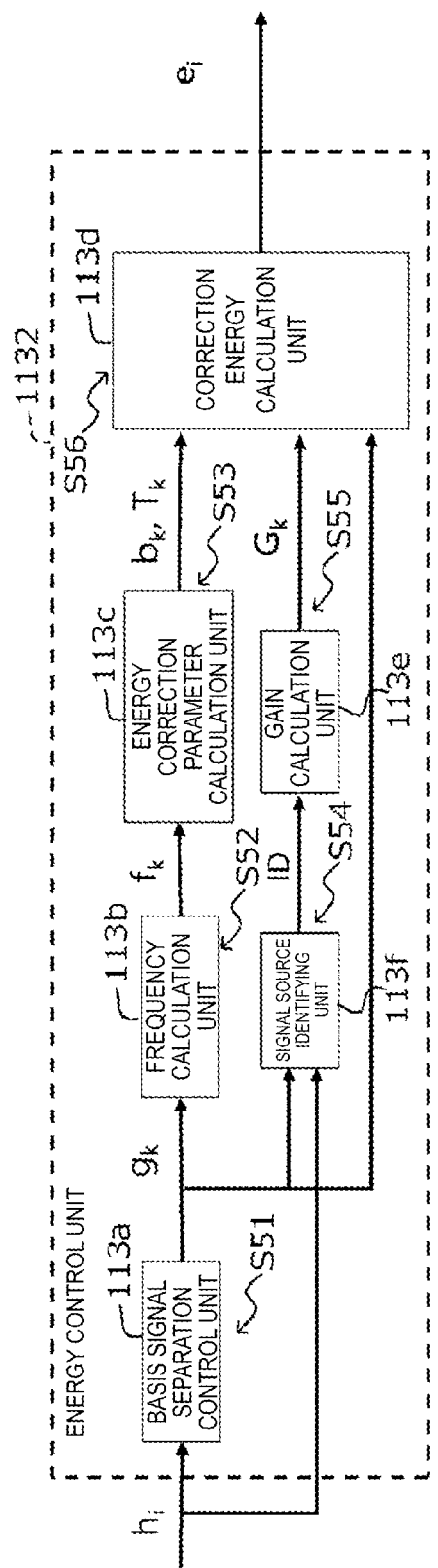
FIG. 40 is a block diagram for describing a second modification of the energy control process illustrated in FIG. 31.

As illustrated in FIG. 40, the energy control unit 1132 functions as a gain calculation unit 113e and a signal source identifying unit 113f in addition to the basis signal separation control unit 113a, the frequency calculation unit 113b, the energy correction parameter calculation unit 113c, and the correction energy calculation unit 113d illustrated in FIG. 33.

The basis signal separation control unit 113a separates the signal $h_i$ of the time-divided i-th frame which is an input signal into a plurality of basis signals g, and inputs the separated k-th basis signal $g_k$ to the frequency calculation unit 113b (step S51). For example, the signal may be separated in short-time Fourier analysis, wavelet analysis, an EMD method, or the like.

The frequency calculation unit 113b calculates a frequency $f_k$ of the k-th basis signal $g_k$ in, for example, discrete Fourier analysis, Hilbert spectrum analysis, or the like, and inputs the frequency $f_k$ to the energy correction parameter calculation unit 113c (step S52).

The energy correction parameter calculation unit 113c calculates an exponent value $b_k$ and an amplitude threshold $T_k$ described with reference to FIGS. 26 and 27 based on the frequency $f_k$, and inputs the values to the correction energy calculation unit 113d (step S53).

The signal source identifying unit 113f estimates identification candidates from the histories of the input signals $h_i$ and $h_j$ based on the set signal features, identifies which signal source the basis signal g belongs to, and outputs the identification result as an ID (identifier) or the like (step S54). The signal source identifying unit 113f may prepare an identifier in advance through machine learning or the like. For example, features of many musical instruments may be learned in deep learning, a candidate group (e.g., piano, bass, drum) may be estimated to ascertain which musical instrument is included in the current input signal $h_i$ (or the history of each of a plurality of input signals $h_i$ if the input signal $h_i$ is too short), and which musical instrument includes the basis signal $g_k$ may be identified.

The gain calculation unit 113e outputs the gain value $G_k$ at the predetermined frequency band in accordance with the ID specified by the signal source identifying unit 113f (step S55). When the energy is to be emphasized, $G_k>1$ is set, and when the energy is to be suppressed, $0 \leq G_k < 1$ is set. The energy may be adjusted through emphasis or suppression in one frequency band or in a plurality of frequency bands. In addition, the energy may be adjusted in the entire frequency band input to the energy control unit 1132.

The correction energy calculation unit 113d calculates the gain-adjusted correction energy $I_{pc}$ for each basis signal $g_k$ in accordance with the formula shown in Math 17 with respect to the amplitude A of the separated basis signal $g_k$, and outputs the scalar value $e_i$ obtained by summing the correction energies of all the basis signals $g_k$ (step S56).

Next, the details of the energy combining process shown in step S4 of FIG. 31 will be described with reference to the block diagram (steps S21 to S23) illustrated in FIG. 41.

The energy-vibration conversion unit 114a functions as an energy-equivalent conversion unit 1141a, a windowing processing unit 1142a, and a frame combining unit 1143a.

Figure 41:
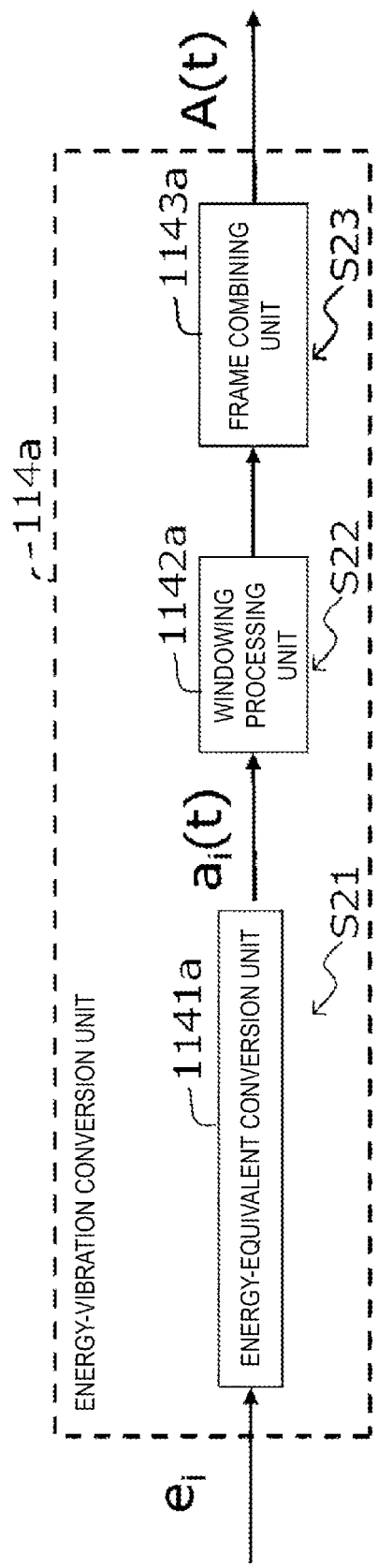
FIG. 41 is a block diagram for describing details of an energy control process illustrated in FIG. 31.

As illustrated in FIG. 41, the energy-equivalent conversion unit 1141a converts the scalar value $e_i$ of the vibration energy calculated for each frame i into a vibration waveform having the same vibration energy but a different carrier frequency, and outputs the amplitude $a_i(t)$ of the waveform to the windowing processing unit 1142a (step S21).

The windowing processing unit 1142a performs windowing processing on the input amplitude $a_i(t)$ of each frame i by using the window function shown in FIG. 28, and inputs the processing result to the frame combining unit 1143a (step S22).

The frame combining unit 1143a combines frames on the input from the windowing processing unit 1142a for the first to N-th frames, and outputs the amplitude A(t) of the vibration waveform (step S23).

Next, details of the generation processing of the corrected vibration waveform shown in step S5 of FIG. 31 will be described with reference to the block diagram (steps S31 and S32) illustrated in FIG. 42.

Figure 42:
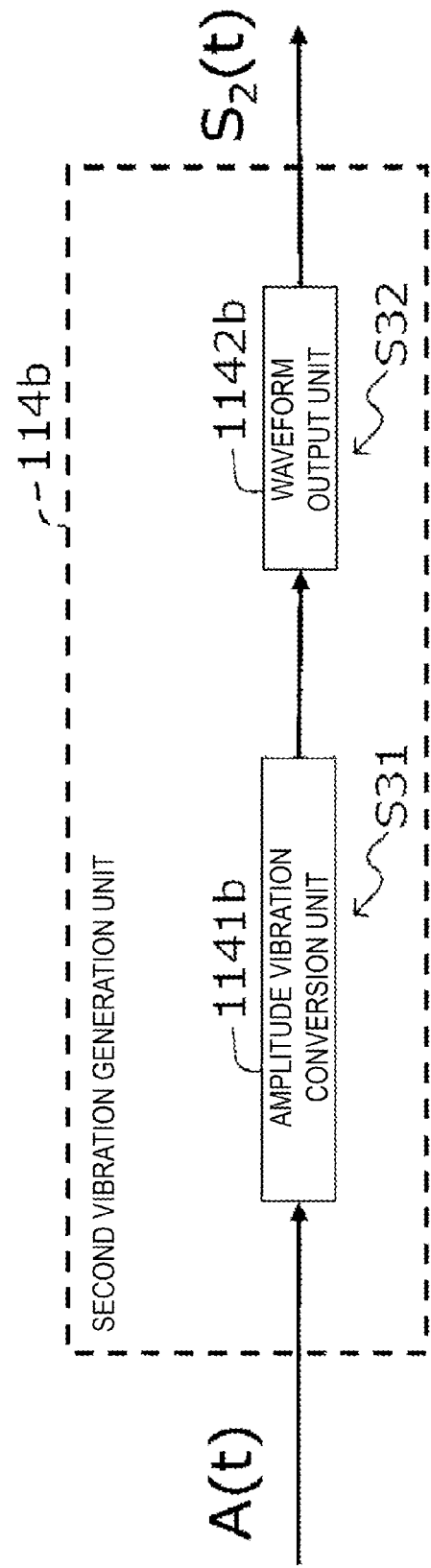
FIG. 42 is a block diagram for describing details of a process of generating a corrected vibration waveform illustrated in FIG. 31.

As illustrated in FIG. 42, the second vibration generation unit 114b functions as an amplitude vibration conversion unit 1141b and a waveform output unit 1142b. The second vibration generation unit 114b has an input signal A(t) and outputs a sine wave with a carrier frequency. The phase of the generated waveform may be controlled such that vibrations are smoothly connected.

The amplitude vibration conversion unit 1141b converts the input amplitude A(t) into a vibration (step S31).

The waveform output unit 1142b outputs the sine wave $S_2(t)$ with the carrier frequency so that the amplitude becomes A(t) (step S32).

[B] Effects

According to the vibration distribution control device 1, a signal distribution control program, and a signal distribution control method in the example of the embodiment, for example, the following operational effects can be achieved.

The time division control unit 112 divides a signal related to a vibration source having a predetermined waveform at a certain position for each predetermined time interval. The energy control unit 113 applies a predetermined attenuation formula to the energy of the signal in accordance with the distance and the orientation from the vibration source to each of the plurality of vibrators at each of the predetermined time intervals divided by the time division control unit 112, distributes the energy of the signal to the plurality of vibrators, and converts the signal into a waveform having another frequency. The signal output unit 114 outputs the signal converted by the energy control unit 113 to cause a human to experience the output vibration generated from the converted signal by using the plurality of vibrators.

As a result, it is possible to improve the reality of the tactile sensation by causing the human to experience a predetermined vibration waveform including a plurality of frequencies. In addition, it is possible to cause a human to experience the orientation and the distance or the motion of the vibration source in the external world, cause the human to experience the position and the motion of the vibration source on a body surface or in the body, and cause the human to experience the feeling that the vibration source moves from the external world to the body or from the body to the external world.

Furthermore, by adapting the vibration distribution control device 1, the vibration distribution control program, or the vibration distribution control method to the various devices illustrated in FIGS. 10 to 15 and the like, a sense of orientation, a sense of distance, a motion, and the like can be added to a sense of vibration to be notified of, and a sense of presence of a target of a vibration source, a sense of presence existing in an environment, and a sense of reality can be produced.

[C] Others

The disclosed technology is not limited to each of the embodiments, and can be carried out with various modifications without departing from the scope of each embodiment. Each configuration and process of each embodiment can be selected as necessary, or may be appropriately combined.

Figure 43:
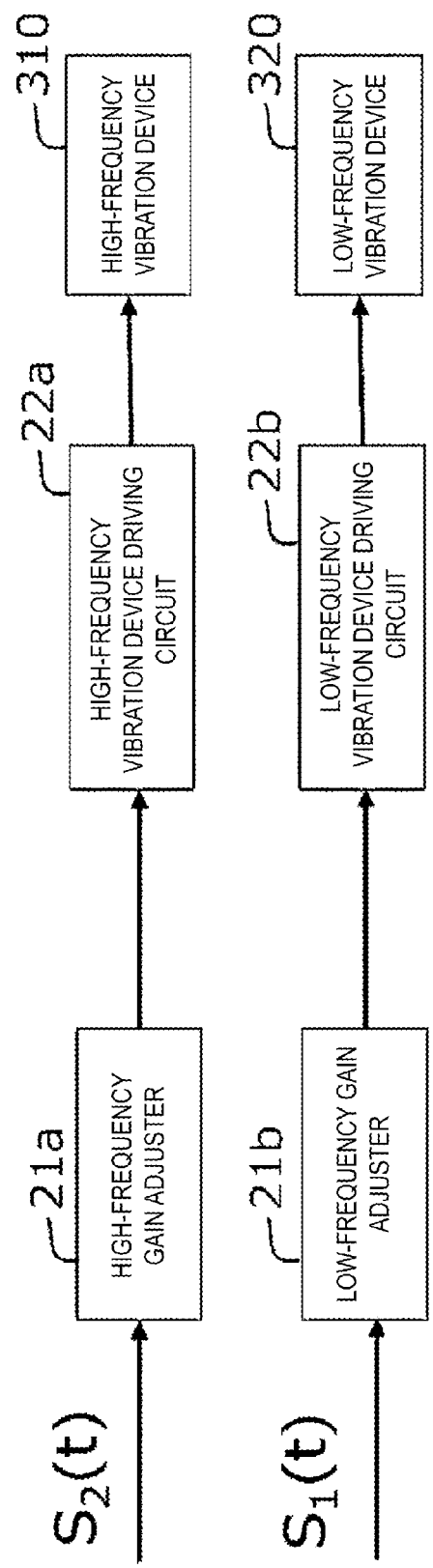
FIG. 43 is a block diagram illustrating a configuration example of a DAC when a plurality of vibration devices are used in the vibration generation system illustrated in FIG. 22.

FIG. 43 is a block diagram illustrating a configuration example of the DAC 2 when a plurality of vibration devices 310 and 320 are used in the vibration generation system 100 illustrated in FIG. 22.

In the example illustrated in FIG. 43, the DAC 2 illustrated in FIG. 22 functions as a high-frequency gain adjuster 21a, a low-frequency gain adjuster 21b, a high-frequency vibration device driving circuit 22a, and a low-frequency vibration device driving circuit 22b. In addition, the vibrators 31 illustrated in FIG. 22 function as the high-frequency vibration device 310 and the low-frequency vibration device 320. A set of the high-frequency gain adjuster 21a, the high-frequency vibration device driving circuit 22a, and the high-frequency vibration device 310 and a set of the low-frequency gain adjuster 21b, the low-frequency vibration device driving circuit 22b, and the low-frequency vibration device 320 are provided as many as the number of vibrators 31 illustrated in FIG. 22.

The high-frequency gain adjuster 21a outputs the second vibration waveform $S_2(t)$ input from the vibration distribution control device 1 to the high-frequency vibration device 310 via the high-frequency vibration device driving circuit 22a. In addition, the low-frequency gain adjuster 21b outputs the first vibration waveform $S_1(t)$ input from the vibration distribution control device 1 to the low-frequency vibration device 320 via the low-frequency vibration device driving circuit 22b.

Figure 44:
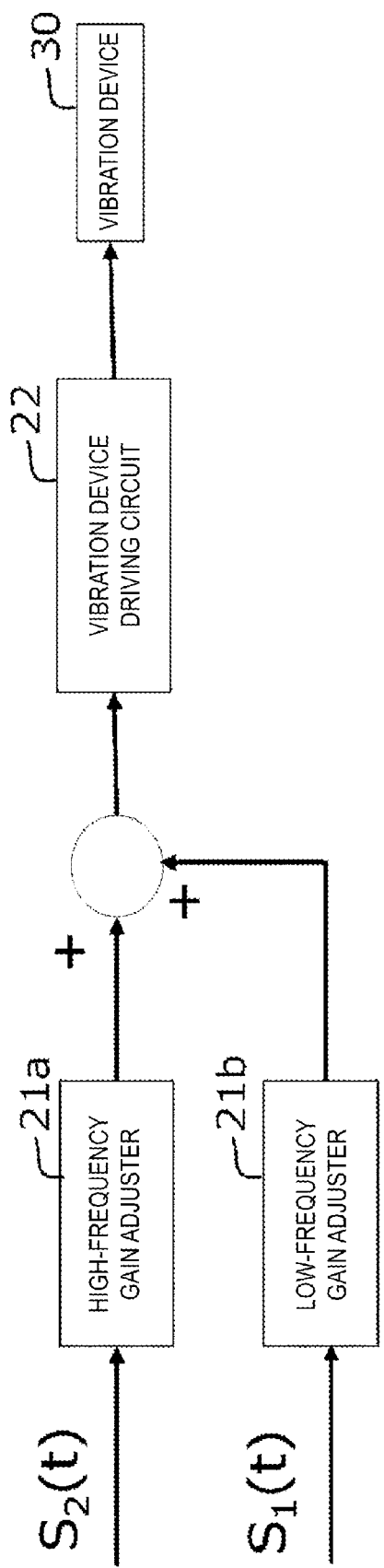
FIG. 44 is a block diagram illustrating a configuration example of a DAC when a single vibration device is used in the vibration generation system illustrated in FIG. 22.

FIG. 44 is a block diagram illustrating a configuration example of the DAC when a single vibration device is used in the vibration generation system 100 illustrated in FIG. 22.

In the example illustrated in FIG. 44, the DAC 2 illustrated in FIG. 22 functions as the high-frequency gain adjuster 21a, the low-frequency gain adjuster 21b, and the vibration device driving circuit 22. In addition, the vibrators 31 illustrated in FIG. 22 function as vibration devices 30. A set of the high-frequency gain adjuster 21a, the low-frequency gain adjuster 21b, the vibration device driving circuit 22, and the vibration devices 30 are provided as many as the number of the vibrators 31 illustrated in FIG. 22.

The high-frequency gain adjuster 21a and the low-frequency gain adjuster 21b output each of the second vibration waveform $S_2(t)$ and the first vibration waveform $S_1(t)$ input from the vibration distribution control device 1 to the common vibration devices 30 via the common vibration device driving circuit 22.

REFERENCE SIGNS LIST

100 Vibration generation system
101 Floor-mounted vibration device
102 Wearable vibration device
103 Wristband-type vibration device
104 Game controller
105 Smartphone
1 Vibration distribution control device
11 CPU
1000 ISM unit
111 Frequency removal control unit
111a Signal removal unit
111b Low-pass filter
111d Correction energy calculation unit
112 Time division control unit
113, 1131, 1132 Energy control unit
113a Basis signal separation control unit
113b Frequency calculation unit
113c Energy correction parameter calculation unit
113d Correction energy calculation unit
113e Gain calculation unit
113f Signal source identifying unit
113g Low frequency component combining unit
114 Signal output unit
114a Energy-vibration conversion unit
114b Second vibration generation unit
114c First vibration generation unit
1141a Energy-equivalent conversion unit
1142a Windowing processing unit
1143a Frame combining unit
1141b Amplitude vibration conversion unit
1142b Waveform output unit
12 Memory
13 Storage device
2 DAC
21a High-frequency gain adjuster
21b Low-frequency gain adjuster
22 Vibration device driving circuit
22a High-frequency vibration device driving circuit
22b Low-frequency vibration device driving circuit
30 Vibration device
31 Vibrator
310 High-frequency vibration device
320 Low-frequency vibration device
32 Speaker/headphone
33 Display device

The invention claimed is:

1. A vibration distribution control device configured to generate a vibration source being present at a predetermined position by using a plurality of vibrators, the vibration distribution control device comprising:
processor circuitry; and
a memory configured to storage a computer program, wherein the processor circuitry, by reading the computer program from the memory, configured to:
calculate a perceived intensity from a vibration waveform of the vibration source;
distributes distribute the perceived intensity to each of the plurality of vibrators in accordance with an azimuth of the vibration source and arrangement positions of the plurality of vibrators; and
controls and outputs control and output vibrations of the plurality of vibrators based on information distributed.

2. The vibration distribution control device according to claim 1, wherein the processor circuitry configured to:
calculate, by using a perception origin and information, the perceived intensity at the perception origin, the perception origin being found based on a vibration image obtained by the plurality of vibrators, the information being attenuated in accordance with a distance to the vibration source, and
distribute the perceived intensity calculated at the perception origin to each of the plurality of vibrators by using a distribution coefficient determined based on the azimuth and the arrangement positions.

3. The vibration distribution control device according to claim 2,
wherein a sum of a plurality of the distribution coefficients is constant.

4. A non-transitory computer-readable memory having one or more executable instructions stored thereon causing a computer configured to generate a vibration source being present at a predetermined position by using a plurality of vibrators to perform:
calculating a perceived intensity from a vibration waveform of the vibration source;
distributing the perceived intensity to each of the plurality of vibrators in accordance with an azimuth of the vibration source and arrangement positions of the plurality of vibrators; and
controlling and outputting vibrations of the plurality of vibrators based on the perceived intensity which is distributed.

5. The non-transitory computer-readable memory according to claim 4, the one or more executable instructions causing the computer to perform:
calculating, by using a perception origin and information, the perceived intensity at the perception origin, the perception origin being found based on a vibration image obtained by the plurality of vibrators, the information being attenuated in accordance with a distance to the vibration source, and
distributing the perceived intensity calculated at the perception origin to each of the plurality of vibrators by using a distribution coefficient determined based on the azimuth and the arrangement positions.

6. The non-transitory computer-readable memory according to claim 4, wherein a sum of a plurality of the distribution coefficients is constant.

7. A vibration distribution control method of generating a vibration source being present at a predetermined position by using a plurality of vibrators, the vibration distribution control method comprising:
  a computer which reads a computer program form a memory, configured to:
    calculating a perceived intensity from a vibration waveform of the vibration source;
    distributing the perceived intensity to each of the plurality of vibrators in accordance with an azimuth of the vibration source and arrangement positions of the plurality of vibrators; and
    controlling and outputting vibrations of the plurality of vibrators based on information distributed.

8. The vibration distribution control method according to claim 7,
  wherein, by using a perception origin and information, the perceived intensity at the perception origin is calculated, the perception origin being found based on a vibration image obtained by the plurality of vibrators, the information being attenuated in accordance with a distance to the vibration source, and
  wherein the perceived intensity calculated at the perception origin is distributed to each of the plurality of vibrators by using a distribution coefficient determined based on the azimuth and the arrangement positions.

9. The vibration distribution control method according to claim 8, wherein a sum of a plurality of the distribution coefficients is constant.

* * * * *